United States Patent
Dey, IV et al.

(10) Patent No.: US 10,272,550 B2
(45) Date of Patent: Apr. 30, 2019

(54) POWER TOOL INCLUDING AN OUTPUT POSITION SENSOR

(71) Applicant: MILWAUKEE ELECTRIC TOOL CORPORATION, Brookfield, WI (US)

(72) Inventors: John Stanley Dey, IV, Milwaukee, WI (US); Jacob Paul Schneider, Madison, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/142,153

(22) Filed: Sep. 26, 2018

(65) Prior Publication Data

US 2019/0022837 A1    Jan. 24, 2019

Related U.S. Application Data

(63) Continuation of application No. 15/441,953, filed on Feb. 24, 2017.

(60) Provisional application No. 62/374,235, filed on Aug. 12, 2016, provisional application No. 62/299,871, filed on Feb. 25, 2016.

(51) Int. Cl.
*B25B 21/02* (2006.01)
*B25B 23/147* (2006.01)
*G01D 5/20* (2006.01)

(52) U.S. Cl.
CPC .......... *B25B 23/1475* (2013.01); *B25B 21/02* (2013.01); *B25B 21/026* (2013.01); *G01D 5/2006* (2013.01)

(58) Field of Classification Search
CPC ... B25B 21/02; B25D 11/04; B25D 2250/195; B25D 2250/201

USPC ......................................................... 173/10
See application file for complete search history.

(56) References Cited

U.S. PATENT DOCUMENTS

| | | | |
|---|---|---|---|
| 3,882,305 | A | 5/1975 | Johnstone |
| 4,545,106 | A | 10/1985 | Juengel |
| 4,609,089 | A | 9/1986 | Kobayashi et al. |
| 4,680,862 | A | 7/1987 | Wieland et al. |

(Continued)

FOREIGN PATENT DOCUMENTS

| | | |
|---|---|---|
| CN | 202309109 | 7/2012 |
| CN | 105500264 | 4/2016 |

(Continued)

OTHER PUBLICATIONS

International Search Report and Written Opinion for Application No. PCT/US2017/019374 dated May 18, 2017 (13 pages).

*Primary Examiner* — Gloria R Weeks
(74) *Attorney, Agent, or Firm* — Michael Best & Friedrich LLP

(57) ABSTRACT

A power tool including a motor and an impact mechanism. The impact mechanism is coupled to the motor and includes a hammer driven by the motor, and an anvil positioned at a nose of the power tool, and configured to receive an impact from the hammer. The power tool also includes a sensor assembly positioned at the nose of the power tool, and an electronic processor. The sensor assembly includes an output position sensor configured to generate an output signal indicative of a position of the hammer or the anvil. The electronic processor is coupled to the output position sensor and to the motor, and is configured to operate the motor based on the output signal from the output position sensor.

23 Claims, 39 Drawing Sheets

(56) References Cited

U.S. PATENT DOCUMENTS

| | | | |
|---|---|---|---|
| 4,685,050 A | 8/1987 | Polzer et al. |
| 4,854,786 A | 8/1989 | Alexander et al. |
| 5,277,261 A | 1/1994 | Sakoh |
| 5,315,501 A | 5/1994 | Whitehouse |
| 5,440,215 A | 8/1995 | Gilmore |
| 5,526,460 A | 6/1996 | DeFrancesco et al. |
| 5,903,462 A | 5/1999 | Wagner et al. |
| 5,942,975 A | 8/1999 | Sørensen |
| 6,123,241 A | 9/2000 | Walter et al. |
| 6,157,313 A | 12/2000 | Emmermann |
| 6,161,629 A | 12/2000 | Hohmann et al. |
| 6,279,668 B1 | 8/2001 | Mercer |
| 6,371,218 B1 * | 4/2002 | Amano ............... B25B 23/1405 173/176 |
| 6,392,373 B1 | 5/2002 | Glasgow et al. |
| 6,405,598 B1 | 6/2002 | Bareggi |
| 6,424,799 B1 | 7/2002 | Gilmore |
| 6,431,425 B1 | 8/2002 | Moorman et al. |
| 6,508,313 B1 | 1/2003 | Carney et al. |
| 6,520,270 B2 | 2/2003 | Wissmach et al. |
| 6,522,949 B1 | 2/2003 | Ikeda et al. |
| 6,598,684 B2 | 7/2003 | Watanabe |
| 6,668,212 B2 | 12/2003 | Colangelo, II et al. |
| 6,687,567 B2 | 2/2004 | Watanabe |
| 6,696,814 B2 | 2/2004 | Henderson et al. |
| 6,784,801 B2 | 8/2004 | Watanabe et al. |
| 6,823,134 B2 | 11/2004 | Glasgow et al. |
| 6,836,614 B2 | 12/2004 | Gilmore |
| 6,848,516 B2 | 2/2005 | Giardino |
| 6,872,121 B2 | 3/2005 | Wiener et al. |
| 6,913,087 B1 | 7/2005 | Brotto et al. |
| 6,923,285 B1 | 8/2005 | Rossow et al. |
| 6,938,689 B2 | 9/2005 | Farrant et al. |
| 6,943,510 B2 | 9/2005 | Gorti |
| 6,945,337 B2 | 9/2005 | Kawai et al. |
| 6,954,048 B2 | 10/2005 | Cho |
| 6,968,908 B2 | 11/2005 | Tokunaga et al. |
| 7,034,711 B2 | 4/2006 | Sakatani et al. |
| 7,035,710 B2 | 4/2006 | Balling |
| 7,035,898 B1 | 4/2006 | Baker |
| 7,036,703 B2 | 5/2006 | Grazioli et al. |
| 7,062,998 B2 | 6/2006 | Hohmann et al. |
| 7,064,462 B2 | 6/2006 | Hempe et al. |
| 7,064,502 B2 | 6/2006 | Garcia et al. |
| 7,086,483 B2 | 8/2006 | Arimura et al. |
| 7,102,303 B2 | 9/2006 | Brotto et al. |
| 7,112,934 B2 | 9/2006 | Gilmore |
| 7,116,071 B2 | 10/2006 | Glasgow et al. |
| 7,123,149 B2 | 10/2006 | Nowak et al. |
| 7,133,601 B2 | 11/2006 | Phillips et al. |
| 7,137,541 B2 | 11/2006 | Baskar et al. |
| 7,211,972 B2 | 5/2007 | Garcia et al. |
| 7,218,227 B2 | 5/2007 | Davis et al. |
| 7,243,440 B2 | 7/2007 | DeKeyser |
| 7,276,878 B2 | 10/2007 | Phillips et al. |
| 7,282,880 B2 | 10/2007 | Glasgow et al. |
| 7,328,086 B2 | 2/2008 | Perry et al. |
| 7,328,757 B2 | 2/2008 | Davies |
| 7,343,764 B2 | 3/2008 | Solfronk |
| 7,346,422 B2 | 3/2008 | Tsuchiya et al. |
| 7,359,762 B2 | 4/2008 | Etter et al. |
| 7,382,272 B2 | 6/2008 | Feight |
| 7,385,795 B2 | 6/2008 | Denning |
| 7,420,341 B2 | 9/2008 | Glasgow et al. |
| 7,437,204 B2 | 10/2008 | Lev-Ami et al. |
| 7,453,234 B2 | 11/2008 | Phillips et al. |
| 7,464,769 B2 | 12/2008 | Nakazawa et al. |
| 7,501,778 B2 | 3/2009 | Hashimoto et al. |
| 7,521,826 B2 | 4/2009 | Hempe et al. |
| 7,540,334 B2 | 6/2009 | Gass et al. |
| 7,613,590 B2 | 11/2009 | Brown |
| 7,646,155 B2 | 1/2010 | Woods et al. |
| RE41,185 E | 3/2010 | Gilmore et al. |
| 7,690,569 B2 | 4/2010 | Swanson et al. |
| 7,728,553 B2 | 6/2010 | Carrier et al. |
| 7,750,811 B2 | 7/2010 | Puzio et al. |
| 7,787,981 B2 | 8/2010 | Austin et al. |
| 7,795,829 B2 | 9/2010 | Seiler et al. |
| 7,809,495 B2 | 10/2010 | Leufen |
| 7,817,062 B1 | 10/2010 | Li et al. |
| 7,834,566 B2 | 11/2010 | Woods et al. |
| 7,868,591 B2 | 1/2011 | Phillips et al. |
| 7,898,403 B2 | 3/2011 | Ritter et al. |
| 7,900,524 B2 | 3/2011 | Calloway et al. |
| 7,911,379 B2 | 3/2011 | Cameron |
| 7,928,673 B2 | 4/2011 | Woods et al. |
| 7,928,692 B2 | 4/2011 | Carrier et al. |
| 7,931,096 B2 | 4/2011 | Saha |
| 7,942,084 B2 | 5/2011 | Wilson, Jr. et al. |
| 7,942,211 B2 | 5/2011 | Scrimshaw et al. |
| 7,953,965 B2 | 5/2011 | Qin et al. |
| 7,958,944 B2 | 6/2011 | Lehnert et al. |
| 7,982,624 B2 | 7/2011 | Richter et al. |
| 8,004,397 B2 | 8/2011 | Forrest et al. |
| 8,004,664 B2 | 8/2011 | Etter et al. |
| 8,005,647 B2 | 8/2011 | Armstrong et al. |
| 8,044,796 B1 | 10/2011 | Carr, Sr. |
| 8,049,636 B2 | 11/2011 | Buckingham et al. |
| 8,093,863 B2 | 1/2012 | Carrier et al. |
| 8,169,298 B2 | 5/2012 | Wiesner et al. |
| 8,171,828 B2 | 5/2012 | Duvan et al. |
| 8,198,839 B2 | 6/2012 | Katou et al. |
| 8,210,275 B2 | 7/2012 | Suzuki et al. |
| 8,255,358 B2 | 8/2012 | Ballew et al. |
| 8,260,452 B2 | 9/2012 | Austin et al. |
| 8,264,374 B2 | 9/2012 | Obatake et al. |
| 8,281,871 B2 | 10/2012 | Cutler et al. |
| 8,286,723 B2 | 10/2012 | Puzio et al. |
| 8,294,424 B2 | 10/2012 | Bucur |
| 8,310,206 B2 | 11/2012 | Bucur |
| 8,316,958 B2 | 11/2012 | Schell et al. |
| 8,324,845 B2 | 12/2012 | Suzuki et al. |
| 8,330,426 B2 | 12/2012 | Suzuki et al. |
| 8,351,982 B2 | 1/2013 | Rofougaran |
| 8,378,600 B2 | 2/2013 | Katou et al. |
| 8,403,072 B2 | 3/2013 | Eshleman et al. |
| 8,406,697 B2 | 3/2013 | Arimura et al. |
| 8,412,179 B2 | 4/2013 | Gerold et al. |
| 8,418,778 B2 | 4/2013 | Eshleman et al. |
| 8,438,955 B2 | 5/2013 | Wilson, Jr. et al. |
| 8,464,808 B2 | 6/2013 | Leü et al. |
| 8,587,230 B2 | 11/2013 | Pant et al. |
| 8,611,250 B2 | 12/2013 | Chen et al. |
| 8,645,176 B2 | 2/2014 | Walton et al. |
| 8,657,030 B2 | 2/2014 | Du et al. |
| 8,657,482 B2 | 2/2014 | Malackowski et al. |
| 8,666,936 B2 | 3/2014 | Wallace |
| 8,678,106 B2 | 3/2014 | Matsunaga et al. |
| D703,017 S | 4/2014 | Concari |
| 8,800,679 B2 | 8/2014 | Eshleman et al. |
| 8,800,680 B2 | 8/2014 | Eshleman et al. |
| 8,823,322 B2 | 9/2014 | Noda et al. |
| 8,890,449 B2 | 11/2014 | Suzuki et al. |
| 8,919,456 B2 | 12/2014 | Ng et al. |
| 8,965,841 B2 | 2/2015 | Wallace |
| 8,988,015 B2 | 3/2015 | Forster et al. |
| 9,030,145 B2 | 5/2015 | Brennenstuhl et al. |
| 9,031,585 B2 | 5/2015 | Kahle et al. |
| 9,038,743 B2 | 5/2015 | Aoki |
| 9,061,392 B2 | 6/2015 | Forgues et al. |
| 9,126,317 B2 | 9/2015 | Lawton et al. |
| 9,144,875 B2 | 9/2015 | Schlesak et al. |
| 9,199,362 B2 | 12/2015 | Eshleman et al. |
| 9,211,636 B2 | 12/2015 | Eshleman et al. |
| 9,216,505 B2 | 12/2015 | Rejman et al. |
| 9,232,614 B2 | 1/2016 | Hiroi |
| 9,233,457 B2 | 1/2016 | Wanek et al. |
| 9,242,356 B2 | 1/2016 | King et al. |
| 9,266,178 B2 | 2/2016 | Eshleman et al. |
| 9,266,230 B2 | 2/2016 | Maddilate et al. |
| 9,276,509 B2 | 3/2016 | Kato et al. |
| 9,281,770 B2 | 3/2016 | Wood et al. |
| 9,321,156 B2 | 4/2016 | Eshleman et al. |
| 9,321,159 B2 | 4/2016 | May |

(56) References Cited

U.S. PATENT DOCUMENTS

| | | | |
|---|---|---|---|
| 9,415,488 B2 | 8/2016 | Puzio et al. | |
| 9,475,180 B2 | 10/2016 | Eshleman et al. | |
| 9,485,864 B2 | 11/2016 | Imafuji et al. | |
| 9,486,864 B2 | 11/2016 | Luo et al. | |
| 9,522,461 B2 * | 12/2016 | Oomori | B25B 21/00 |
| 9,539,715 B2 | 1/2017 | McClung | |
| 9,553,542 B2 | 1/2017 | Machida et al. | |
| 9,555,530 B2 | 1/2017 | Pedicini et al. | |
| 9,573,254 B2 | 2/2017 | Bartoszek | |
| 9,737,984 B2 | 8/2017 | Yamamoto et al. | |
| 2001/0052416 A1 | 12/2001 | Wissmach et al. | |
| 2002/0003045 A1 | 1/2002 | Bongers-Ambrosius | |
| 2002/0033267 A1 | 3/2002 | Schweizer et al. | |
| 2002/0067147 A1 | 6/2002 | Glasgow et al. | |
| 2002/0153856 A1 | 10/2002 | Gilmore | |
| 2003/0042859 A1 | 3/2003 | Gorti et al. | |
| 2003/0047331 A1 | 3/2003 | Henderson et al. | |
| 2003/0121677 A1 | 3/2003 | Kady et al. | |
| 2003/0205393 A1 | 11/2003 | Hoop et al. | |
| 2004/0124808 A1 | 7/2004 | Hirono | |
| 2004/0179829 A1 | 9/2004 | Phillips et al. | |
| 2004/0182587 A1 | 9/2004 | May et al. | |
| 2005/0029976 A1 | 2/2005 | Terry et al. | |
| 2005/0218867 A1 | 10/2005 | Phillips et al. | |
| 2005/0248309 A1 | 11/2005 | Denning | |
| 2006/0009879 A1 | 1/2006 | Lynch et al. | |
| 2006/0076385 A1 | 4/2006 | Etter et al. | |
| 2007/0252675 A1 | 11/2007 | Lamar | |
| 2007/0296286 A1 | 12/2007 | Avenell | |
| 2008/0084334 A1 | 4/2008 | Ballew | |
| 2008/0086320 A1 | 4/2008 | Ballew | |
| 2008/0086323 A1 | 4/2008 | Ballew et al. | |
| 2008/0086349 A1 | 4/2008 | Petrie et al. | |
| 2008/0086427 A1 | 4/2008 | Petrie | |
| 2008/0086428 A1 | 4/2008 | Wallace | |
| 2008/0086685 A1 | 4/2008 | Janky et al. | |
| 2008/0238370 A1 | 10/2008 | Carrier et al. | |
| 2009/0101379 A1 | 4/2009 | Du et al. | |
| 2009/0250364 A1 | 10/2009 | Gerold et al. | |
| 2009/0251330 A1 | 10/2009 | Gerold et al. | |
| 2009/0273436 A1 | 11/2009 | Gluck et al. | |
| 2009/0295313 A1 | 12/2009 | Suzuki et al. | |
| 2010/0096151 A1 | 4/2010 | Östling | |
| 2010/0116519 A1 | 5/2010 | Gareis | |
| 2010/0154599 A1 | 6/2010 | Gareis | |
| 2010/0176766 A1 | 7/2010 | Brandner et al. | |
| 2010/0218966 A1 | 9/2010 | Liebhard et al. | |
| 2010/0307782 A1 | 12/2010 | Iwata et al. | |
| 2011/0000688 A1 | 1/2011 | Iwata | |
| 2011/0056716 A1 | 3/2011 | Jönsson et al. | |
| 2011/0067895 A1 | 3/2011 | Nobe et al. | |
| 2011/0227430 A1 | 9/2011 | Omori et al. | |
| 2011/0248281 A1 | 10/2011 | Oshima et al. | |
| 2011/0248650 A1 | 10/2011 | Sterling et al. | |
| 2012/0022125 A1 | 1/2012 | Shao et al. | |
| 2012/0074877 A1 | 3/2012 | Shi et al. | |
| 2012/0074883 A1 | 3/2012 | Okada et al. | |
| 2012/0074886 A1 | 3/2012 | Miyazaki | |
| 2012/0167721 A1 | 7/2012 | Fluhrer | |
| 2012/0168189 A1 | 7/2012 | Eckert | |
| 2012/0234566 A1 | 9/2012 | Mashiko et al. | |
| 2012/0247796 A1 | 10/2012 | Mueller et al. | |
| 2012/0279736 A1 * | 11/2012 | Tanimoto | B25B 21/02 173/2 |
| 2012/0292070 A1 | 11/2012 | Ito et al. | |
| 2012/0305276 A1 | 12/2012 | Liptak et al. | |
| 2012/0318552 A1 | 12/2012 | May | |
| 2013/0008267 A1 | 1/2013 | Katayama | |
| 2013/0008676 A1 | 1/2013 | Eshleman et al. | |
| 2013/0024245 A1 | 1/2013 | Nichols et al. | |
| 2013/0062086 A1 | 3/2013 | Ito et al. | |
| 2013/0087355 A1 | 4/2013 | Oomori et al. | |
| 2013/0097873 A1 | 4/2013 | Luo et al. | |
| 2013/0109375 A1 | 5/2013 | Zeiler et al. | |
| 2013/0118767 A1 | 5/2013 | Cannaliato et al. | |
| 2013/0126202 A1 | 5/2013 | Oomori et al. | |
| 2013/0133907 A1 | 5/2013 | Chen et al. | |
| 2013/0133911 A1 | 5/2013 | Ishikawa et al. | |
| 2013/0138465 A1 | 5/2013 | Kahle et al. | |
| 2013/0138606 A1 | 5/2013 | Kahle et al. | |
| 2013/0140049 A1 | 6/2013 | Eshleman et al. | |
| 2013/0140050 A1 | 6/2013 | Eshleman et al. | |
| 2013/0147407 A1 | 6/2013 | Kawamura | |
| 2013/0153250 A1 | 6/2013 | Eckert | |
| 2013/0187587 A1 | 7/2013 | Knight et al. | |
| 2013/0188058 A1 | 7/2013 | Nguyen et al. | |
| 2013/0191417 A1 | 7/2013 | Petrie et al. | |
| 2013/0199811 A1 | 8/2013 | Maddilate et al. | |
| 2013/0204753 A1 | 8/2013 | Wallace | |
| 2013/0255980 A1 | 10/2013 | Linehan et al. | |
| 2013/0284471 A1 | 10/2013 | Eshleman et al. | |
| 2013/0304545 A1 | 11/2013 | Ballew et al. | |
| 2013/0314007 A1 | 11/2013 | Yanagihara et al. | |
| 2013/0327552 A1 | 12/2013 | Lovelass et al. | |
| 2014/0006295 A1 | 1/2014 | Zeiler et al. | |
| 2014/0056660 A1 | 2/2014 | Eshleman et al. | |
| 2014/0069672 A1 | 3/2014 | Mashiko et al. | |
| 2014/0102742 A1 | 4/2014 | Eshleman et al. | |
| 2014/0107853 A1 | 4/2014 | Ashinghurst et al. | |
| 2014/0122143 A1 | 5/2014 | Fletcher et al. | |
| 2014/0151079 A1 | 6/2014 | Furui et al. | |
| 2014/0159662 A1 | 6/2014 | Furui et al. | |
| 2014/0159919 A1 | 6/2014 | Furui et al. | |
| 2014/0159920 A1 | 6/2014 | Furui et al. | |
| 2014/0166324 A1 | 6/2014 | Puzio et al. | |
| 2014/0184397 A1 | 7/2014 | Volpert | |
| 2014/0210379 A1 | 7/2014 | Kato et al. | |
| 2014/0284070 A1 | 9/2014 | Ng et al. | |
| 2014/0292245 A1 | 10/2014 | Suzuki et al. | |
| 2014/0324194 A1 | 10/2014 | Larsson et al. | |
| 2014/0331830 A1 | 11/2014 | King et al. | |
| 2014/0332242 A1 | 11/2014 | Chen et al. | |
| 2014/0334270 A1 | 11/2014 | Kusakawa | |
| 2014/0336810 A1 | 11/2014 | Li et al. | |
| 2014/0336955 A1 | 11/2014 | Li et al. | |
| 2014/0350716 A1 | 11/2014 | Fly et al. | |
| 2014/0365259 A1 | 12/2014 | Delplace et al. | |
| 2014/0367134 A1 | 12/2014 | Phillips et al. | |
| 2014/0379136 A1 | 12/2014 | Schlegel et al. | |
| 2015/0000944 A1 | 1/2015 | Duesselberg et al. | |
| 2015/0002089 A1 | 1/2015 | Rejman et al. | |
| 2015/0022125 A1 | 1/2015 | Takano et al. | |
| 2015/0042247 A1 | 2/2015 | Kusakawa | |
| 2015/0084554 A1 | 3/2015 | Tsuruta et al. | |
| 2015/0122523 A1 | 5/2015 | Yamamoto et al. | |
| 2015/0122524 A1 | 5/2015 | Papp | |
| 2015/0135306 A1 | 5/2015 | Winkler et al. | |
| 2015/0135907 A1 | 5/2015 | Hirabayashi et al. | |
| 2015/0137721 A1 | 5/2015 | Yamamoto et al. | |
| 2015/0158157 A1 | 6/2015 | Hirabayashi et al. | |
| 2015/0158170 A1 | 6/2015 | Nitsche et al. | |
| 2015/0165604 A1 | 6/2015 | Bartoszek | |
| 2015/0171654 A1 | 6/2015 | Horie et al. | |
| 2015/0182230 A1 | 7/2015 | Belagali et al. | |
| 2015/0231771 A1 | 8/2015 | Sakai et al. | |
| 2015/0263592 A1 | 9/2015 | Kawakami et al. | |
| 2015/0333666 A1 | 11/2015 | Miller et al. | |
| 2015/0340921 A1 | 11/2015 | Suda et al. | |
| 2016/0279781 A1 | 9/2016 | Beckert et al. | |
| 2016/0354905 A1 | 12/2016 | Ely et al. | |
| 2017/0008156 A1 | 1/2017 | Miyazaki et al. | |
| 2017/0008159 A1 | 1/2017 | Boeck et al. | |
| 2017/0173768 A1 | 6/2017 | Dey, IV et al. | |
| 2017/0217004 A1 | 8/2017 | Kato | |
| 2017/0220825 A1 | 8/2017 | Wang et al. | |
| 2017/0232589 A1 | 8/2017 | Gaul | |
| 2017/0246732 A1 | 8/2017 | Dey, IV et al. | |

FOREIGN PATENT DOCUMENTS

| | | |
|---|---|---|
| DE | 10029132 | 1/2002 |
| DE | 202006014606 | 1/2007 |
| EP | 1900484 | 3/2008 |
| EP | 2147750 | 1/2010 |

(56) References Cited

FOREIGN PATENT DOCUMENTS

| | | |
|---|---|---|
| EP | 2684645 | 1/2014 |
| EP | 2711138 | 3/2014 |
| EP | 2724823 | 4/2014 |
| EP | 2873490 | 5/2015 |
| JP | 2000176850 | 6/2000 |
| JP | 2004072563 | 3/2004 |
| JP | 2006123080 | 5/2006 |
| JP | 2010069598 | 4/2010 |
| JP | 2012058034 | 3/2012 |
| WO | WO02030624 | 4/2002 |
| WO | WO2007090258 | 8/2007 |
| WO | WO2008064956 | 6/2008 |
| WO | WO2011096582 | 8/2011 |
| WO | WO2012156218 | 11/2012 |
| WO | WO2013116303 | 8/2013 |
| WO | WO2017063851 | 4/2017 |

\* cited by examiner

POWER TOOL INCLUDING AN OUTPUT POSITION SENSOR

RELATED APPLICATIONS

This application is a continuation of U.S. patent application Ser. No. 15/441,953, filed on Feb. 24, 2017, which claims priority to U.S. Provisional Patent Application No. 62/299,871, filed on Feb. 25, 2016, and claims priority to U.S. Provisional Patent Application No. 62/374,235, filed on Aug. 12, 2016, the entire contents of all of which are hereby incorporated by reference.

BACKGROUND

The present invention relates to monitoring a position of an anvil in an impacting tool.

SUMMARY

In some embodiments, a power tool is operated to achieve a desired output characteristic. For example, the power tool may be operated to achieve a particular torque, nut tension, etc. In some embodiments, a consistent torque output is generated over repeated trials of the same application by achieving a consistent number of impacts delivered to the anvil. In such embodiments, the power tool closely approximates the behavior of torque specific impact drivers and wrenches without requiring the use of a torque transducer. The more accurately the power tool determines the number of impacts delivered to the anvil, the more accurately the power tool will achieve a specific torque, or other output characteristic.

By monitoring a direct measurement of the anvil position, the power tool can detect impacts using an impact detection algorithm, and the detected impacts may be used in, for example, a blow counting mode and an advanced blow counting mode. In these and other modes, the power tool may stop, adjust, or otherwise control a motor based on the number of impacts detected. Therefore, the power tool is able to limit the tool's impacts to a consistent number based on the position of the anvil. The power tool may also implement an angular distance mode, a turn-of-nut mode, and a constant energy mode by directly monitoring the position of the anvil.

In one embodiment, the invention provides a power tool including a housing, an anvil supported by the housing, a motor positioned within the housing, and a hammer mechanically coupled to and driven by the motor. The hammer is configured to drive the anvil and deliver a plurality of impacts to the anvil. The power tool also includes an output position sensor. The power tool also includes a controller electrically coupled to the motor and to the output position sensor. The controller is configured to monitor an anvil position based on the output from the output position sensor, determine when an impact is delivered to the anvil based on the anvil position, and change operation of the power tool when a number of impacts delivered to the anvil exceeds an impact threshold.

In another embodiment the invention provides a power tool including a housing, an anvil supported by the housing, a motor positioned within the housing and configured to drive the anvil, and a hammer mechanically coupled to the motor. The hammer is configured to perform an impacting operation by delivering a plurality of impacts to the anvil. The power tool also includes an output position sensor and a controller. The controller is electrically coupled to the motor and to the output position sensor. The controller is configured to determine an anvil position based on an output from the output position sensor, calculate a parameter of the impacting operation, and compare the calculated parameter to a parameter threshold. The controller is also configured to change an operation of the power tool when the calculated parameter is greater than the parameter threshold.

Other aspects of the invention will become apparent by consideration of the detailed description and accompanying drawings.

DETAILED DESCRIPTION

Figure 1:
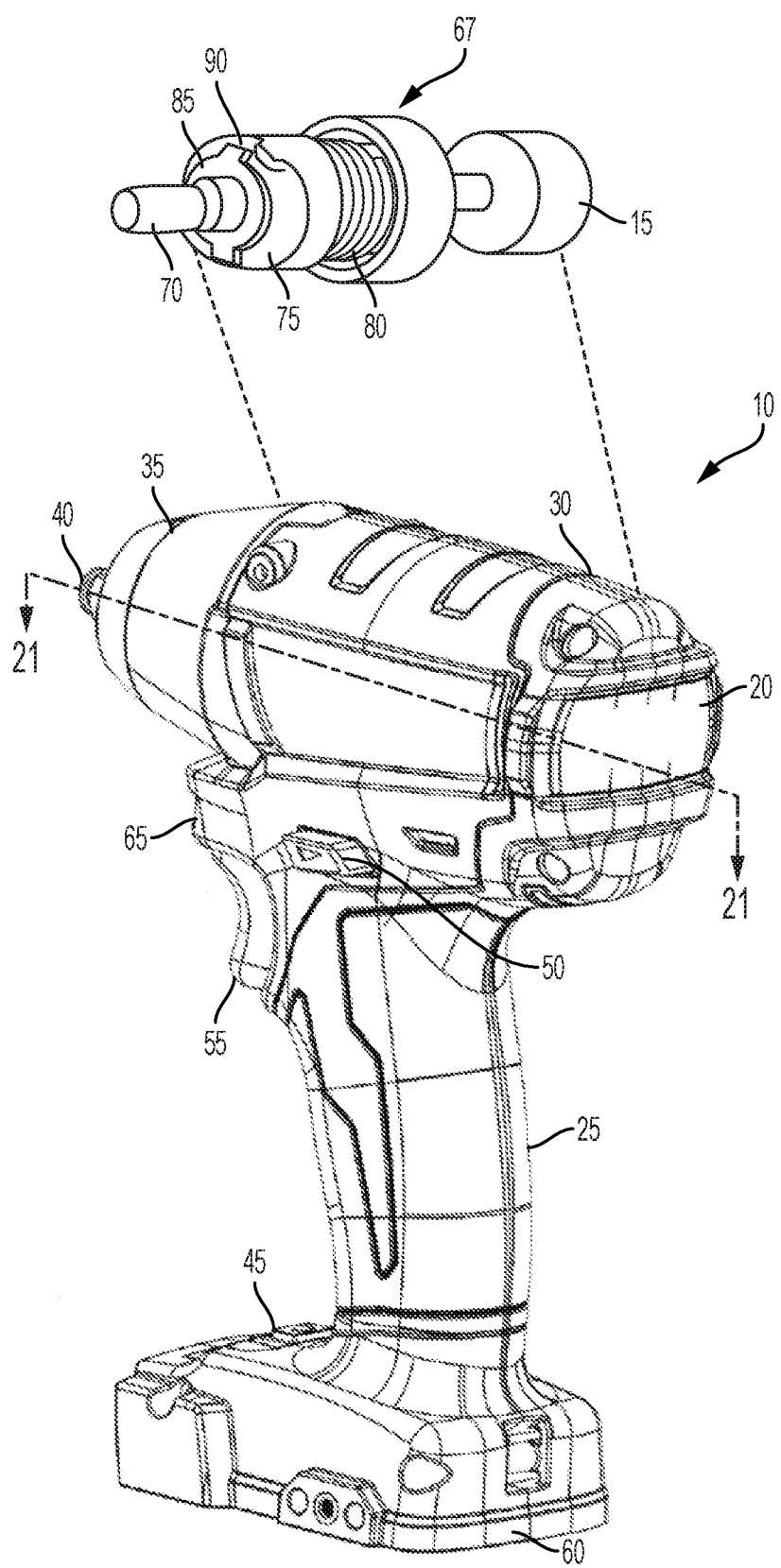
FIG. 1 illustrates a power tool according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a power tool 10 incorporating a direct current (DC) motor 15. In a brushless motor power tool, such as power tool 10, switching elements are selectively enabled and disabled by control signals from a controller to selectively apply power from a power source (e.g., battery pack) to drive (e.g., control) a brushless motor. The power tool 10 is a brushless impact wrench having a housing 20 with a handle portion 25 and motor housing portion 30. The motor housing portion 30 is mechanically coupled to an impact case 35 that houses an output unit 40. The impact case 35 forms a nose of the power tool 10, and may, in some embodiments, be made from a different material than the housing 20. For example, the impact case 35 may be metal, while the housing 20 is plastic. The power tool 10 further includes a mode select button 45, forward/reverse selector 50, trigger 55, battery interface 60, and light 65. Although the power tool 10 illustrated in FIG. 2 is an impact wrench, the present description applies also to other impacting tools such as, for example, a hammer drill, an impact hole saw, an impact driver, and the like.

Figure 21A:
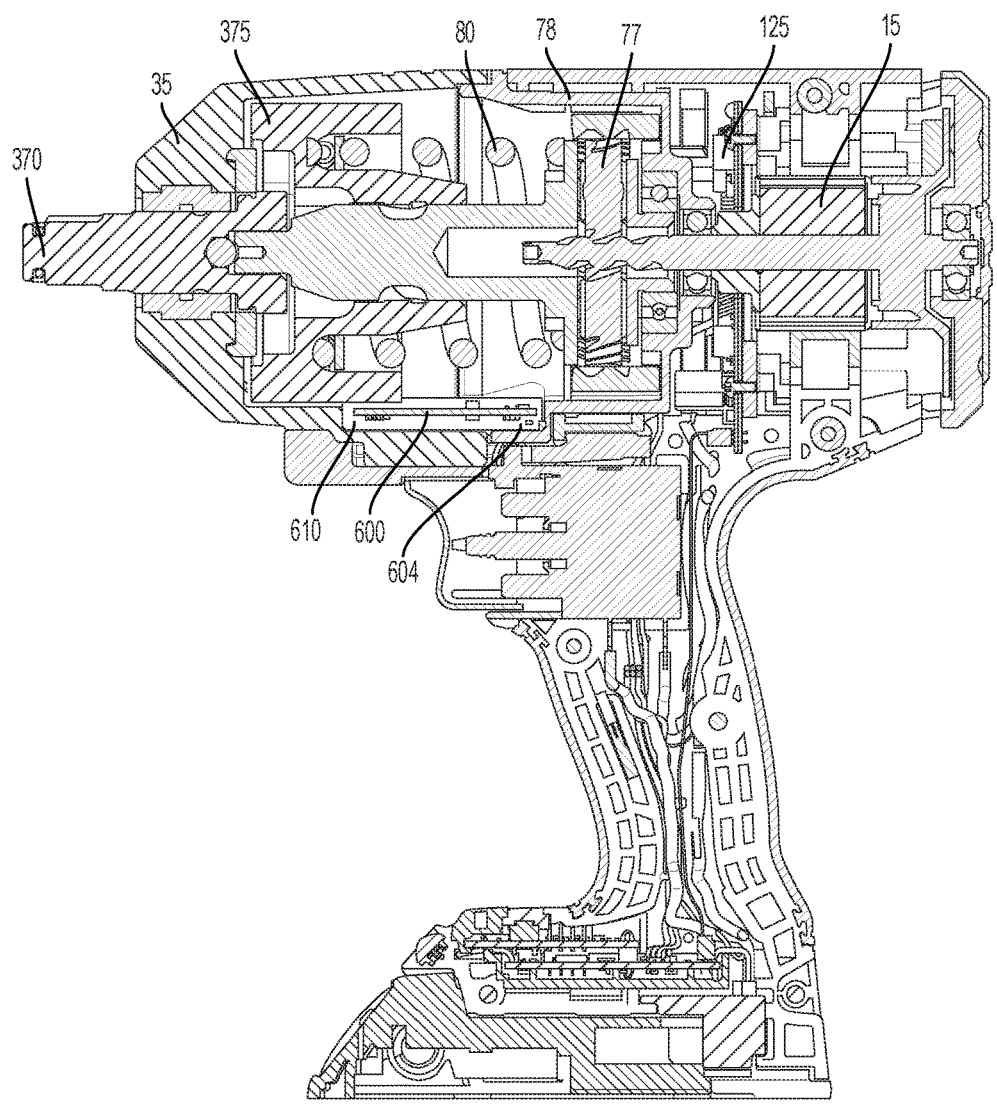
FIG. 21A is a cross-sectional view of the power tool taken along section line 21-21 of FIG. 1 and including an impact mechanism according to a fifth embodiment.
Figure 21B:
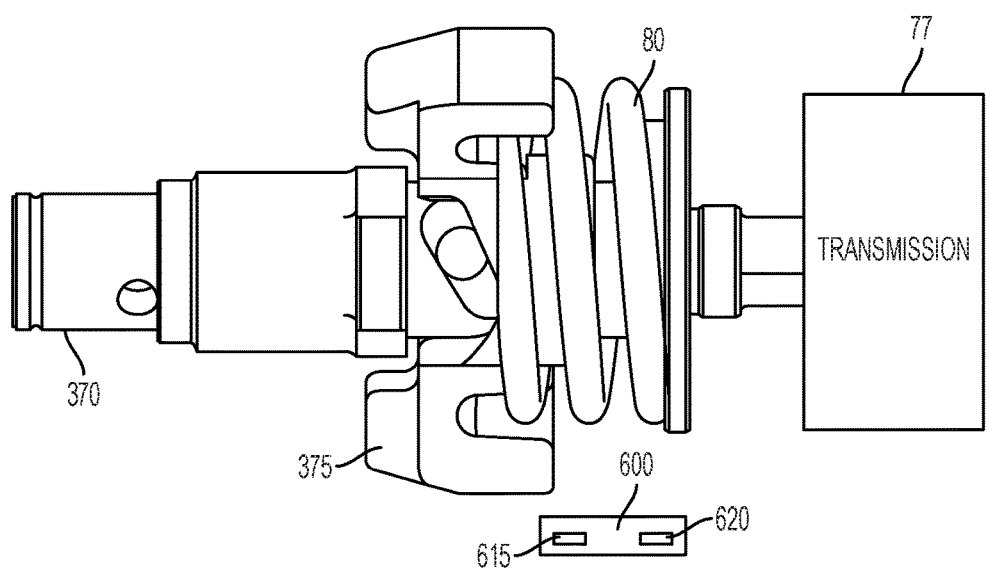
FIG. 21B is a side view of the isolated impact mechanism according to the fifth embodiment.
Figure 21C:
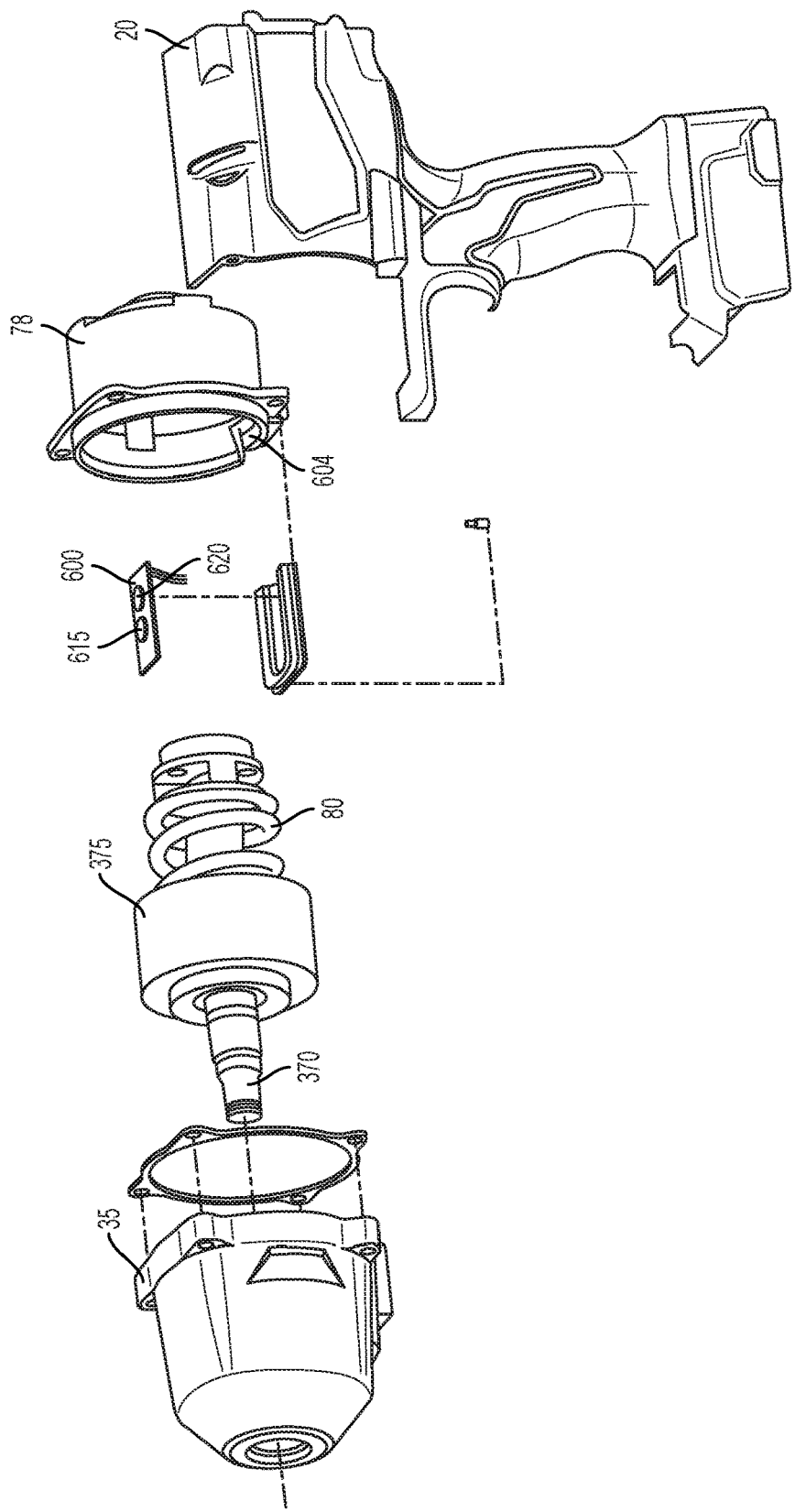
FIG. 21C is an exploded view of the impact mechanism according to the fifth embodiment.
Figure 21D:
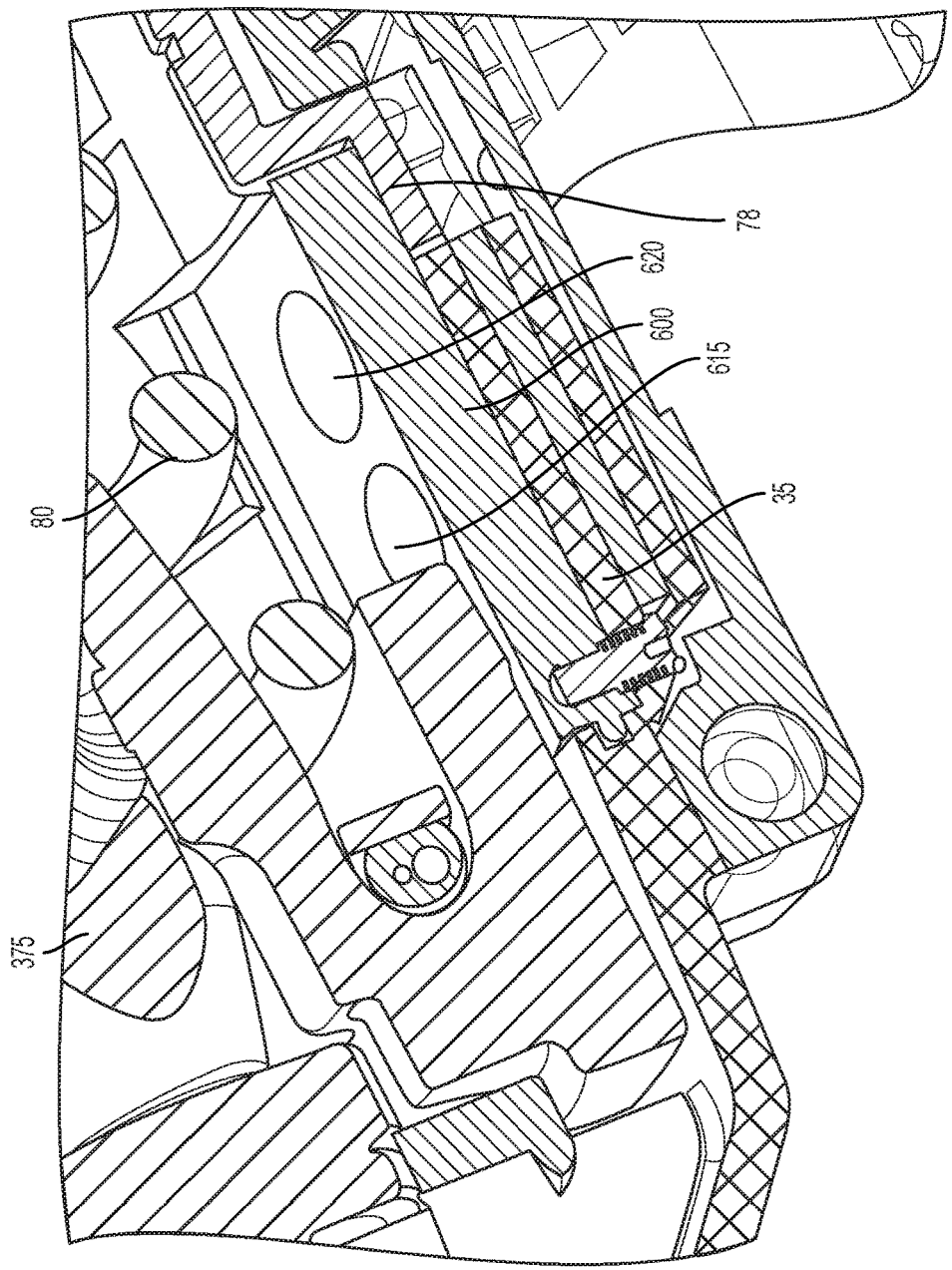
FIG. 21D is an exposed perspective view of a hammer detector according to the fifth embodiment.

The power tool 10 also includes an impact mechanism 67 including an anvil 70, and a hammer 75 positioned within the impact case 35 and mechanically coupled to the motor 15 via a transmission 77. The transmission 77 may include, for example, gears or other mechanisms to transfer the rotational power from the motor 15 to the impact mechanism 67, and in particular, to the hammer 75. The transmission 77 is supported by a gear case 78 (FIG. 21A) that in the illustrated embodiment is also coupled to the impact case 35. The gear case 78 may also be coupled to the housing 20. The hammer 75 is axially biased to engage the anvil 70 via a spring 80. The hammer 75 impacts the anvil 70 periodically to increase the amount of torque delivered by the power tool 10 (e.g., the anvil 70 drives the output unit 40). The anvil 70 includes an engagement structure 85 that is rotationally fixed with portions of the anvil 70. The engagement structure 85 includes a plurality of protrusions 90 (e.g., two protrusions in the illustrated embodiment) to engage the hammer 75 and receive the impact from the hammer 75. During an impacting event or cycle, as the motor 15 continues to rotate, the power tool 10 encounters a higher resistance and winds up the spring 80 coupled to the hammer 75. As the spring 80 compresses, the spring 80 retracts toward the motor 15, pulling along the hammer 75 until the hammer 75 disengages from the anvil 70 and surges forward to strike and re-engage the anvil 70. An impact refers to the event in which the spring 80 releases and the hammer 75 strikes the anvil 70. The impacts increase the amount of torque delivered by the anvil 70.

Figure 2:
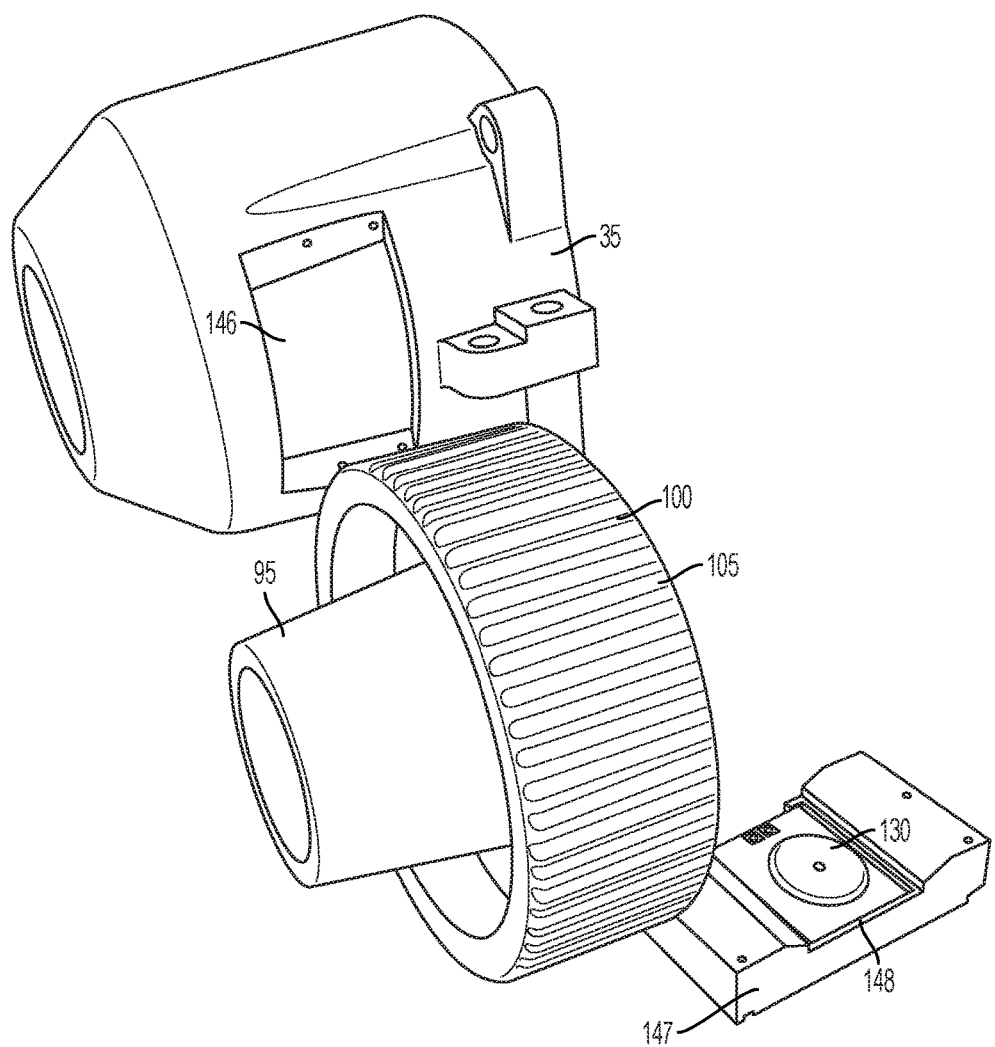
FIG. 2 illustrates a nose portion of the power tool of FIG. 1.
Figure 14:
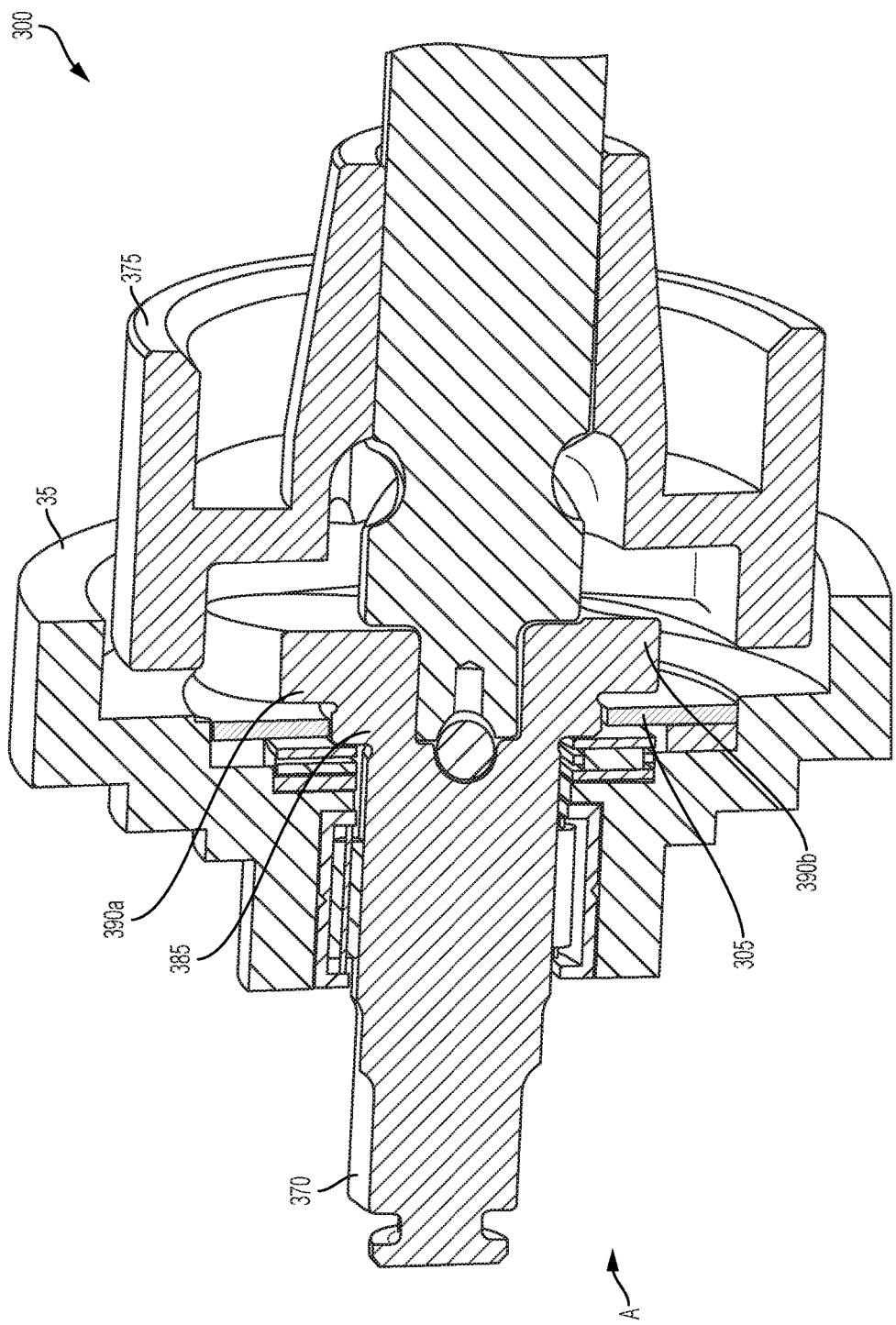
FIG. 14 is a lateral cross-section of an impact mechanism according to a second embodiment.
Figure 15:
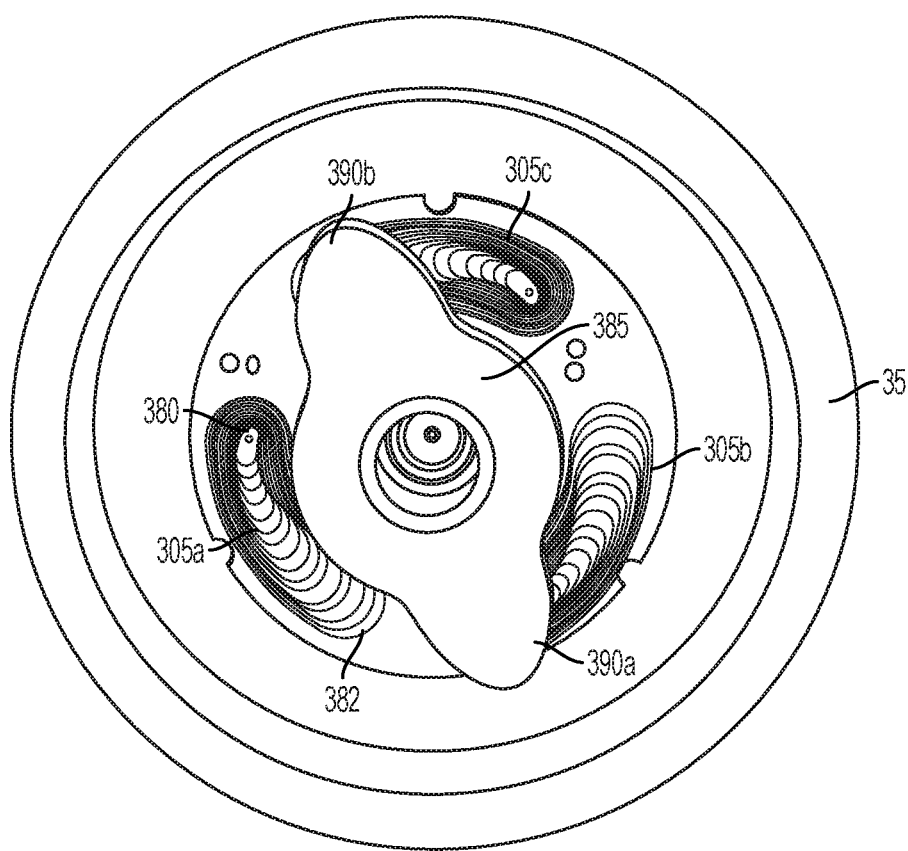
FIG. 15 is a front view of part of the impact mechanism according to the second embodiment and with a gear case removed.

As shown in FIG. 2, the impact wrench 10 also includes a cover 95 that is also rotationally fixed to the anvil 70 (i.e., the cover 95 does not rotate with respect to the anvil 70). The cover 95 includes a plurality of teeth 100 and grooves 105 evenly spaced around the surface of the cover 95. The teeth 100 and grooves 105 of the cover 95 allow sensors to determine the position, speed, and acceleration of the anvil 70 directly. In some embodiments, the cover 95 is integrally formed with the anvil 70. In some embodiments, the cover 95 is integrally formed with the engagement structure 85 such that the cover 95 and the engagement structure 85 form a single piece. In other embodiments, as shown in FIGS. 14-15 the impact wrench 10 does not include the cover 95.

Figure 3:
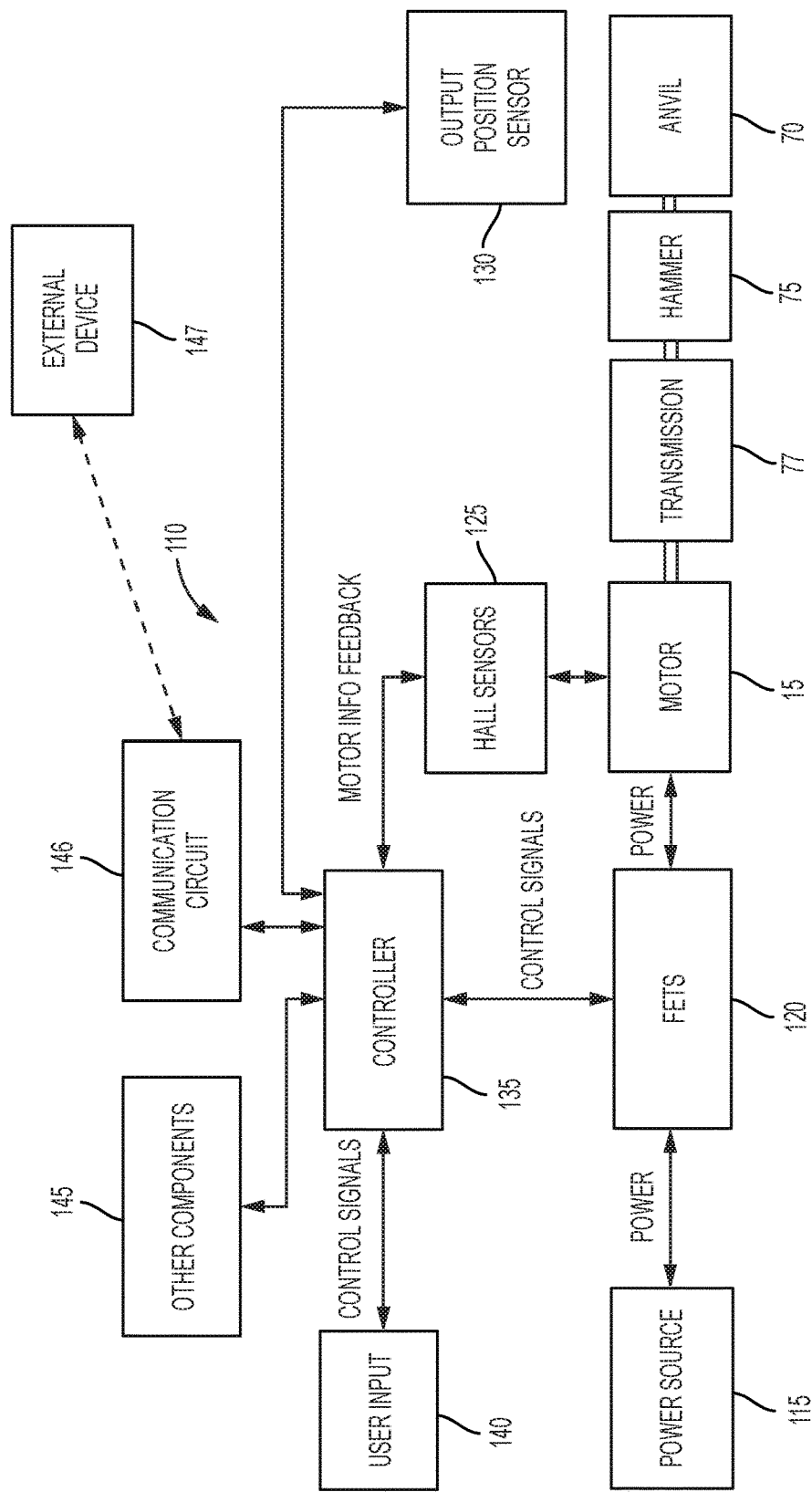
FIG. 3 illustrates a block diagram of the power tool.

FIG. 3 illustrates a simplified block diagram 110 of the brushless power tool 10, which includes a power source 115, Field Effect Transistors (FETs) 120, a motor 15, Hall Effect sensors 125 (also referred to simply as Hall sensors), an output position sensor 130, a controller 135, user input 140, and other components 145 (battery pack fuel gauge, work lights (LEDs), current/voltage sensors, etc.). The power source 115 provides DC power to the various components of the power tool 10 and may be a power tool battery pack that is rechargeable and uses, for instance, lithium ion cell technology. In some instances, the power source 115 may receive AC power (e.g., 120V/60 Hz) from a tool plug that is coupled to a standard wall outlet, and then filter, condition, and rectify the received power to output DC power.

Each Hall sensor 125 outputs motor feedback information, such as an indication (e.g., a pulse) of when a magnet of the rotor rotates across the face of that Hall sensor. Based on the motor feedback information from the Hall sensors 125, the controller 135 can directly determine the position, velocity, and acceleration of the rotor. In contrast to the direct measurement of the rotor position, the Hall sensors 125 can additionally provide indirect information regarding the position of the anvil 70. The output position sensor 130 outputs information regarding the position of the anvil 70. In the illustrated embodiment, the output position sensor 130 is an inductive sensor configured to generate an electromagnetic field and detect the presence (or proximity) of an object based on changes of the electromagnetic field. In some embodiments, the output position sensor 130 may also be referred to as a sensor assembly, an anvil sensor, or an anvil position sensor. In the illustrated embodiment, the output position sensor 130 is aligned with the cover 95 of the anvil 70. The output position sensor 130 detects when each tooth 100 of the cover 95 passes the electromagnetic field generated by the output position sensor 130. Because each tooth 100 is evenly separated by one of the grooves 105, the detection by the output position sensor 130 of each tooth 100 indicates that the anvil 70 has rotated a predetermined angular distance (e.g., 3 degrees). The output position sensor 130 generates a positive voltage every time a tooth 100 passes the electromagnetic field, and, in some embodiments, the output position sensor 130 generates a negative voltage every time one of the grooves 105 passes the electromagnetic field. When a plurality of position measurements for the anvil 70 are analyzed over time, other measurements regarding the anvil 70 can be derived (e.g., velocity, acceleration, etc.). Therefore, the output position sensor 130 provides direct information that the controller 135 uses to determine the position, velocity, and/or acceleration of the anvil 70 directly. In some embodiments, the output position sensor 130 may be used to provide an indirect measure of the rotor position and/or movement.

In the illustrated embodiment, the output position sensor 130 is housed within the impact case 35 at the nose of the power tool 10. The output position sensor 130 is positioned in front (e.g., closer to the output unit 40) of the transmission 77. Referring back to FIG. 2, the impact case 35 of the power tool 10 includes a hole 146 configured to receive a sensor block 147. The sensor block 147 includes a recessed portion 148 onto which the output position sensor 130 is fixed. The sensor block 147 is sized to fit within the hole 146 such that the perimeter of the sensor block 147 abuts the perimeter of the hole 146. When the sensor block 147 is positioned in the hole 146, a back surface of the sensor block 147 forms a smooth or flat surface with the rest of the nose 35 of the power tool 10. In other words, when the sensor block 147 is positioned in the hole 146, the sensor block 147 and the rest of the impact case 35 of the power tool 10 appear to form a single piece. In other embodiments, the recessed portion 148 forms an integral part of the rest of the impact case 35 of the power tool 10, and the output position sensor 130 is placed on an inner surface of the impact case 35 of the power tool 10. In other embodiments, such as those illustrated in FIGS. 14-15, the output position sensor 130 may be incorporated into the power tool 10 differently.

The controller 135 also receives user controls from user input 140, such as by selecting an operating mode with the mode select button 45, depressing the trigger 55 or shifting the forward/reverse selector 50. In response to the motor feedback information and user controls, the controller 135 transmits control signals to control the FETs 120 to drive the motor 15. By selectively enabling and disabling the FETs 120, power from the power source 115 is selectively applied to stator coils of the motor 15 to cause rotation of a rotor. Although not shown, the controller 135, output position sensor 130, and other components of the power tool 10 are electrically coupled to the power source 115 such that the power source 115 provides power thereto.

In the illustrated embodiment, the controller 135 is implemented by an electronic processor or microcontroller. In some embodiments, the processor implementing the controller 135 also controls other aspects of the power tool 10 such as, for example, operation of the work light 65 and/or the fuel gauge, recording usage data, communication with an external device, and the like. In some embodiments, the power tool 10 is configured to control the operation of the motor based on the number of impacts executed by the hammer portion of the power tool 10. The controller 135 monitors a change in acceleration and/or position of the anvil 70 to detect the number of impacts executed by the power tool 10 and control the motor 15 accordingly. By monitoring the anvil position directly, the controller 135 can effectively control the number of impacts over the entire range of the tool's battery charge and motor speeds (i.e., regardless of the battery charge or the motor speed).

The power tool 10 operates in various modes. Each mode enables different features to be executed by the power tool 10 and facilitates certain applications for the user. The current operational mode of the power tool 10 is selected by the user via user input 140. To receive the mode selection, the user input 140 may include manually-operable switches or buttons on an exterior portion of the power tool 10 (e.g., mode select button 45).

In some embodiments, the power tool 10 includes a communication circuit 146 (e.g., a transceiver or a wired interface) configured to communicate with an external device 147 (e.g., a smartphone, a tablet computer, a laptop computer, and the like). The external device 147 generates a graphical user interface (see, e.g., FIG. 10) that receives various control parameters from a user. The graphical user interface presents a mode profile to the user. The mode profile includes a group of select features and selectors associated with each feature. For example, a first mode profile may include a motor speed feature and a work light feature. The first mode profile further defines specific parameter values for the motor speed and a brightness for the work light. The graphical user interface receives selections from a user specifying which features are included in each mode profile and defining the parameter values for the selected features. The parameters may be specified as absolute values (e.g., 1500 RPM or 15 revolutions), as percentages (e.g., 75% of maximum RPM), or using another scale (e.g., joint stiffness between 1 and 10) that the controller 135 can convert into absolute values for controlling the operation of the power tool 10.

The graphical user interface also receives an indication from the user to send a specific mode profile to the power tool 10. The external device then sends the mode profile to the power tool 10. The power tool 10 receives the mode profile and stores the mode profile in a memory of the power tool 10 (e.g., a memory of the controller 135 and/or a separate memory). The power tool 10 (e.g., the controller 135) then receives a selection of an operational mode for the power tool 10 and detects a depression of the trigger 55. The controller 135 then operates the power tool 10 according to the selected operational mode. Based on the selected operational mode, the controller 135 may cease operation of the power tool 10 under different conditions. For example, the controller 135 may stop driving the motor 15 after a predetermined number of impacts have been delivered to the anvil 70, and/or the controller 135 may cease operation of the power tool 10 when a release of the trigger 55 is detected by the controller 135, even if the power tool 10 is in the middle of an operation and/or task.

In the illustrated embodiment, the power tool 10 can operate in a blow counting mode, an advanced blow counting mode, an angular distance mode, a turn-of-nut mode, and a constant energy mode. In some embodiments, each of these modes can be considered a feature that can be incorporated into a mode profile. As discussed above, each mode profile can have two or more features that can be used simultaneously or sequentially to control operation of the power tool 10. Similarly, two or more of these modes can be combined and used within a single mode profile for simultaneous and/or sequential control of the power tool 10.

Figure 4:
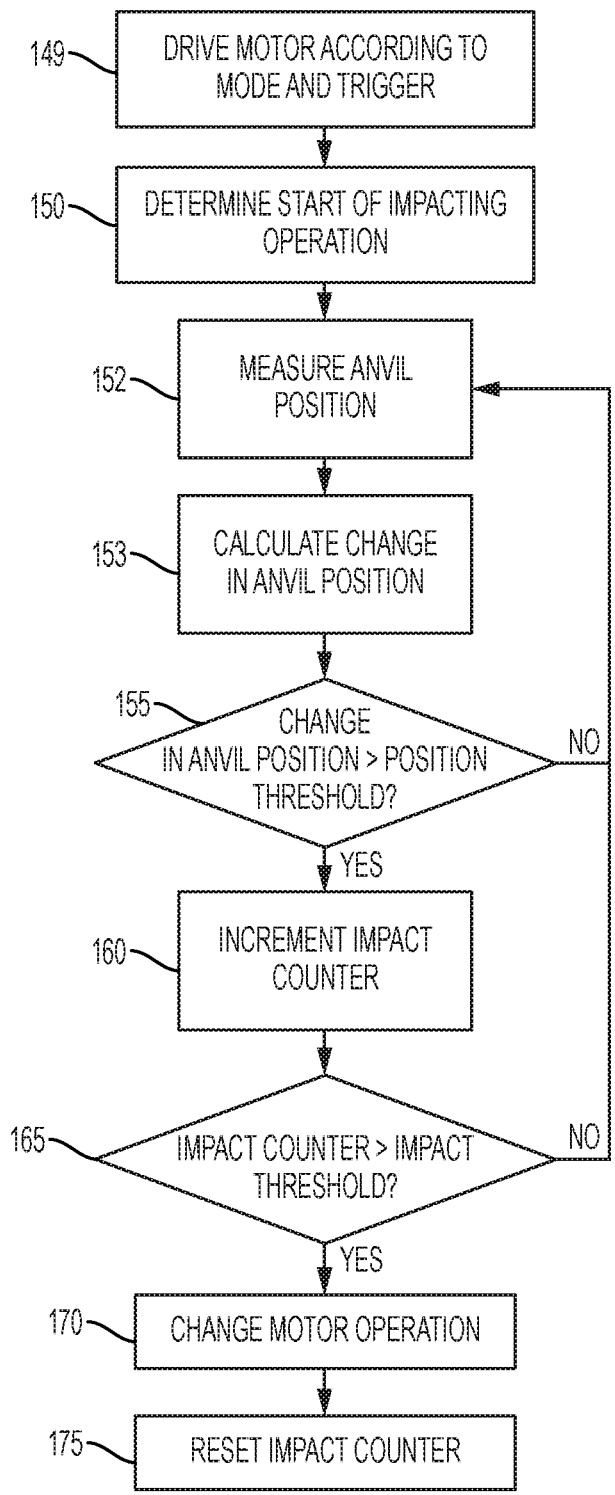
FIG. 4 is a flowchart illustrating an operation of the power tool in a blow counting mode.

FIG. 4 illustrates the operation of the power tool 10 in the blow counting mode.

During the blow counting mode, the controller 135 drives the motor 15 according to a selected mode and a trigger pull (step 149). The controller 135 then determines that an impacting operation has begun by determining whether the motor current is greater than or equal to a current threshold (step 150). When the motor current is greater than or equal to the current threshold, the controller determines that an impacting operation has begun. Otherwise, if the motor current remains below the current threshold, the controller 135 determines that a non-impacting (e.g., a continuous) operation is being executed and the controller 135 continues to drive the motor according to the mode and the trigger pull. In other embodiments, the controller 135 may determine that an impacting operation has begun by monitoring other parameters of the power tool 10 such as, for example, motor speed. The controller 135 then monitors the position of the anvil 70 through periodic anvil position measurements to determine the number of impacts received by the anvil 70 from the hammer 75 until a predetermined number of impacts are delivered to the anvil 70. As discussed previously, the motor 15 winds up the spring 80. As the spring 80 winds up, the load to the motor 15 increases. The motor 15 then slows down (i.e., decelerates) in response to the increasing load. Eventually, the hammer 75 disengages the anvil 70 and the spring 80 releases. When the spring 80 releases, the hammer 75 surges forward and strikes the anvil 70, thereby generating an impact and causing the anvil 70 to rotate at least a predetermined amount (e.g., a position threshold). When the controller 135 detects that the anvil 70 has rotated by the predetermined amount, the controller 135 increments an impact counter. The operation of the motor 15 continues until a particular number of impacts are delivered to the anvil 70.

As shown in FIG. 4, in the blow counting mode, the controller 135 measures the position of the anvil 70 using the output position sensor 130 in step 152. The controller 135 calculates the change in position of the anvil 70 (e.g., by comparing the current anvil position to a previous anvil position) (step 153), and determines whether the change in anvil position is greater than a position threshold (step 155). The position threshold is indicative of the minimum amount the anvil 70 is rotated when the hammer 75 delivers an impact. If the controller 135 determines that the change in anvil position does not exceed the position threshold, the controller 135 continues operation of the motor 15 and monitors the anvil position (step 152). When the controller 135 detects that the change in anvil position is greater than the position threshold, the controller 135 increments an impact counter (step 160). The controller 135 then determines whether the current impact counter is greater than an impact threshold (step 165). The impact threshold determines the number of impacts to be delivered to the anvil 70 before the operation of the power tool 10 is changed. If the current impact counter does not exceed the impact threshold, the controller 135 continues to operate the motor 15 until the impact counter reaches a desired number of impacts.

When the impact counter is greater than the impact threshold, the controller 135 changes the operation of the motor 15 (step 170) and resets impact counter (step 175). For instance, changing the motor operation can include stopping the motor 15, increasing or decreasing the speed of the motor 15, changing the rotation direction of the motor 15, and/or another change of motor operation. As mentioned previously, in some embodiments, the blow counting mode can be a feature that is combined with other features within a single mode. In such embodiments, the particular change in motor operation can depend on the other features used in combination with the blow counting mode. For example, a mode profile may combine a driving speed feature with the blow counting mode such that the driving speed of the motor changes based on the number of detected impacts. For example, a power tool 10 may be configured to rotate at a slow speed until five impacts are delivered, and then increase the driving speed to a medium speed until ten additional impacts are delivered, and finally increase at nearly the maximum speed until five additional impacts are delivered. In this example, the power tool 10 delivers a total of twenty impacts, and operates in a slow speed, a medium speed, and a high speed. In other embodiments, other features are combined with the blow counting mode.

In the advanced blow counting mode, the power tool 10 operates similarly to when the power tool 10 is in the blow counting mode as described above with respect to FIG. 4. However, in the advanced blow counting mode, the controller 135 only begins counting the number of impacts delivered to the anvil 70 after a joint between a surface and a fastener reaches a predetermined stiffness. The controller 135 determines the stiffness of the joint based on the rotational distance traveled by the anvil 70 in response to a received impact from the hammer 75. The controller 135 determines a low stiffness when the rotational distance traveled by the anvil 70 is relatively high. As the rotational distance traveled by the anvil 70 decreases, the stiffness calculated by the controller 135 increases. In some embodiments, the power tool 10 calibrates a measure of stiffness by running the power tool 10 unloaded. The joint stiffness calculated on a specific joint is then relative to the stiffness calculated when the power tool 10 is unloaded.

Figure 5:
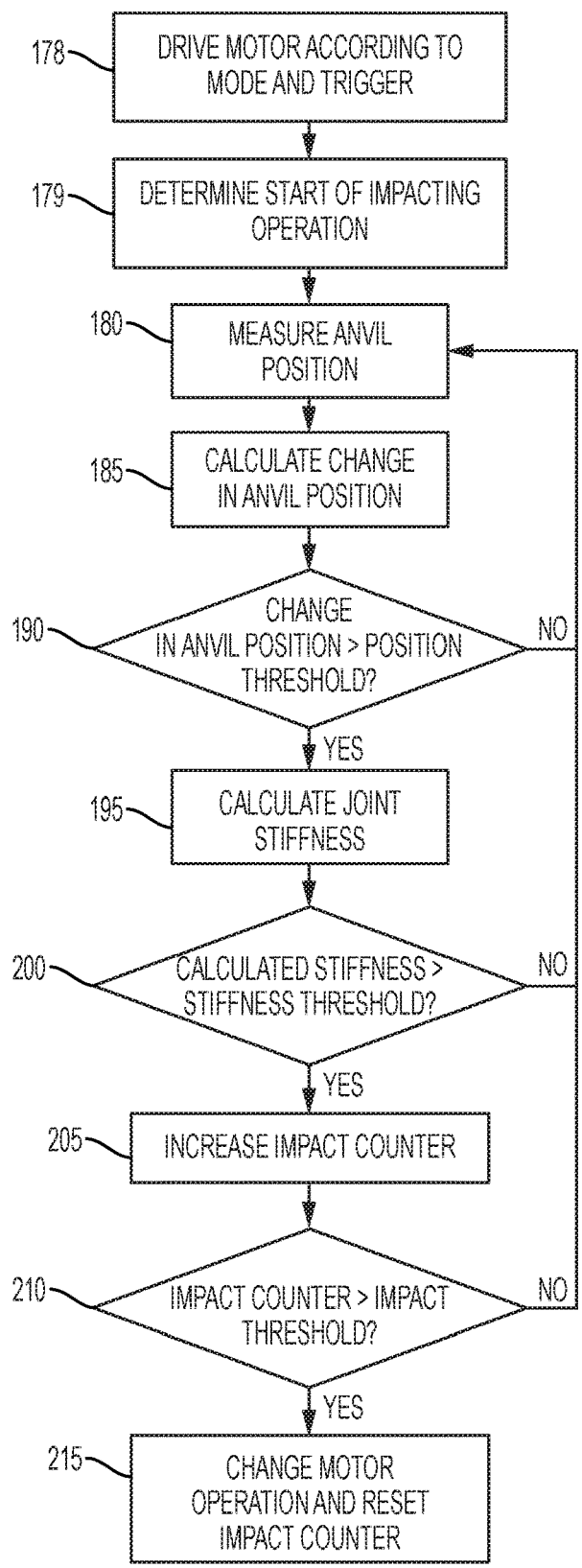
FIG. 5 is a flowchart illustrating an operation of the power tool in an advanced blow counting mode.

FIG. 5 illustrates a method performed by the controller 135 when the power tool 10 operates in the advanced blow counting mode, where impacts are counted only after the joint reaches a predetermined stiffness. As shown in FIG. 5, the controller 135 drives the motor 15 according to a selected mode and a trigger pull (step 178). The controller 135 then determines the start of an impacting operation (step 179) by monitoring motor current. In particular, the controller 135 determines that an impacting operation has begun when the motor current is greater than or equal to a current threshold. In other embodiments, the controller 135 may monitor other parameters (e.g., motor speed) to determine when an impacting operation starts. The controller 135 also measures the position of the anvil 70 as performed with respect to FIG. 4 (step 180). The controller 135 then calculates a change in anvil position based on a current anvil position and a previous anvil position (step 185). The controller 135 proceeds to determine whether the change in anvil position is greater than the position threshold, thus indicating an impact has been delivered to the anvil 70 (stop 190). If the change in anvil position is not greater than the position threshold, the controller 135 continues driving the motor and monitoring the anvil position (step 180).

On the other hand, if the change in anvil position is greater than the position threshold, the controller 135 then calculates a joint stiffness based on the change in anvil position (step 195). In other words, the controller 135 first determines whether an impact has occurred, and if an impact has occurred, the controller 135 then uses the calculated change in anvil position to calculate the stiffness of the joint. The controller 135 then determines whether the calculated stiffness is greater than a stiffness threshold (step 200). If the calculated stiffness is not yet greater than the stiffness threshold, the controller 135 continues driving the motor and monitoring the anvil position (step 180). However, if the calculated stiffness is greater than the stiffness threshold, the controller 135 increments the impact counter by one (step 205). The controller 135 then determines whether the impact counter is greater than the impact threshold (step 210) similar to step 165 of FIG. 4. If the impact counter is not yet greater than the impact threshold, the controller 135 continues to drive the motor and monitor the anvil position (step 180). Once the impact counter is greater than the impact threshold, the controller 135 changes motor operation and resets the impact counter (step 215) as described above with respect to FIG. 4. As discussed previously, in some embodiments, the advanced blow counting mode is one of the features used within a mode profile. In such embodiments, the advanced blow counting mode may be combined with other configurable features provided in a mode such as, for example, driving speed of the motor, target torque for a fastener, and the like.

Figure 6:
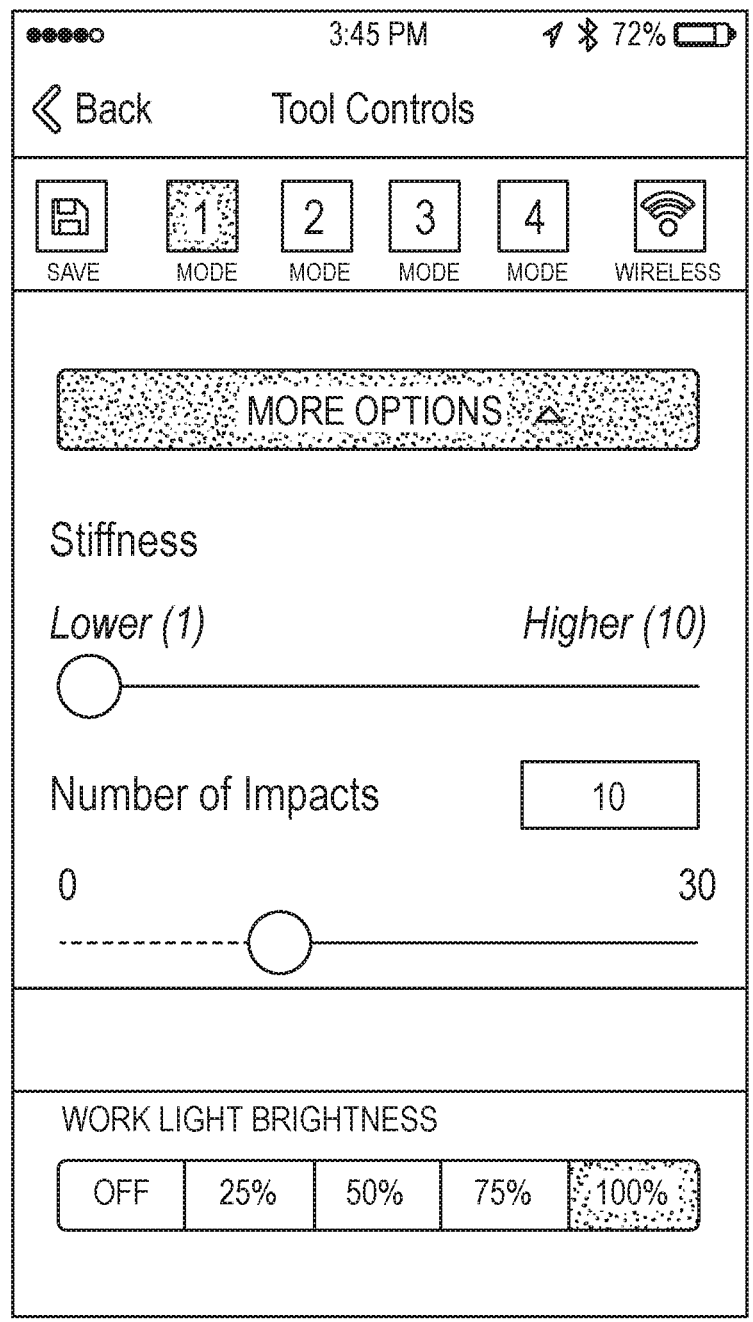
FIG. 6 is an exemplary screenshot of a user interface generated by an external device.

FIG. 6 illustrates an exemplary screenshot of a user interface generated by an external device in communication with the power tool 10. An external device can, in some embodiments, be used to program the operation of the power tool 10. For example, as shown in FIG. 6, the external device can generate a graphical user interface including a plurality of selectors (e.g., sliders) configured to receive user selections of, for example, a desired joint stiffness (to specify the stiffness threshold used in step 200 of FIG. 5), and a number of impacts to be delivered to the anvil 70 before the motor operation is changed. In some embodiments, the user does not specify each parameter used by the controller 135. Rather, the graphical user interface receives characteristics of the fastening application (e.g., type of fastener, material, etc.) from the user and the external device determines the parameters to be used by the controller 135. While FIG. 6 illustrates a selector for joint stiffness and a selector for an impact threshold, when the power tool 10 operates in the blow counting mode, the selector for joint stiffness is not necessary and may, therefore, be omitted.

Figure 7:
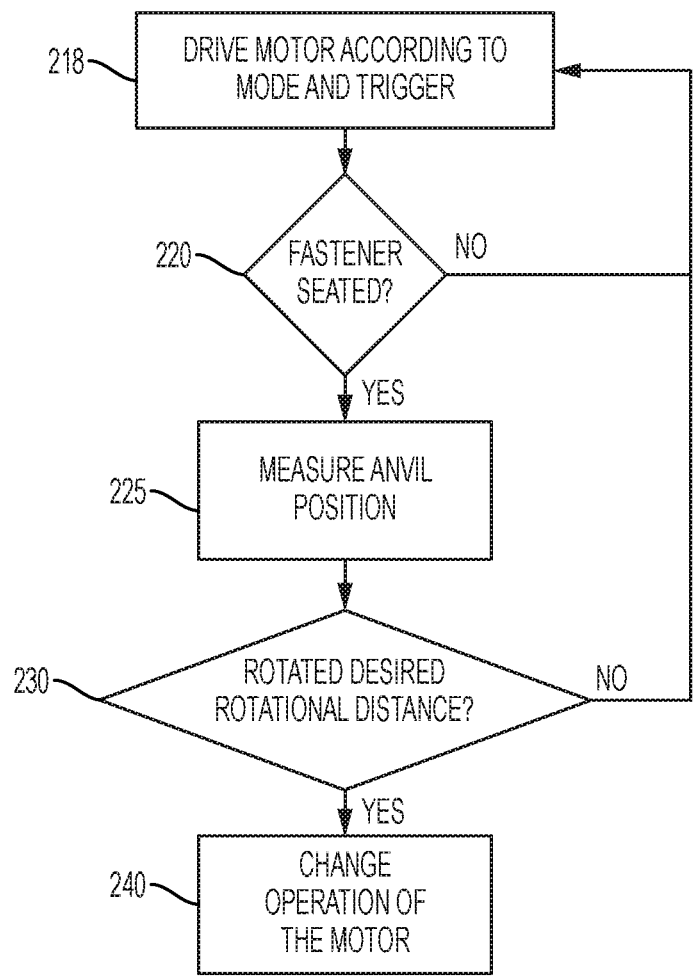
FIG. 7 is a flowchart illustrating an operation of the power tool in an angular distance mode.

FIG. 7 illustrates the operation of the power tool 10 when the power tool 10 operates in the angular distance mode. In the angular distance mode, the controller 135 can also determine when the anvil has rotated a predetermined rotational distance, and can control the motor 15 based on the angular position of the anvil 70. As shown in the flowchart of FIG. 7, the controller 135 drives the motor 15 according to a selected mode and a detected trigger pull (step 218). The controller 135 also detects seating of the fastener (step 220). In the illustrated embodiment, the controller 135 determines that a fastener is seated by monitoring an angular displacement of the anvil 70 in response to each impact. As the fastener becomes seated, the amount of angular displacement of the anvil 70 decreases. Therefore, when the angular displacement of the anvil 70 in response to an impact is less than a particular angular displacement threshold, the controller 135 determines that the fastener has seated. Until seating of the fastener has occurred, the controller 135 continues to operate the motor 15 according to the selected mode and detected trigger pulls. When the controller 135 determines that the fastener has seated, the controller 135 measures the position of the anvil using the output position sensor 130 (step 225), and continues to operate the motor 15 in the desired direction until the anvil 70 has rotated the desired rotational distance (step 218). If the controller 135 determines that the anvil 70 has not yet rotated the desired rotational distance after seating of the fastener, the controller 135 continues to operate the motor 15 according to pull of the trigger 55 (step 235). On the other hand, when the controller 135 determines that the anvil 70 has rotated the desired rotational distance after seating of the fastener, the controller 135 changes operation of the motor 15 (step 240). As explained above with respect to FIG. 4, changing the operation of the motor includes changing a direction of the motor, stopping the motor, changing the rotational speed of the motor 15, and changes based on the selected mode of operation for the power tool 10.

Figure 8:
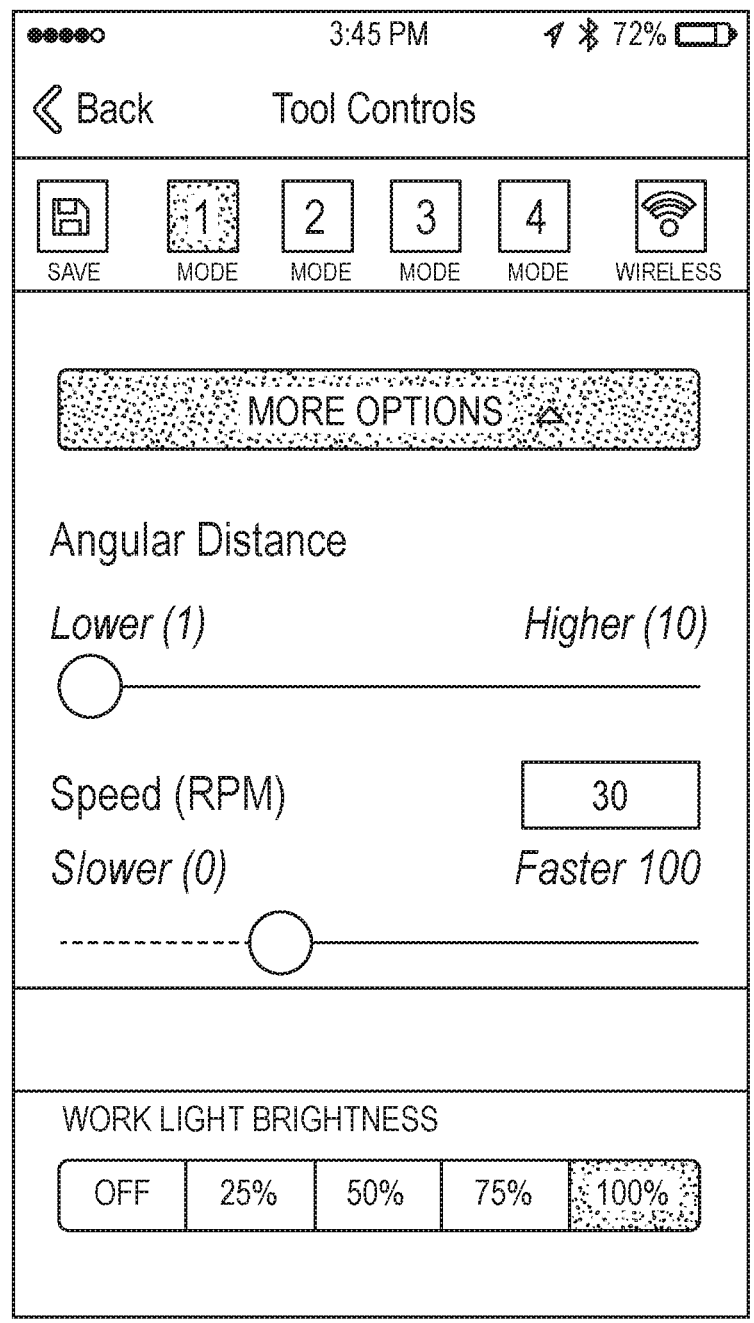
FIG. 8 is another exemplary screenshot of the user interface generated by the external device.

FIG. 8 illustrates an exemplary screenshot of a graphical user interface configured to receive a user selection of a desired angular distance after seating of the fastener. As shown in FIG. 8, the graphical user interface can receive a parameter selection from the user specifying the desired rotational distance and the desired change to the operation of the motor once the anvil 70 rotates by the desired rotational distance. Rotating the anvil 70 by a predetermined rotational distance after the seating of the fastener may enable the controller 135 to fasten a fastener to a specified fastener tension. In some embodiments, instead of changing the motor operation after the anvil 70 has rotated by the predetermined rotational distance, the controller 135 may calculate a fastener tension and change operation of the motor 15 once a particular fastener tension is reached. For example, the controller 135 may calculate the fastener tension based on the rotational displacement of the anvil 70 and may compare the calculated fastener tension to a predetermined tension threshold. The controller 135 may continue to operate the motor 15 until the predetermined tension threshold is reached. When the predetermined tension threshold is reached, the controller 135 may change operation of the motor 15.

Figure 9:
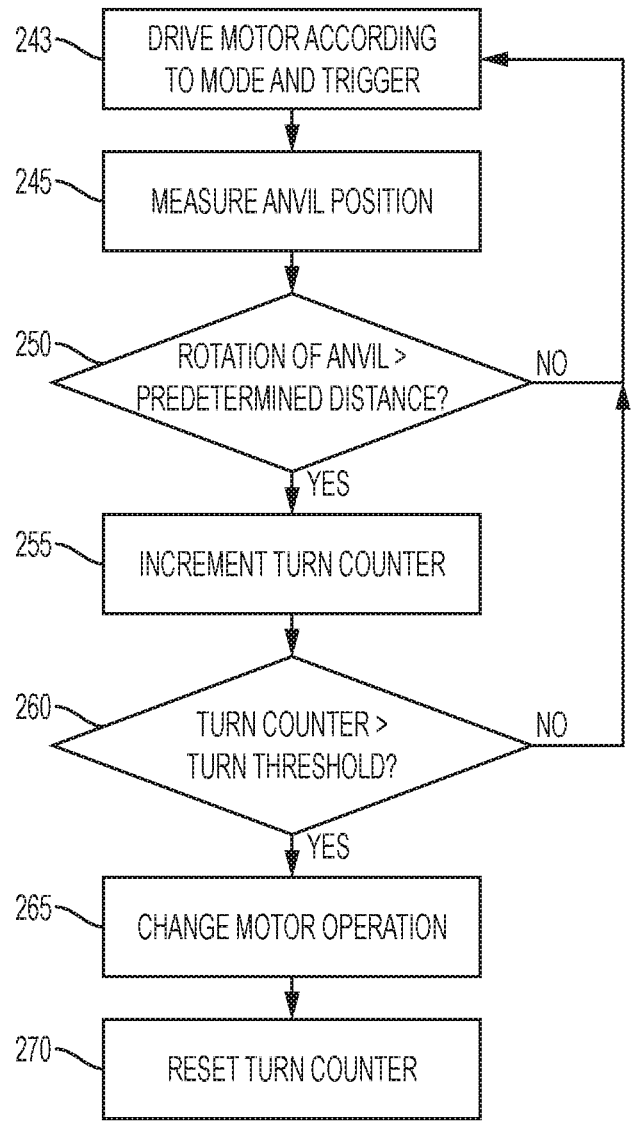
FIG. 9 is a flowchart illustrating an operation of the power tool in a turn-of-nut mode.
Figure 10:
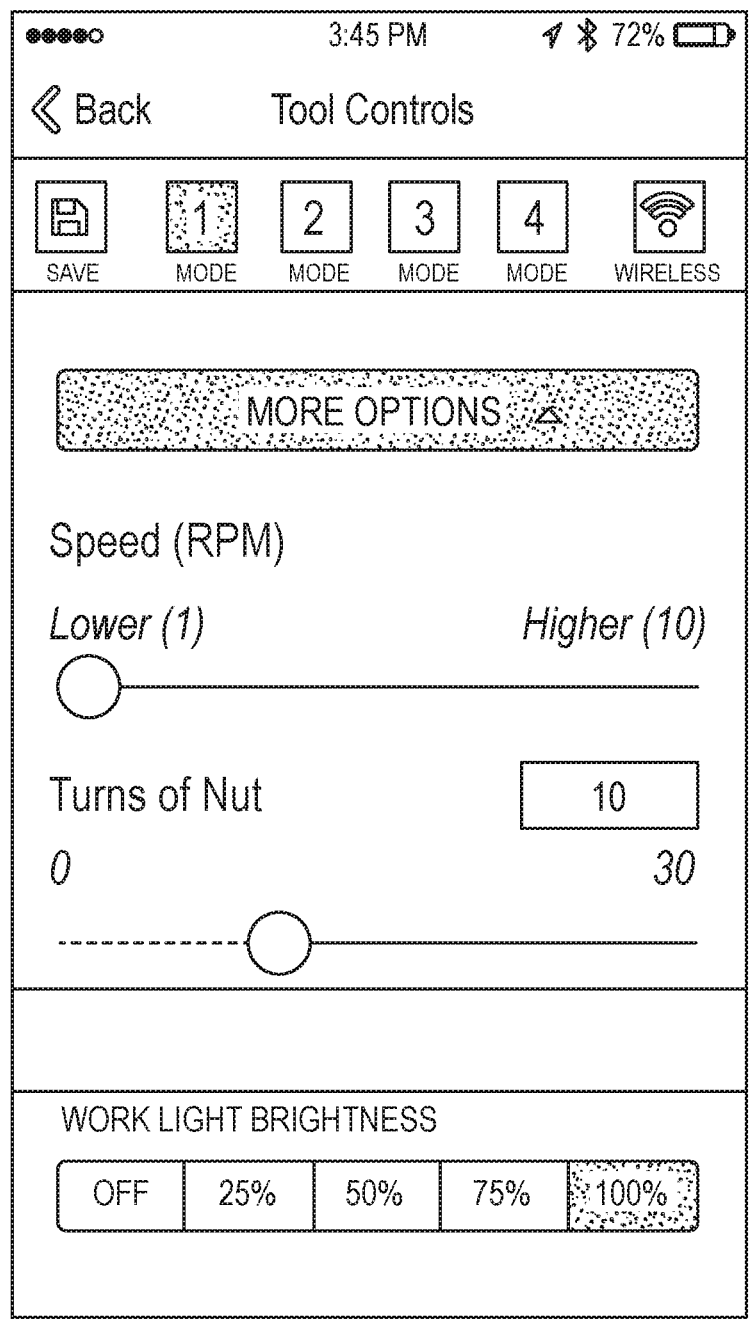
FIG. 10 is another exemplary screenshot of the user interface generated by the external device.

FIG. 9 illustrates the operation of the power tool 10 during a turn-of-nut mode and FIG. 10 illustrates an exemplary screenshot of a user interface configured to receive a selection of parameter values for the turn-of-nut mode. As shown in FIG. 10, the graphical user interface can receive from a user a target number of turns to be performed on the nut for the nut to be tightened and a motor speed parameter. As an example, the target number of turns are provided to the user based on, for example, engineering specifications for a particular job or task. During the turn-of-nut mode, the controller 135 drives the motor 15 according to the selected mode and detected trigger pull (step 243). The controller 135 also measures the position of the anvil using the output position sensor 130 (step 245) and determines whether the anvil 70 has rotated a predetermined distance (step 250) by, for example, monitoring a change in the anvil position. If the anvil 70 has not rotated the predetermined distance, the controller 135 continues to operate the motor 15. The predetermined distance is indicative of a single turn, or fraction of a turn, performed by the nut. Therefore, when the anvil 70 has rotated the predetermined distance, the controller 135 increments a turn counter by one (step 255). The controller 135 then determines if the turn counter is greater than a turn threshold (step 260). The turn threshold is indicative of the user-specified number of turns to be performed for the nut to be tightened. If the turn counter is not greater than the turn threshold, the controller 135 continues to operate the motor 15 and returns to step 245. When the turn counter is greater than the turn threshold, the controller 135 changes the operation of the motor 15 (step 265) as discussed above with respect to FIG. 4, and resets the turn counter (step 270). For instance, with reference to FIG. 10, the motor 15 will change to the speed specified by the motor speed parameter slider in step 265.

In some embodiments, the user may not specify the number of turns to be performed, but may instead specify a total angle from the first impact. In such embodiments, the user specified total angle may be used as the predetermined distance compared to the rotation of the anvil 370 at step 250. When the controller 135 determines that the anvil 370 has rotated the desired total angle from the first impact (e.g., when the rotation of the anvil 370 exceeds the predetermined distance), the controller 135 proceeds to step 265 to change the motor operation. In such embodiments, a turn counter does not need to be used.

Figure 11:
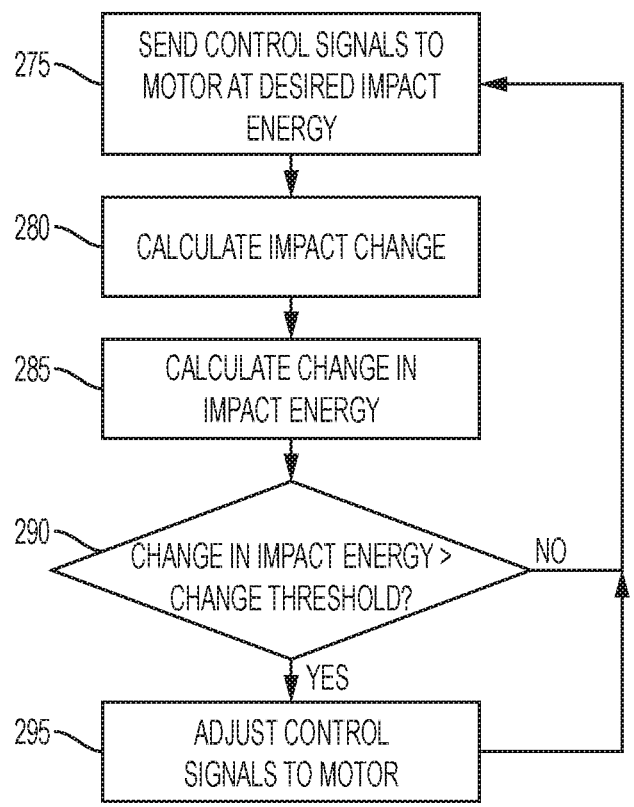
FIG. 11 is a flowchart illustrating an operation of the power tool in a constant energy mode.

FIG. 11 illustrates operation of the power tool 10 during the constant energy mode. As shown in FIG. 11, the controller 135 provides control signals to drive the motor 15 according to the selected mode, trigger pull, and desired impact energy (step 275) and calculates an impact energy (step 280). The impact energy is calculated based on, for example, the rotation of the motor 15, the change in anvil position in response to receiving an impact from the hammer 75, the change in anvil position when no impact is received, and the like. The controller 135 then calculates a change in impact energy based on previous calculations of the impact energy (step 285), and determines whether the change in impact energy is greater than an energy change threshold (step 290). If the impact energy change is not greater than the energy change threshold, the controller 135 continues to operate the motor 15 in the same manner (step 275). If, however, the impact energy change is greater than the energy change threshold, the controller 135 adjusts a PWM signal used to control the motor 15 such that the impact energy remains approximately constant (step 295). For instance, the PWM duty cycle is increased to increase the impact energy and decreased to decrease the impact energy. The constant energy mode thus provides closed-loop operation for the power tool 10. The constant energy mode may be useful for impact hole saws, for example, to operate at a constant energy while cutting through material. The constant energy mode may also be useful for impact wrenches to tighten fasteners at an approximately constant energy.

Figure 12:
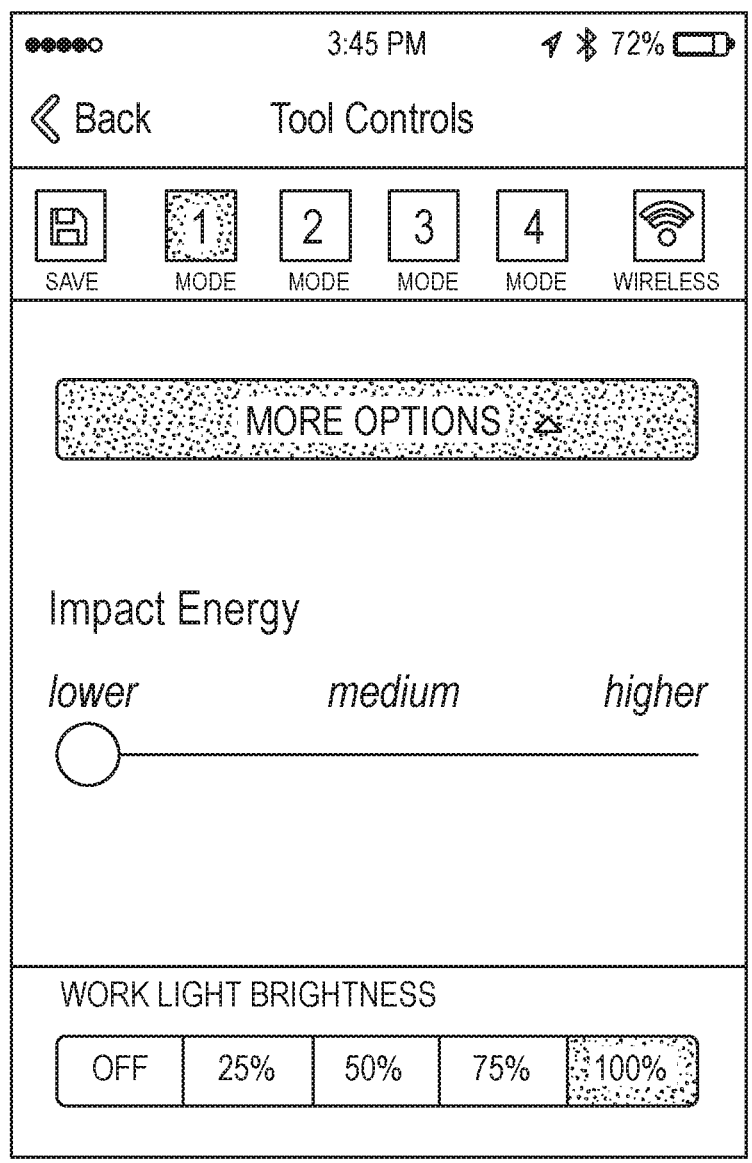
FIG. 12 is another screenshot of the user interface generated by the external device.

As shown in FIG. 12, the graphical user interface on the external device may receive a selection of whether a constant energy mode is desired (e.g., on/off toggle (not shown)) and a level of impact energy (e.g., high impact energy, medium impact energy, or low impact energy), instead of receiving a specific impact energy for use in the constant energy mode. In other embodiments, the graphical user interface may receive a specific impact energy to be used for the constant energy mode.

With respect to FIGS. 4-12, the controller 135 may also use the output signals from the Hall effect sensors 125 in combination with the output signals from the output position sensor 130 to control operation of the motor 15. For example, when the controller 135 detects that the motor 15 is no longer operating (e.g., using the signals from the Hall effect sensors 125), the controller 135 resets the impact counter and the turn counter to zero to begin the next operation, even if, for example, the impact threshold and/or the turn threshold was not reached. The controller 135 can also determine that the motor 15 is no longer executing impacting events when the time between consecutive impacting events exceeds a predetermined end-of-impacting threshold. The time value used as the end-of-impacting threshold is, for example, determined experimentally by measuring the time the power tool 10 takes to complete an impacting event when running in the power tool's lowest impacting speed and while powered with a battery that has low battery charge.

Figure 13:
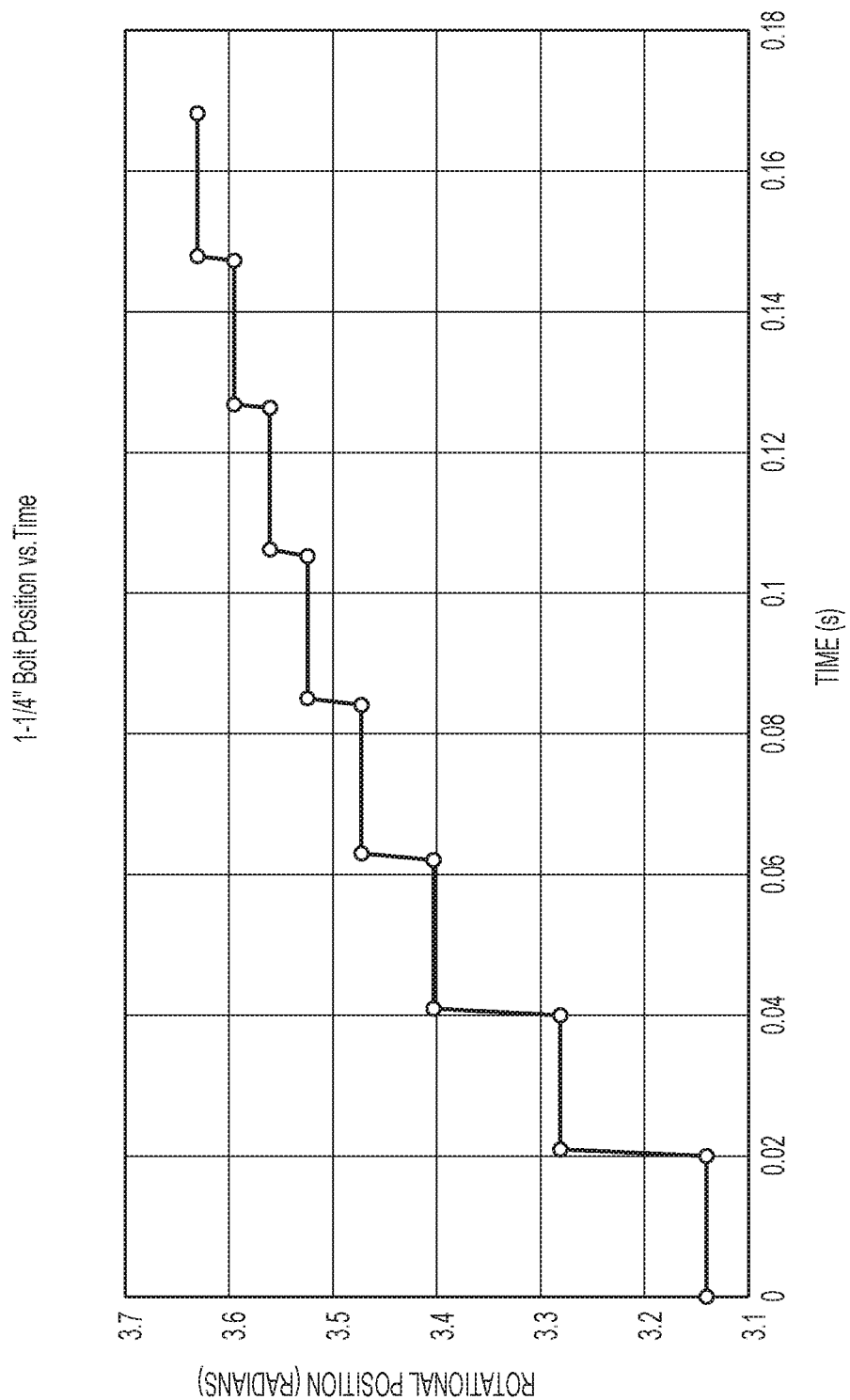
FIG. 13 is a graph showing the change in rotational position of an anvil over time.

FIG. 13 illustrates a graph showing rotation position (in radians) of the anvil 70 with respect to time during an impacting operation. As shown in FIG. 13, due to the impacting operation, the anvil 70 illustrates a stepwise increase in rotational position (e.g., because the anvil 70 advances in response to an impact from the hammer 75). As also shown in FIG. 13, as the duration of the impacting operation increases (e.g., increase in the time axis), each impact from the hammer 75 provokes a smaller change in the anvil's rotational position. This may be indicative of the increase in torque needed to move the anvil 70 as the duration of the impacting operation increases, and a fastener moves deeper into a work piece.

FIGS. 14-15 illustrate another embodiment of an impact mechanism 300 and an output position sensor 305 (e.g., also referred to as a sensor assembly) included in the impact wrench 10. The impact mechanism 300 includes similar components as the impact mechanism 67 shown in FIGS. 1 and 2, and like parts have been given like reference numbers, plus 300. FIG. 14 is a lateral cross-section of the impact mechanism 300. The impact mechanism 300 includes an anvil 370, and a hammer 375 and is mechanically coupled to the motor (not shown). The hammer 375 impacts the anvil 370 periodically to increase the amount of torque delivered by the power tool 10. The anvil 370 includes an engagement structure 385 including two protrusions 390a, 390b to engage the hammer 375 and receive the impact from the hammer 375. As shown in FIG. 14, the impact mechanism 300 is at least partially covered by the impact case 35, and the output position sensor 305 is positioned in front (e.g., on a side of an output unit, rather than a side of the motor of the power tool 10) of the impact mechanism 300 and the transmission 77 of the power tool 10. More specifically, the output position sensor 305 is positioned between the engagement structure 385 and the impact case 35, and within the impact case 35. As shown in FIG. 14, the output position sensor 305 is positioned adjacent to the engagement structure 385.

FIG. 15 is a front view of the impact mechanism 300 in the direction shown by arrow A in FIG. 14 and with the hammer 375 removed. As shown in more detail in FIG. 15, the output position sensor 305 includes three separate inductive sensors 305a, 305b, 305c. The three inductive sensors 305a, 305b, 305c are positioned on an annular structure (i.e., a printed circuit board (PCB)) that is positioned circumferentially around the anvil 370. The three inductive sensors 305a, 305b, and 305c can detect, by detecting a change in their electromagnetic field, the passing of the two protrusions 390a, 390b of the engagement structure 385 of the anvil 370, and may, in some instances, be referred to as anvil position sensors or anvil sensors. Since the two protrusions 390a, 390b are stationary relative to the anvil 370, the three inductive sensors 305a, 305b, 305c output information regarding the rotational position of the anvil 370. In the illustrated embodiment, the three inductive sensors 305a, 305b, 305c are equidistant from each other; therefore, the detection by each of the three inductive sensors 305a, 305b, 305c of each of the protrusions 390a, 390b indicates that the anvil 370 has rotated a predetermined angular distance (e.g., 60 degrees). As shown in FIG. 15, the three inductive sensors 305a, 305b, 305c are elongated sensors in which a first end 380 of the sensor 305a, 305b, 305c is more densely packed with inductive coils and the second, opposite end 382 of the sensor is less densely packed with inductive coils. In other words, while the first end 380 is densely packed with inductive coils, the second end 382 is sparsely packed with inductive coils. Therefore, each inductive sensor 305a, 305b, 305c outputs a different signal to the controller 135 based on where along the length of the inductive sensor 305a, 350b, 305c each of the protrusions 390a, 390b is positioned. When one of the protrusions 390a, 390b is positioned closer to the first end 380 of the sensor 305a, 305b, 305c, the inductive sensor 305a, 305b, 305c generates a larger output signal. On the other hand, when one of the protrusions 390a, 390b is positioned closer to the second end 382 of the sensor 305a, 305b, 305c, the sensor 305a, 305b, 305c outputs a smaller output signal. When a plurality of position measurements for the anvil 370 are analyzed over time, other measurements regarding the anvil 370 can be derived (e.g., velocity, acceleration, etc.). Therefore, the output position sensor 305 provides information that the controller 135 of the power tool 10 uses to directly determine the position, velocity, and/or acceleration of the anvil 370. In some embodiments, the output position sensor 305 may be used to provide an indirect measure of the rotor position and/or movement.

Although FIGS. 14-15 illustrate a different placement of the output position sensor 305, the operation of the power tool 10 as described by FIGS. 3-12 remains similar. In particular, the output position sensor 305 replaces the output position sensor 130 described with respect to FIGS. 3-12. Both output position sensors 130 and 305 provide information to directly determine the position and/or movement of the anvil 70, 370. Therefore, the methods described with respect to FIGS. 4-12 remain similar, except the information regarding the position of the anvil 70, 370 is gathered from the output position sensor 305 shown in FIGS. 14-15, rather than the output position sensor 130 shown in FIG. 2.

Figure 16:
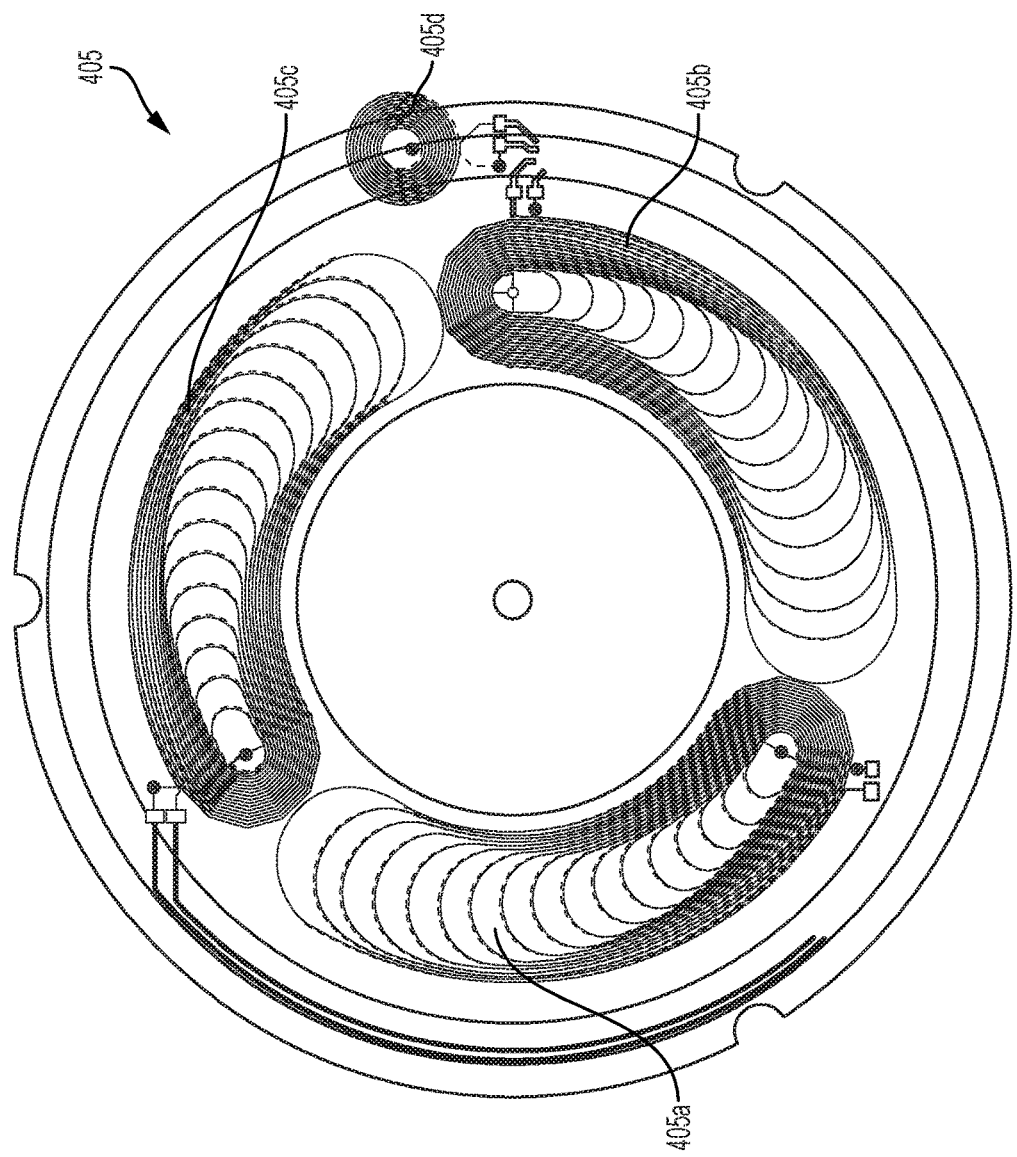
FIG. 16 is a front view of an output position sensor according to a third embodiment.

FIG. 16 illustrates another embodiment of an output position sensor 405 (or sensor assembly) included in the impact wrench 10. The output position sensor 405 is positioned, with respect to the impact mechanism 300, similar to the output position sensor 305 shown in FIGS. 14 and 15 (e.g., in front of the transmission 77 and on an annular structure circumferentially around the anvil, and housed by the impact case 35). In other words, the output position sensor 405 of FIG. 16 replaces the output position sensor 305 within the impact mechanism 300. Therefore, the impact mechanism 300 and the placement of the output position sensor 405 are not shown. Additionally, description for the components of the impact mechanism 300 and the placement of the output position sensor 405 with respect to the impact mechanism 300 is omitted for conciseness.

As shown in FIG. 16, the output position sensor 405 includes four separate inductive sensors 405a, 405b, 405c, and 405d. Three of the inductive sensors 405a, 405b, 405c are positioned on an annular structure that is positioned circumferentially around the anvil 370. The three inductive sensors 405a, 405b, 405c are referred to collectively as the "circumferential sensors," "anvil sensors," or "anvil position sensors." Similar to the three inductive sensors 305a, 305b, 305c described with respect to FIG. 15, the three circumferential sensors 405a, 405b, 405c of FIG. 16 detect the passing of the two protrusions 390a, 390b of the engagement structure 385 of the anvil 370. As explained above, since the two protrusions 390a, 390b are stationary relative to the anvil 370, by detecting changes in the electromagnetic fields of each of the circumferential sensors 405a, 405b, 405c, the three circumferential sensors 405a, 405b, 405c output information regarding the position of the anvil 370. In the illustrated embodiment, the three circumferential sensors 405a, 405b, 405c are equidistant from each other; therefore, the detection by each of the three circumferential sensors 405a, 405b, 405c of each of the protrusions 390a, 390b indicates that the anvil 370 has rotated a predetermined angular distance (e.g., 60 degrees). Similar to the inductive sensors 305a, 305b, 305c described with respect to FIGS. 14-15, when a plurality of the position measurements of the anvil 370 are analyzed over time, other measurements regarding the anvil 370 can be derived (e.g., velocity, acceleration, and the like). Therefore, in a similar manner as the inductive sensors 305a, 305b, 305c of FIGS. 14-15, the circumferential sensors 405a, 405b, 405c provide information that the controller 135 of the power tool 10 uses to directly determine the position, velocity, and/or acceleration of the anvil 370. In some embodiments, the circumferential sensors 405a, 405b, 405c may be used to provide an indirect measure of the rotor position and/or movement.

As shown in FIG. 16, the output position sensor 405 also includes a fourth inductive sensor referred to as the hammer detector 405d. The hammer detector 405d is positioned toward the outside of the circumferential sensors 405a, 405b, 405c. In the illustrated embodiment, the hammer detector 405d is positioned between the second circumferential sensor 405b and the third circumferential sensor 405c, but in other embodiments, the hammer detector 405d may be positioned elsewhere along the circumference of the output position sensor 405. The hammer detector 405d detects a proximity of the hammer 375 to the output position sensor 405 and, more generally, to the anvil 370. Since the three circumferential sensors 405a, 405b, 405c are inductive, when a metal hammer, such as the hammer 375 of the power tool 10, impacts the anvil 370 (or otherwise comes near the circumferential sensors 405a, 405b, 405c), the outputs of the circumferential sensors 405a, 405b, 405c become unreliable. In other words, the circumferential sensors 405a, 405b, 405c do not accurately measure the position of the two protrusions 390a, 390b of the anvil 370 when the metal hammer 375 is adjacent the anvil 370 and near the output position sensor 405 (e.g., when the hammer 375 is impacting the anvil 370). Therefore, for the position measurements for the anvil 370 to be reliable, the controller 135 ignores the outputs from the circumferential sensors 405a, 405b, 405c when the hammer 375 is within a predetermined distance from the output position sensor 405, and instead uses only the outputs from the circumferential sensors 405a, 405b, 405c when the hammer 375 is further than the predetermined distance from the output position sensor 405.

In one embodiment, the predetermined distance is determined based on the number of wire windings of the inductive hammer detector 405d. The more wire windings included in the hammer detector 405d, the greater the predetermined distance. When the hammer 375 comes closer to the output position sensor 405 than the predetermined distance, the output from the hammer detector 405d changes (e.g., increases significantly). The hammer detector 405d sends its output to the controller 135 and the controller 135 determines, based on the output from the hammer detector 405d (e.g., exceeding a threshold), when the hammer 375 is within the predetermined distance. In some embodiments, the output position sensor 405 (or sensor assembly) may include the hammer detector 405d, but not the anvil sensors 405a, 405b, 405c, such that the hammer detector 405d is the sensor assembly.

Figure 17:
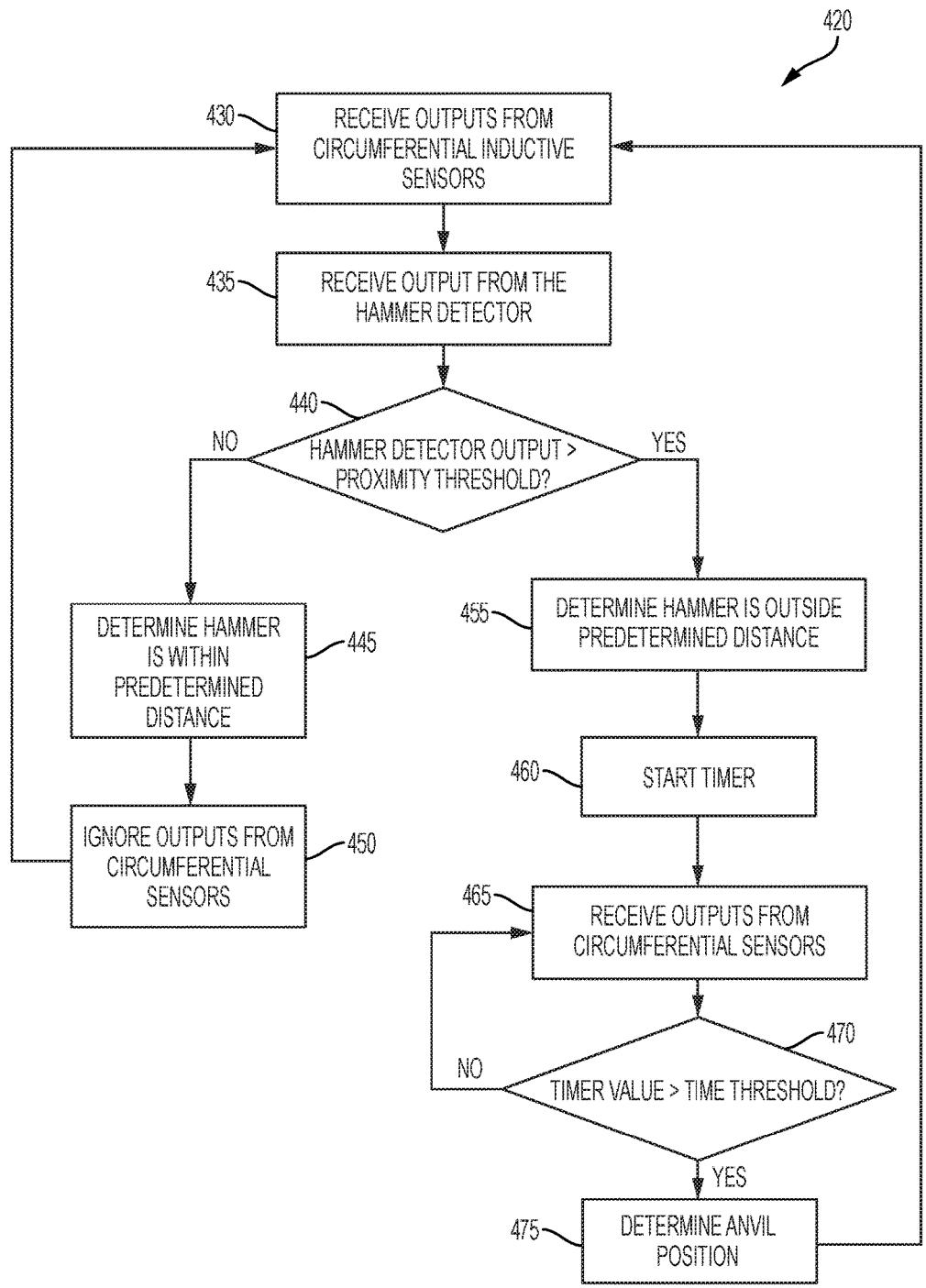
FIG. 17 is a flowchart illustrating a method of determining an anvil position of the power tool using the output position sensor of FIG. 16.

FIG. 17 illustrates a method 420 executed by the controller 135 that utilizes the information gathered by the hammer detector 405d to determine which measurements from the circumferential sensors 405a, 405b, 405c to discard and which measurements to use in determining position information for the anvil 370. First, the controller 135 receives the outputs from the circumferential sensors 405a, 405b, 405c (step 430) and from the hammer detector 405d (step 435). The controller 135 then determines whether the output from the hammer detector 405d is greater than (e.g., exceeds) a predetermined proximity threshold (step 440). The predetermined proximity threshold corresponds to the predetermined distance between the hammer 375 and the output position sensor 405 within which the hammer 375 negatively impacts the accuracy of the circumferential sensors 405a, 405b, 405c. When the output from the hammer detector 405d is less than or equal to the predetermined proximity threshold, the controller 135 determines that the hammer 375 is within the predetermined distance (e.g., impacting the anvil 370), and the outputs from the circumferential sensors 405a, 405b, 405c are unreliable (step 445). Therefore, while the hammer 375 is within the predetermined distance, the controller 135 ignores the outputs from the circumferential sensors 405a, 405b, 405c (step 450).

On the other hand, when the output from the hammer detector 405d is greater than the predetermined proximity threshold, the controller 135 determines, at step 455, that the hammer 375 is outside the predetermined distance (e.g., rebounding after an impact to the anvil 370). The controller 135 then starts a debounce timer (step 460). While the debounce timer increases in value (e.g., with the passage of time), the controller 135 continues to collect outputs from the circumferential sensors 405a, 405b, 405c (step 465). The controller 135 periodically checks the timer value and determines whether the timer value is greater than (e.g., exceeds) a time threshold (step 470). The time threshold corresponds to an estimate of time for which the hammer 375 is sufficiently separated from the output position sensor 405 to negatively affect the accuracy of the circumferential sensors 405a, 405b, 405c.

While the timer value remains below the time threshold, the controller 135 continues to collect outputs from the circumferential sensors 405a, 405b, 405c (step 465). When, however, the timer value becomes greater than the time threshold, the controller 135 determines the positional information for the anvil 370 based on the outputs received from the circumferential sensors 405a, 405b, 405c while the timer remained below the time threshold (step 475). In one embodiment, the controller 135 first averages the multiple measurements obtained from the circumferential sensors 405a, 405b, 405c, and then uses the averaged measurements (e.g., an averaged output position) to determine the position of the anvil 370. By averaging the measurements from the sensors 405a, 405b, 405c, some of the noise in the output signals is reduced and more reliable measurements are obtained. Once the timer value reaches the time threshold, the controller 135 returns to step 430 to receive additional outputs from the circumferential sensors 405a, 405b, 405c and from the hammer detector 405d (step 435) to determine whether the hammer 375 is within the predetermined distance.

In some embodiments, the controller 135 does not determine when to stop receiving outputs from the circumferential sensors based on a timer. Rather, the controller 135 collects (e.g., receives) a predetermined number of sensor output signals. For example, the controller 135 may specifically collect 10 or 50 (or another predetermined) number of output signals from the circumferential sensors 405a, 405b, 405c before determining the anvil position at step 475.

As explained above with respect to the output position sensor 305 shown in FIGS. 14-15, once the controller 135 determines the position of the anvil 370 using the output position sensor 405 shown in FIG. 16, the operation of the power tool 10 as described by FIGS. 3-12 remains similar. In particular, the output position sensor 405 replaces the output position sensor 130 described with respect to FIGS. 3-12. The output position sensors 130, 305, and 405 all provide direct measurements of the position and/or movement of the anvil 70, 370. Therefore, the methods described with respect to FIGS. 4-12 remain similar, except the information regarding the position of the anvil 70, 370 is gathered from the output position sensor 405 shown in FIG. 16, rather than the output position sensor 130 shown in FIG. 2 or the output position sensor 305 shown in FIGS. 14-15.

Figure 18:
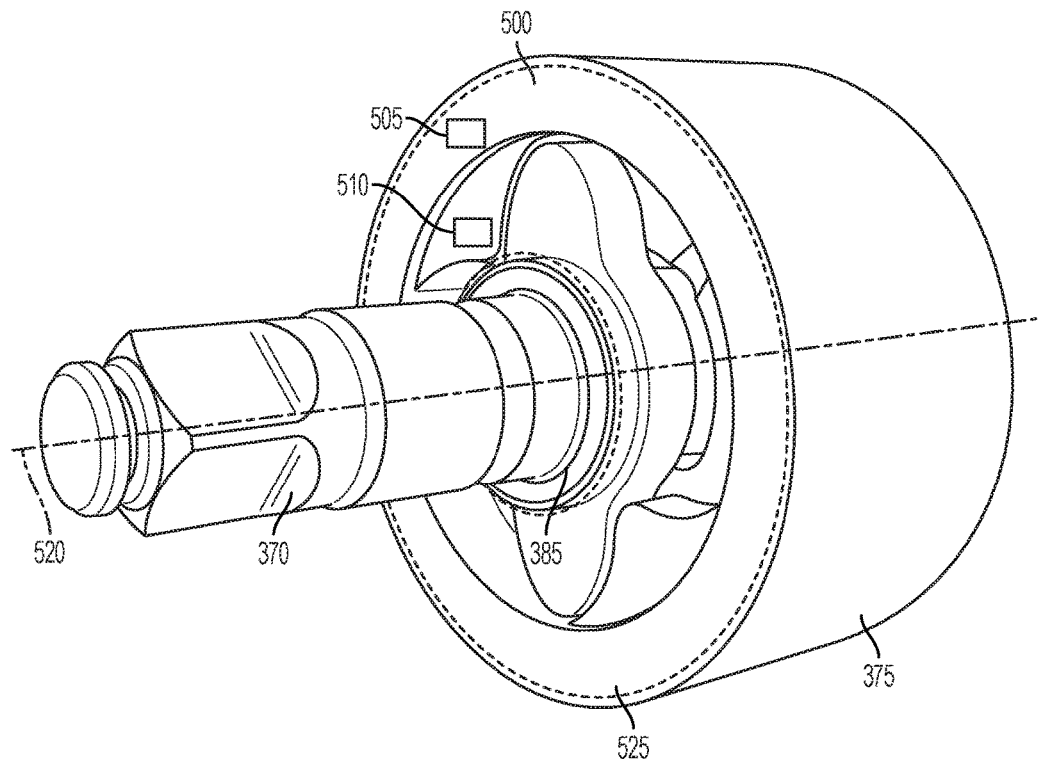
FIG. 18 is a perspective view of the impact mechanism according to a fourth embodiment.
Figure 19:
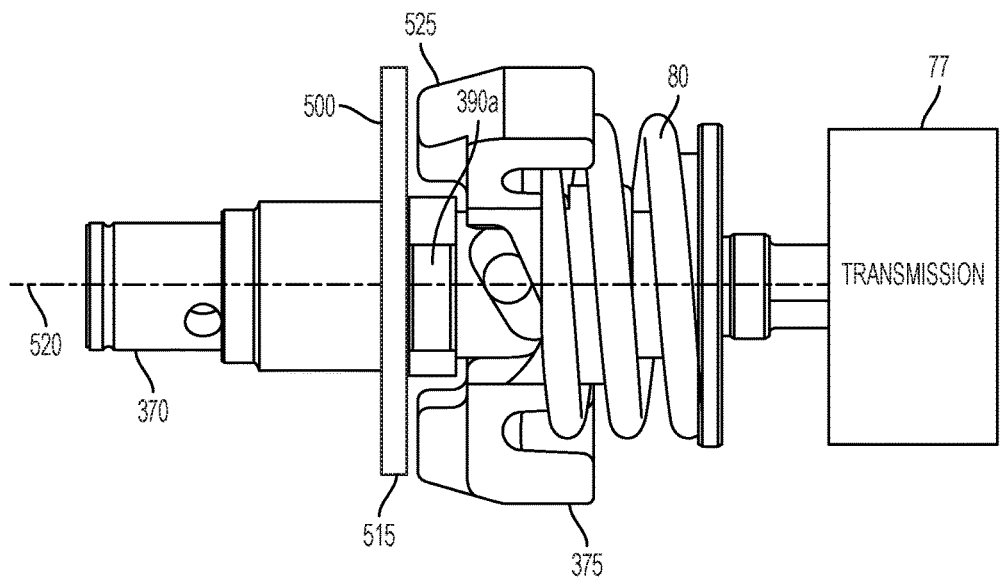
FIG. 19 is a side view of the impact mechanism according to the fourth embodiment.
Figure 20:
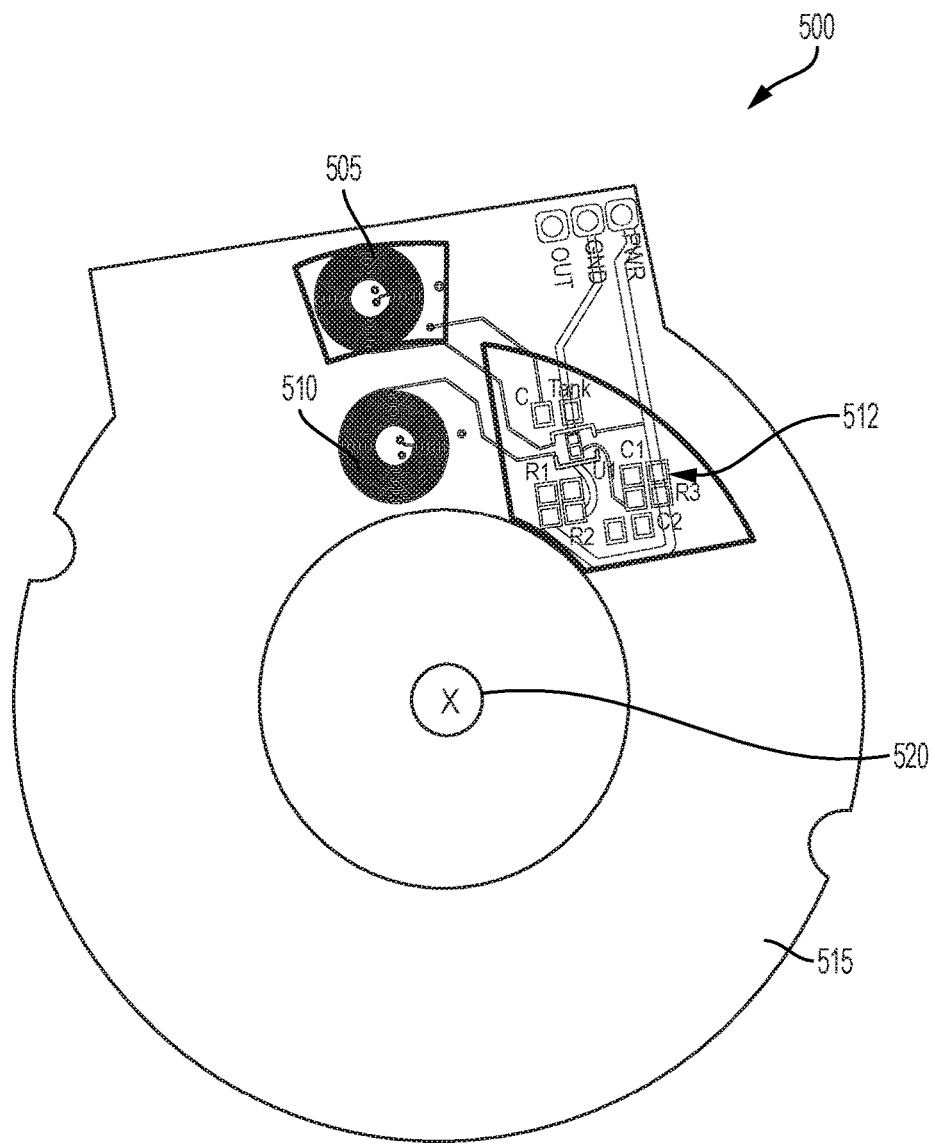
FIG. 20 is a front view of a hammer detector according to the fourth embodiment.

FIGS. 18-20 illustrate another embodiment of a hammer detector 500 (e.g., sensor assembly) that determines when the hammer 375 impacts the anvil 370 using two different inductive sensors. The hammer detector 500 is positioned, with respect to the impact mechanism 300, similar to the output position sensor 305 shown in FIGS. 13 and 14. As shown in FIGS. 18 and 19, the hammer detector 500 of FIG. 18 is positioned in front (e.g., on a side of an output unit, rather than a side of the motor of the power tool 10) of the impact mechanism 300 and in front of the transmission 77 of the power tool 10. More specifically, the hammer detector 500 is positioned between the engagement structure 385 and the impact case 35 (FIG. 14), and within the impact case 35. The hammer detector 500 is positioned on an annular structure (e.g., PCB 115 in FIG. 20) that is circumferential around the anvil 370. Additionally, description of the components of the impact mechanism 300 is omitted for conciseness.

As shown in FIG. 20, the hammer detector 500 includes a sense inductive coil 505, a reference inductive coil 510, and a voltage divider network 512 positioned on a donut-shaped (e.g., annular) printed circuit board (PCB) 515. The sense inductive coil 505 is positioned radially outward, while the reference inductive coil 510 is positioned radially inward. In other words, the reference inductive coil 510 is positioned closer to a central axis 520 of the anvil 370 than the sense inductive coil 505. Such placement allows the sense inductive coil 505 to be aligned with an outer lip 525 of the hammer 375 while the reference coil 510 remains unaligned with the outer lip 525 of the hammer 375. Because the sense inductive coil 505 is aligned with the outer lip 525, the output of the sense inductive coil 505 changes when the outer lip 525 axially approaches the hammer detector 500. In other words, the output of the sense inductive coil 505 changes when the hammer 375 axially approaches the hammer detector 500 to impact the anvil 370. The reference inductive coil 510, on the other hand, does not detect the approach of the hammer 375 because the reference inductive coil 510 is unaligned with the outer lip 525 and the rest of the hammer 375 is too far from the hammer detector 500 to affect the output of the reference inductive coil 510. Therefore, the reference inductive coil 510 outputs an unchanged output signal regardless of the position of the hammer 375, while the output from the sense inductive coil 505 changes based on how close the hammer 375 is to the hammer detector 500. In some embodiments, the reference inductive coil 510, while unaligned with the outer lip 525, still detects the approach of the hammer 375 to some extent. However, in these embodiments, the change in output signal from the reference inductive coil 510 upon the approach of the hammer 375 is noticeably distinct from (i.e., less than) the change in output signal from the sense inductive coil 505 because of the different radial placement of the two coils on the PCB 515. In the illustrated embodiment, the outer lip 525 extends the entire circumference of the hammer 375. In other embodiments, however, the outer lip 525 may extend only intermittently along the circumference of the hammer 375.

The hammer detector 500 then compares the output from the sense inductive coil 505 to the output from the reference inductive coil 510. When a difference between the output from the sense inductive coil 505 and the output from the reference inductive coil 510 is greater than a threshold, the hammer detector 500 outputs a first output signal indicating that the hammer 375 is impacting the anvil 370. In contrast, when the difference between the output from the sense inductive coil 505 and the output from the reference inductive coil 510 is less than the threshold, the hammer detector 500 outputs a second output signal indicating that the hammer 375 is not impacting the anvil 370. The reference inductive coil 510 is coupled to the voltage divider network 512 and together, the reference inductive coil 510 and the voltage divider network 512 provide a threshold for the sense inductive coil 505, which then allows the output signals from the hammer detector 500 to be binary. For example, the hammer detector 500 may output a high signal when the hammer 375 is impacting and output a low signal when the hammer 375 is not impacting, or vice versa. Because the hammer detector 500 generates binary outputs, the processing performed by the controller 135 is reduced. For example, the controller 135 does not receive the analog output signals from the sense inductive coil 505 and the reference inductive coil 510 and perform computations to determine whether an impact occurred. Rather, the hammer detector 500 of FIGS. 18-20 simply outputs a signal indicating whether the hammer 375 is impacting the anvil 370. In some embodiments, the controller 135 may refer to the controller 135 of the power tool 10 controlling, for example, the motor 15, and the voltage divider network 512 that helps in determining when the hammer 375 is impacting the anvil 370.

Figure 22:
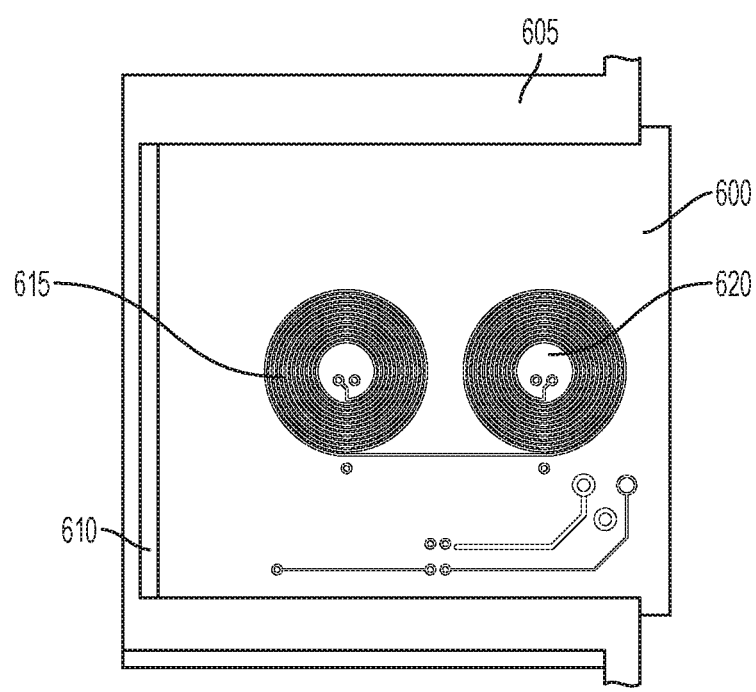
FIG. 22 is a partial front view of the hammer detector according to the fifth embodiment.

FIGS. 21-22 illustrate another embodiment of a hammer detector 600 (e.g., sensor assembly). FIG. 21A illustrates a cross-sectional view of the power tool 10 including the hammer detector 600. FIG. 21B is an isolated side view of the impact mechanism 300 including the hammer detector 600. The hammer detector 600 is positioned radially outward of an outer periphery of the hammer 375 on a periphery side of the hammer 375, as shown in FIGS. 21A-B. The hammer detector 600 is positioned in front (e.g., closer to the output unit 40) of the transmission 77 of the power tool 10 and within the impact case 35. In particular, as shown in FIGS. 21C-D, the hammer detector 600 is mounted to the impact case 35 and to the gear case 78. The hammer detector 600 is aligned with a portion 605 (FIG. 22) of the impact case 35 that covers the hammer 375 and the hammer detector 600. The portion 605 of the impact case 35 includes a recess 610 (FIG. 22) in which the hammer detector 600 is received such that the hammer detector 600 forms a flushed (or nearly flushed) surface with the impact case 35. The gear case 78 includes a slot 604. As shown in FIG. 21D, the hammer detector 600 fits within the recess 610 and the slot 604 such that the hammer detector 600 does not interfere with movement of the hammer 375.

FIGS. 21A-D illustrate the hammer detector 600 integrated into the impact case 35 of the power tool 10 and positioned radially outward of the hammer 375. The hammer detector 600 includes a sensing inductive sensor 615 and a reference inductive sensor 620, and a voltage divider network (not shown). The sensing inductive sensor 615 is positioned toward the front of the impact mechanism 300 such that when the hammer 375 moves backward in its rebounding action (i.e., leftward in FIGS. 21A-D), the hammer 375 moves into a sensing range of the sensing inductive sensor 615 and changes the output from the sensing inductive sensor 615. The reference inductive sensor 620, on the other hand, is positioned toward the back of the impact mechanism 300 such that even when the hammer 375 is rebounding, the hammer 375 remains too far (e.g., too distant) from the reference inductive sensor 620 to affect its output, or, at least, the effect on the output of the reference inductive coil 620 is noticeably less than that of the sensor inductive coil 615.

As described above with respect to the hammer detector 500, the hammer detector 600 of FIGS. 21 and 22 also generates a binary output signal that in a first state indicates that the hammer 375 is impacting the anvil 370, and in a second state indicates that the hammer 375 is not impacting the anvil 370. The voltage divider network and the relatively unchanging output from the reference inductive sensor 620 provide a threshold for the sensing inductive sensor 615, as described above with respect to FIGS. 18-20. As noted, in some embodiments, the controller 135 refers to both the controller 135 controlling, for example, the motor 15, and the voltage divider network that helps in determining when the hammer 375 impacts the anvil 370. The operation of the hammer detector 600 is similar to that described with respect to the hammer detector 500 of FIGS. 18-20, therefore no further details on the operation and outputs of the hammer detector 600 are provided for conciseness.

Figure 23:
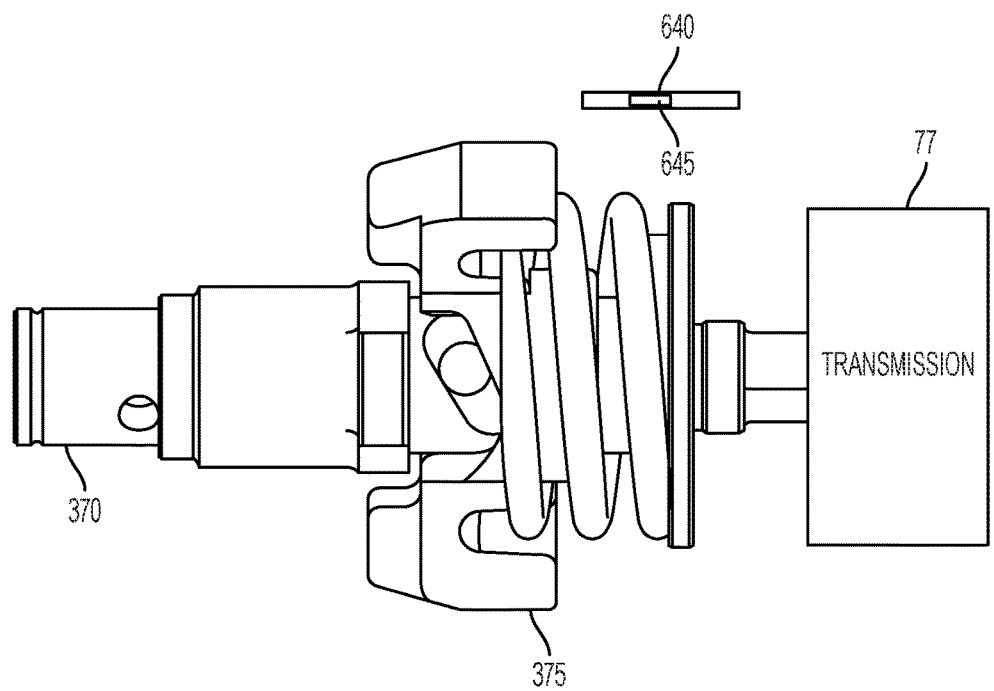
FIG. 23 is a schematic diagram of a hammer detector according to a sixth embodiment.

FIG. 23 illustrates another embodiment of a hammer detector 640 (e.g., sensor assembly). The hammer detector 640 is positioned radially outward from the outer periphery of the hammer 375 and in front of the transmission 77 and within the impact case 35, similar to the hammer detector 600. Like the hammer detector 600 of FIGS. 21-22, the hammer detector 640 of FIG. 23 is aligned with the portion 605 of the impact case 35 that covers the hammer 375 and the hammer detector 640. That is, the hammer detector 640 may replace the hammer detector 600 of FIGS. 21-22. The hammer detector 640, however, includes one inductive sensor 645 instead of the two inductive sensors included in the hammer detector 600 of FIGS. 21-22. In other words, the hammer detector 640 does not include a reference inductive sensor such as the reference inductive sensor 615. In the illustrated embodiment, the inductive sensor 645 of the hammer detector 640 includes a circular inductive sensor 645 that generates an output according to the distance between the inductive sensor 645 and the hammer 375. Because the hammer 375 oscillates between distancing itself from the anvil 370 and impacting the anvil 370, the inductive sensor 645 generates a sine waveform output, in which the peaks (i.e., maximums or minimums of the wave) represent the hammer 375 impacting the anvil 370. The sine waveform output is received by the controller 135. The controller 135 then implements a peak detector to determine when or if the hammer 375 impacts the anvil 370. As mentioned above with respect to the hammer detectors 500 and 600, the controller 135 may refer to both circuitry and software included on the circuit board that implements motor control and to circuitry and software included on the hammer detector 640 (e.g., on the circuit board onto which the inductive sensor 645 is mounted). In embodiments in which part of the processing is positioned on the hammer detector 640, the hammer detector 640 may generate a binary output signal that indicates whether the hammer 375 is impacting the anvil 370 or not. The hammer detector 640 generates a high output signal indicative that the hammer 375 is impacting the anvil 370, and generates a low output signal indicative that the hammer 375 is not impacting the anvil 370.

In other embodiments, the inductive sensor 645 of the hammer detector 640 includes an elongated inductive sensor in which a first end includes inductive coils that are more densely packed than the inductive coils on the second, opposite end of the elongated inductive sensor. In other words, the elongated inductive sensors include inductive coils that are unevenly distributed along the sensor 645. Such an elongated inductive sensor generates an analog signal rather than the binary output signal generated by the circular inductive sensor. For example, the elongated inductive sensor may generate as its output signal a sawtooth waveform in which the rising wave may be indicative of the nearing hammer 375, the drop to zero of the sawtooth waveform may be indicative of the rebounding of the hammer 375 away from the anvil 370. Regardless of whether the hammer detector 640 of FIG. 23 includes a circular inductive sensor or an elongated inductive sensor, the operation of the hammer detector 640 is similar to that described with respect to hammer detector 600 and hammer detector 500 of FIGS. 18-20, therefore no further details on the operation and outputs of the hammer detector 640 are provided for conciseness.

Figure 24:
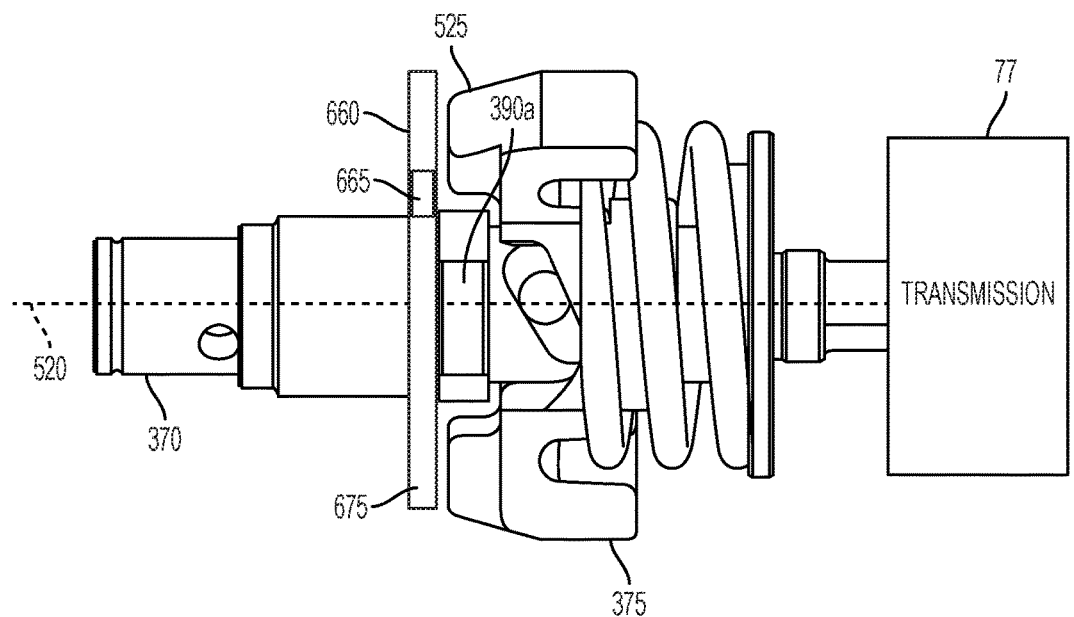
FIG. 24 is a schematic diagram of a hammer detector according to a seventh embodiment.

FIG. 24 illustrates another embodiment of a hammer detector 660 (e.g., sensor assembly). The hammer detector 660 is positioned, with respect to the impact mechanism 300, similar to the output position sensor 305 shown in FIGS. 13 and 14 and similar to the hammer detector 500 of FIGS. 18-20. In other words, the hammer detector 660 is positioned on an annular structure 675 (e.g., annular PCB) that is positioned circumferentially around the anvil 370. As shown in FIG. 24, the hammer detector 660 is positioned in front (e.g., on a side of an output unit, rather than a side of the motor of the power tool 10) of the impact mechanism 300. More specifically, the hammer detector 660 is positioned between the engagement structure 385 and the impact case 35 (FIG. 14), and is housed by the impact case 35. Additionally, description of the components of the impact mechanism 300 is omitted for conciseness.

As shown in FIG. 24, the hammer detector 660 includes one inductive coil 665 instead of including a sense coil and a reference inductive coil. Nevertheless, the hammer detector 660 is positioned on a donut-shaped (e.g., annular) printed circuit board (PCB) 675. The output of the sense inductive coil 665 changes when the hammer 375 axially approaches the hammer detector 660 to impact the anvil 370. When the hammer 375 is farther than a predetermined distance from the anvil 370 (e.g., not impacting the anvil 370), the inductive coil 665 does not generate an output signal, or generates a low output signal. Therefore, the output from the sense inductive coil 665 changes based on how close the hammer 375 is to the hammer detector 660. The operation of the hammer detector 660 is similar to that described with respect to the hammer detector 500 of FIGS. 18-20, therefore no further details on the operation and outputs of the hammer detector 660 are provided for conciseness.

Although the hammer detectors 405d, 500, 600, 640, and 660 have been described as operating in conjunction with anvil position sensors as part of the output position sensor (or sensor assembly), in some embodiments, the hammer detectors 405d, 500, 600, 640, 660 are included in the output position sensor (e.g., in the sensor assembly) without also including any anvil position sensors. Accordingly, in some embodiments, the sensor assembly or output position sensor may include only one of the hammer detectors 405d, 500, 600, 640, 660 and may not provide sensors to directly measure a position of the anvil.

Figure 25:
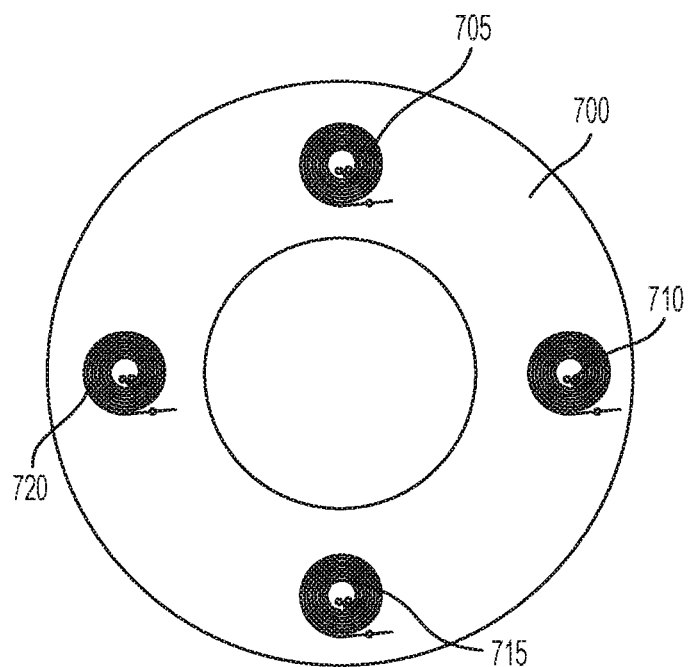
FIG. 25 is a front view of an output position sensor according to an eighth embodiment.
Figure 26:
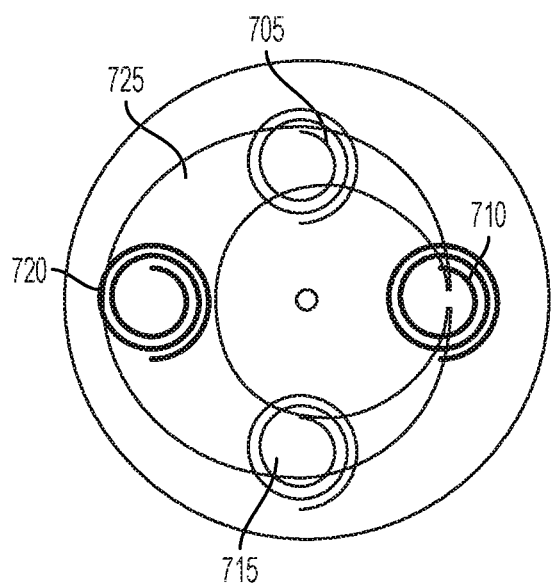
FIG. 26 is a schematic diagram of the output position sensor according to the eighth embodiment.

FIG. 25-26 illustrate another embodiment of an output position sensor 700. The output position sensor 700 is positioned, with respect to the impact mechanism 300, similar to the output position sensor 305 shown in FIGS. 14 and 15. In other words, the output position sensor 700 of FIG. 25 replaces the output position sensor 305 within the impact mechanism 300. The output position sensor 700 is positioned in front of the transmission 77 of the power tool 10 and is positioned on an annular structure (e.g., an annular PCB) circumferentially around the anvil 370, and is housed within the impact case 35. Therefore, the impact mechanism 300 and the placement of the output position sensor 700 are not shown. Additionally, description for the components of the impact mechanism 300 and the placement of the output position sensor 700 with respect to the impact mechanism 300 is omitted for conciseness.

The output position sensor 700 of FIG. 25 includes a first inductive coil 705, a second inductive coil 710, a third inductive coil 715, and a fourth inductive coil 720. When using the output position sensor 700, a metal marker 725 is coupled to the anvil 370 to allow the inductive coils 705-720 to differentiate between different positions of the anvil 370. FIG. 26 illustrates a schematic diagram of the metal marker 725 overlaid on the output position sensor 700. The anvil 370 is not shown in FIG. 26, but the metal marker 725 is added to (e.g., secured to) the anvil 370 on a side closest to the output position sensor (e.g., toward the front of the impact mechanism 300). In other words, the metal marker 725 is positioned between the anvil 370 and the output position sensor 700. As shown in FIG. 26, the metal marker 725 is a non-uniform shaped metal marker 725 such that each inductive coil 705-720 generates a different output signal based on the rotational position of the metal marker 725 (which is indicative of the rotational position of the anvil 370). In the illustrated embodiment, the metal marker 725 has a lune or crescent shape. In other embodiments, however, other types of non-uniform shapes may be used for the metal marker 725. For example, the metal marker 725 may have a gear tooth design. In such embodiments, a relative position of the anvil 370 may be determined instead of an absolute position of the anvil 370. The inductive coils 705-720 are configured to generate an output signal according to what portion of the metal marker 725 is closest (e.g., directly above) the inductive coil 705-720.

The first, second, third, and fourth inductive coils 705-720 send their corresponding output signals to the controller 135. The controller 135 analyzes the output signals from the inductive coils 705-720 and determines, based on the output signals, an absolute position of the anvil 370. The first, second, third, and fourth inductive coils 705-720 may also be referred to as anvil sensors, or anvil position sensors. The controller 135 may designate point A (FIG. 26) as a reference point of the metal marker 725 such that the controller 135 determines the anvil 370 is at a zero position when point A is directly above the fourth inductive coil 720 (e.g., as shown in FIG. 26). The controller 135 may then determine the rotational position (e.g., angular position) of the anvil 370 based on the approximate location of the reference point A. The controller 135 may also determine the rotational position of the anvil 370 by comparing the output signals from oppositely positioned inductive coils. For example, the controller 135 may compare the output of the first inductive coil 705 with the output of the third inductive coil 715 (e.g., the inductive coil positioned opposite the first inductive coil 705), and may compare the output of the second inductive coil 710 with the output of the fourth inductive coil 720. Two of the inductive coils (e.g., the first inductive coil 705 and the third inductive coil 715 in FIG. 26) are expected to have approximately equal output signals since the metal marker 725 has a similar shape over both of the inductive coils. The remaining two inductive coils (e.g., the second inductive coil 710 and the fourth inductive coil 720 in FIG. 26) are expected to have different output signals since the metal marker 725 has a different shape over the second inductive coil 710 than over the fourth inductive coil 720. For example, with reference to FIG. 26, the further inductive coil 720 may have a higher (e.g., near maximum) output than the inductive coils 705, 710, and 715, and the second inductive coil 710 may have a lower (e.g., near minimum) output than the inductive coils 705, 715, and 720. Based on the mapping of the two approximately equal outputs and the approximately opposite outputs from the inductive coils 705-720, the controller 135 determines the absolute position of the anvil 370.

In some embodiments, the controller 135 accesses a look-up table from a memory of the power tool to determine the absolute position of the anvil 370. The look up table indicates, for example, approximate positions for the anvil 370 with the corresponding readings of each of the inductive coils 705-720. In other embodiments, the controller 135 performs a specific calculation (e.g., based on a stored equation) that allows the controller 135 to determine the rotational position of the anvil 370.

As explained above with respect to the output position sensor 305 shown in FIGS. 14-15, once the controller 135 determines the position of the anvil 370 using the output position sensor 700 shown in FIGS. 25-26, the operation of the power tool 10 as described by FIGS. 3-12 remains similar. In particular, the output position sensor 700 replaces the output position sensor 130 described with respect to FIGS. 3-12. The anvil position sensors 130, 305, 405, and 700 all provide direct measurements of the position and/or movement of the anvil 70, 370. The hammer detectors 405d, 500, 600, 640, 660 provide direct measurements of the position of the hammer 375 with respect to the anvil 370. Therefore, the methods described with respect to FIGS. 4-12 remain similar, except the information regarding the position of the anvil 70, 370 is gathered from the output position sensor 700 shown in FIG. 25, rather than the output position sensor 130 shown in FIG. 2 or the output position sensor 305 shown in FIGS. 14-15.

Figure 27:
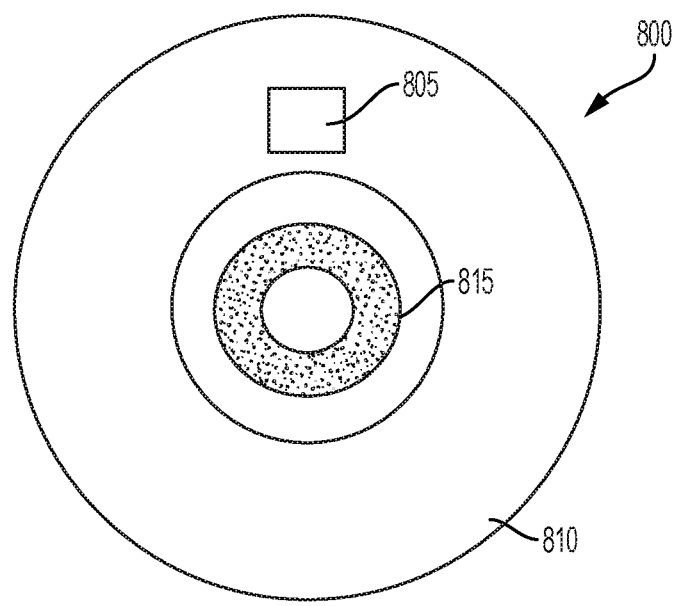
FIG. 27 is a schematic diagram of an output position sensor according to a ninth embodiment.
Figure 28:
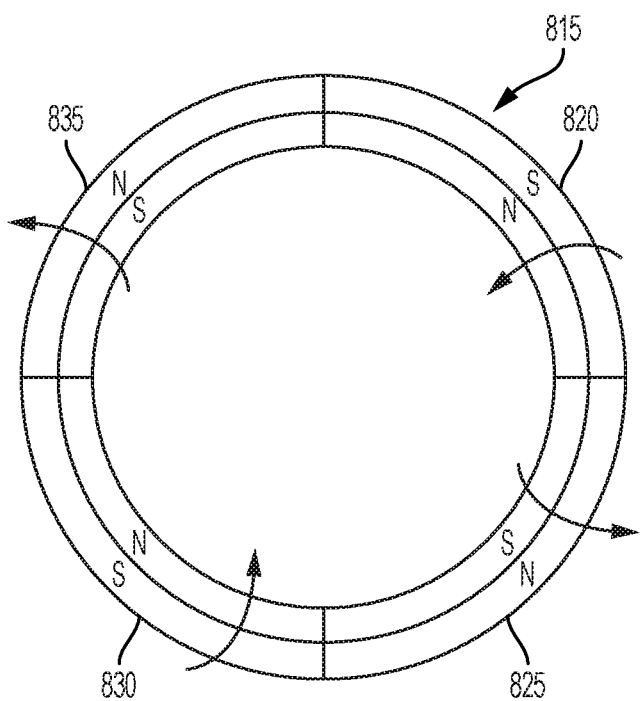
FIG. 28 is a schematic diagram of a magnetic ring of the output position sensor according to the tenth embodiment.

FIGS. 27-28 illustrate another embodiment of an output position sensor 800. The output position sensor 800 includes a magnetic sensor 805 positioned on a donut-shaped (e.g., annular) PCB 810. The donut PCB 810 is positioned with respect to the impact mechanism 300, similar to the output position sensor 305 shown in FIGS. 14 and 15. In other words, the magnetic sensor 805 of FIGS. 27-28 replaces the output position sensor 305 within the impact mechanism 300. That is, the output position sensor 800 is positioned in front of the transmission 77 of the power tool 10, and is positioned on an annular structure (e.g., annular PCB 810) that is circumferentially around the anvil 370, and is housed within the impact case 35. Therefore, the impact mechanism 300 and the placement of the magnetic sensor 805 are not shown. Additionally, description for the components of the impact mechanism 300 and the placement of the magnetic sensor 805 with respect to the impact mechanism 300 is omitted for conciseness. The magnetic sensor 805 may include, for example, a Hall-Effect sensor, a magnetoresistive sensor, or another sensor configured to detect a magnetic vector.

The output position sensor 800 also includes a magnetic ring 815 that is coupled to the anvil 370 and positioned in front of (e.g., toward the front of the impact mechanism 300) the protrusions 390a, 390b of the anvil 370. As shown in FIG. 28, the magnetic ring 815 is a donut shaped magnet that is divided into four quadrants (i.e., a first quadrant 820, a second quadrant 825, a third quadrant 830, and a fourth quadrant 835). Each quadrant 820-835 includes a north pole magnet and a south pole magnet positioned circumferentially relative to each other. In the illustrated embodiment, the first quadrant 820 and the third quadrant 830 include the north pole magnet positioned circumferentially inward (e.g., radially inward) of the south pole magnet. Therefore, the first quadrant 820 and the third quadrant 830 generate magnetic flux lines directed toward the center of the magnetic ring 815. In contrast, the second quadrant 825 and the fourth quadrant 835 include the north pole magnet positioned circumferentially outside (e.g., radially outward) of the south pole magnet. Therefore, the second quadrant 825 and the fourth quadrant 835 generate magnetic flux lines directed away from the center of the magnetic ring 815. In other embodiments, however, the first quadrant and third quadrant may generate magnetic flux lines directed away from the center of the magnetic ring 815 and the second quadrant and fourth quadrant may generate magnetic flux lines directed toward the center of the magnetic ring 815.

The magnetic sensor 805 detects a magnetic vector based on position of the magnetic sensor 805 with respect to the magnetic ring 815. The magnetic sensor 805 then generates an output signal indicative of the sensed magnetic vector to the controller 135. The controller 135 determines, based on the sensed magnetic vector from the magnetic sensor 805, the rotational position of the anvil 370. The magnetic sensor 805 and the magnetic ring 815 may be referred to as an anvil sensor or an anvil position sensor. Although the output position sensor 800 is described as including a magnetic ring

815, in some embodiments, the magnetic ring 815 may be replaced by a supporting ring on which multiple magnets are mounted that also generate magnetic flux lines of opposite polarities. In such embodiments, the magnetic sensor 805 still detects a different magnetic vector based on the position of the magnetic sensor 805 with respect to the plurality of magnets. Additionally, in some embodiments, the magnetic ring 815 includes more than four quadrants, or another arrangement to generate differing magnetic fields at different circumferential locations.

As explained above with respect to the output position sensor 305 shown in FIGS. 14-15, once the controller 135 determines the position of the anvil 370 using the output position sensor 800 shown in FIG. 27, the operation of the power tool 10 as described by FIGS. 3-12 remains similar. In particular, the output position sensor 800 replaces the output position sensor 130 described with respect to FIGS. 3-12. The output position sensors 130, 305, 405, 700, and 800 all provide direct measurements of the position and/or movement of the anvil 70, 370. Therefore, the methods described with respect to FIGS. 4-12 remain similar, except the information regarding the position of the anvil 70, 370 is gathered from the output position sensor 800 shown in FIG. 27, rather than the output position sensor 130 shown in FIG. 2 or the output position sensor 305 shown in FIGS. 14-15.

Notably, any of the hammer detectors 405d, 500, 600, 640, or 660 as described with respect to FIGS. 16, 18, 21, 23, and 24 respectively, may be incorporated into the output position sensors 130, 305, 405, 700, or 800 as described with respect to FIGS. 2, 15, 25, and 27, respectively. The hammer detectors 405d, 500, 600, 640, 660 may alternatively be incorporated into the power tool 10 without, or separately from, the anvil position sensors included as part of the output position sensors 130, 305, 405, 700, or 800. Additionally, some of the methods described above may be performed by the hammer detectors 405d, 500, 600, 640, or 660 without the need for the anvil position sensors 130, 305, 405, 700, 800. For example, the method of FIG. 4 may be implemented using one of the hammer detectors 405d, 500, 600, 640, or 660 without an anvil position sensor. In such embodiments, the controller 135 may not need to determine whether the change in anvil position is greater than a position threshold (step 155). Rather, since the hammer detectors 405d, 500, 600, 640, 660 detect when an impact is occurring, the impact counter would be incremented based on the outputs from one of the hammer detectors 405d, 500, 600, 640, 660 without comparing the output signals to a position threshold. Additionally, it is to be noted that while the output position sensors 130, 305, 405, 700, or 800 are described seemingly as a single sensor, these output position sensors may alternatively be considered sensor assemblies including one or more sensors. Similarly, the hammer detectors 405d, 500, 600, 640, 660, whether coupled to anvil position sensors or provided independently, may also be considered sensor assemblies including one or more sensors. In other words, a sensor assembly may include the anvil position sensors described within output position sensors 130, 305, 405, 700, and 800, hammer detectors 405d, 500, 600, 640, 660, or a combination of anvil position sensors and hammer detectors. The anvil position sensors included in the output position sensors 130, 305, 405, 700, and 800 detect a position of the anvil 370 independently of detecting the position of the motor 15 as determined by the Hall sensors 125. In other words, the anvil position sensors directly detect an anvil position separate from a detection of a motor position.

Figure 29:
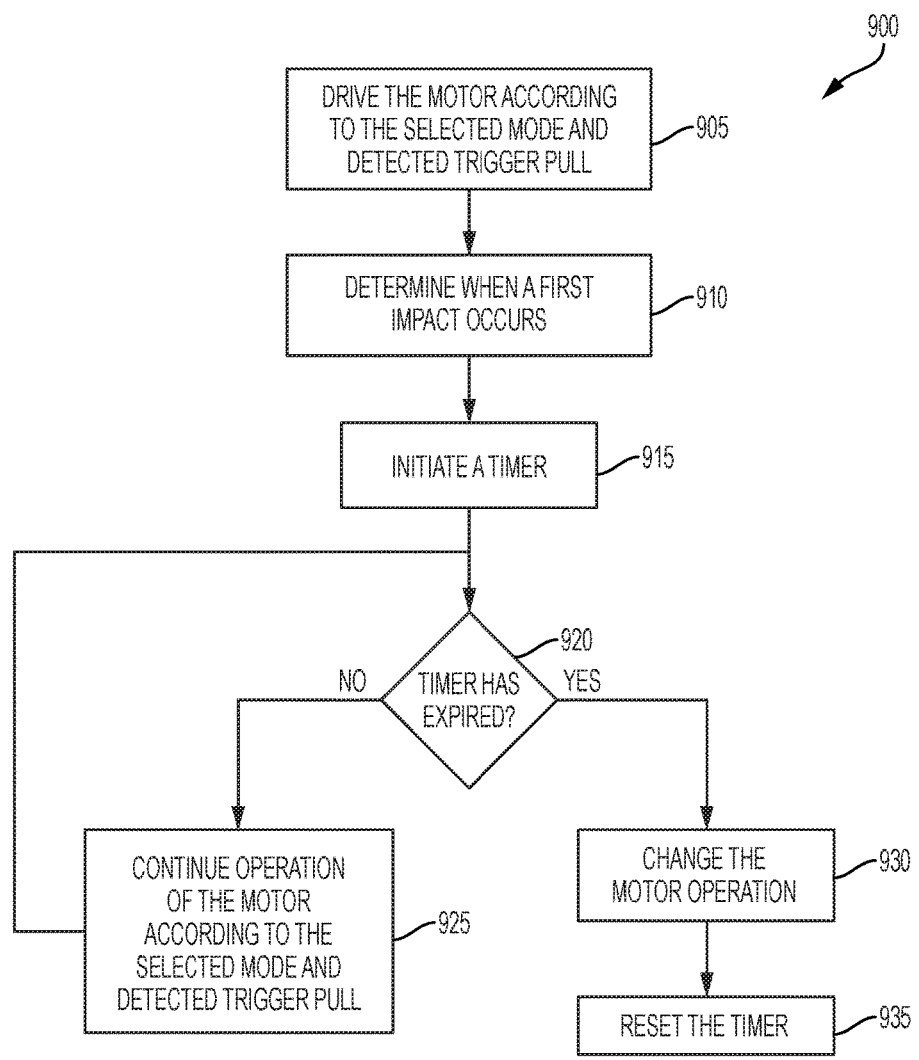
FIG. 29 is a flowchart illustrating an operation of the power tool in a time to shutdown mode.

FIG. 29 is a flowchart illustrating a method 900 of operating the power tool 10 according to a time-to-shutdown mode. The controller 135 may implement the method 900 using any one of the output position sensors 130, 305, 405, 700, 800, the hammer detectors 405d, 500, 600, or a combination thereof. A graphical user interface (e.g., similar to that shown in FIG. 10) may receive from a user a target time after the first impact. During the time-to-shutdown mode, the controller 135 drives the motor 15 according to the selected mode and detected trigger pull (step 905). The controller 135 then determines, based on the output signals of the output position sensors 130, 305, 405, 700, 800 and/or the hammer detectors 405d, 500, 600, when a first impact occurs (step 910). In response to detecting the first impact, the controller 135 initiates a timer (step 915). The value of the timer may be determined based on, for example, a user input indicating how long the power tool 10 is to continue operating (e.g., driving the motor 15) after the first impact. For applications in which a workpiece or fastener is more fragile, the timer may have a smaller value to inhibit the tool from damaging the workpiece or fastener. The controller 135 then determines whether the timer has expired (step 920). When the controller 135 determines that the timer has not yet expired, the controller 135 continues operation of the motor 15 according to the selected mode and detected trigger pull (step 925). On the other hand, when the controller 135 determines that the timer has expired, the controller 135 changes the motor operation (step 930), as discussed above with respect to, for example, step 170 of FIG. 4. The controller 135 then also resets the timer (step 935).

Figure 30:
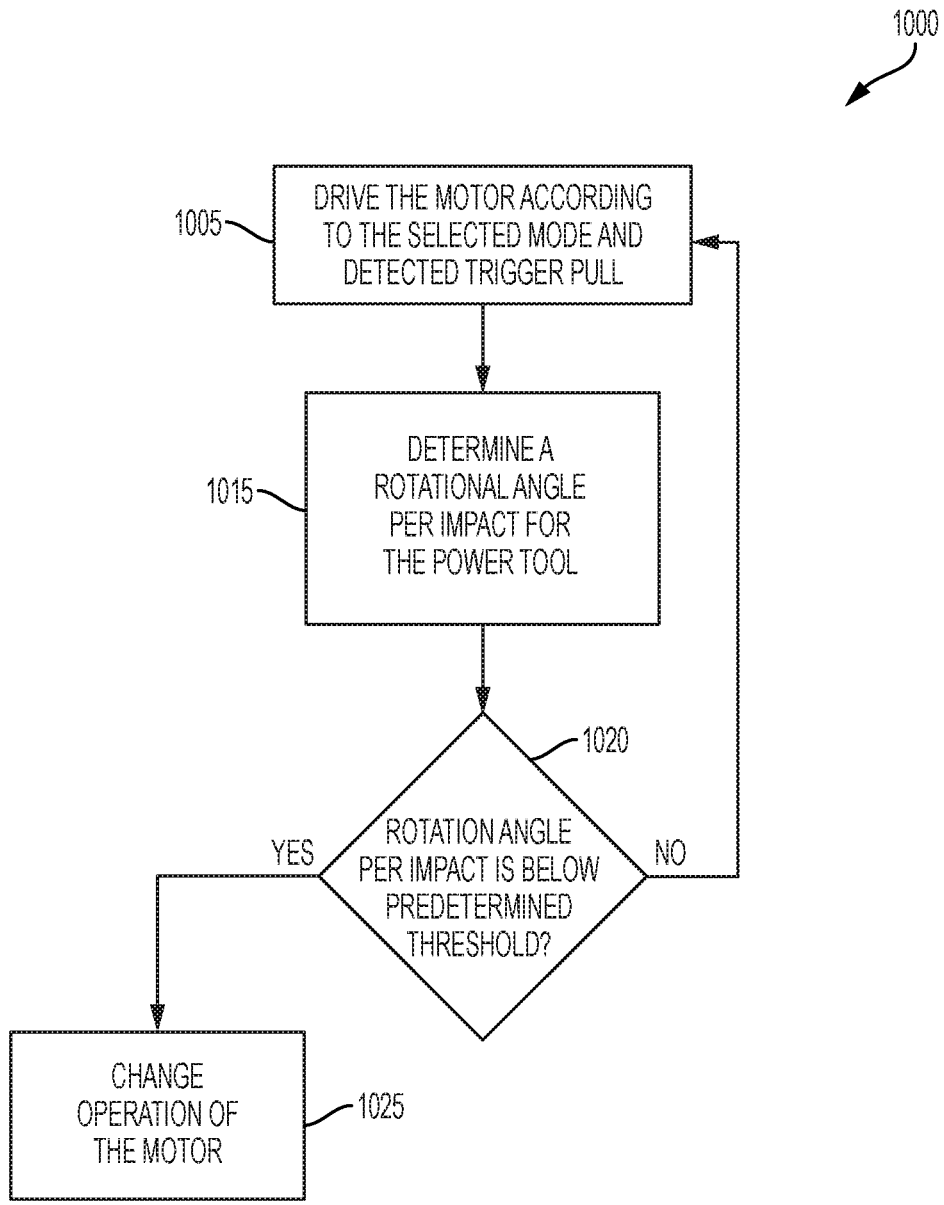
FIG. 30 is a flowchart illustrating an operation of the power tool in a minimum angle mode.

FIG. 30 is a flowchart illustrating a method 1000 of operating the power tool 10 according to a minimum angle mode. The controller 135 may implement the method 1000 using any one of the output position sensors 130, 305, 405, 700, 800, or another output position sensor capable of generating an output signal indicative of the angular displacement of the anvil 370 after each impact is delivered. The controller 135 may implement the method 1000 also using the hammer detectors 405d, 500, 600 to help determine when each impact occurs. During the minimum angle mode, the controller 135 drives the motor 15 according to the selected mode and detected trigger pull (step 1005). The controller 135 then determines a rotational angle per impact for the power tool (step 1015).

In one embodiment, the rotational angle per impact refers to a rotational displacement of the anvil per impact. In such embodiments, the controller 135 may use, for example, the output position sensors 130, 305, 405 700, 800 to determine a first rotational position of the anvil 370 before an impact, determine a second rotational position of the anvil 370 after the impact, and the controller 135 may then determine a difference between the first rotational position and the second rotational position to determine a rotational displacement of the anvil 370. In other embodiments, the rotational angle per impact refers to a rotational angle of the motor 15 per impact. In such embodiments, the controller 135 may use, for example, motor position sensors (e.g., the Hall effect sensors 125) positioned near the motor 15 to determine the angular displacement of the motor 15 between each impact. The controller 135 may, for example, detect a first impact, and then track the rotational displacement of the motor 15 until a second impact is detected (e.g., using the hammer detectors 405d, 500, 600).

The controller 135 then determines whether the rotational angle per impact is below a predetermined threshold (step 1020). When the controller 135 determines that the rotational angle per impact remains above the predetermined threshold, the controller 135 continues to operate the motor 15 at the selected mode and detected trigger pull (step 1005). On the other hand, when the controller 135 determines that the rotational angle per impact is below the predetermined threshold, the controller 135 changes motor operation as discussed (step 1025), as discussed above with respect to step 170 of FIG. 4. For example, the controller 135 shuts down the motor 15. The minimum angle mode allows the motor 15 to become deactivated after a predetermined torque is reached. As the torque increases, generally, the angular displacement of the motor 15 and/or the anvil 370 decreases per impact. Therefore, changing the motor operation based on the rotational angle per impact provides an indirect manner of controlling the motor 15 based on delivered torque.

Figure 31:
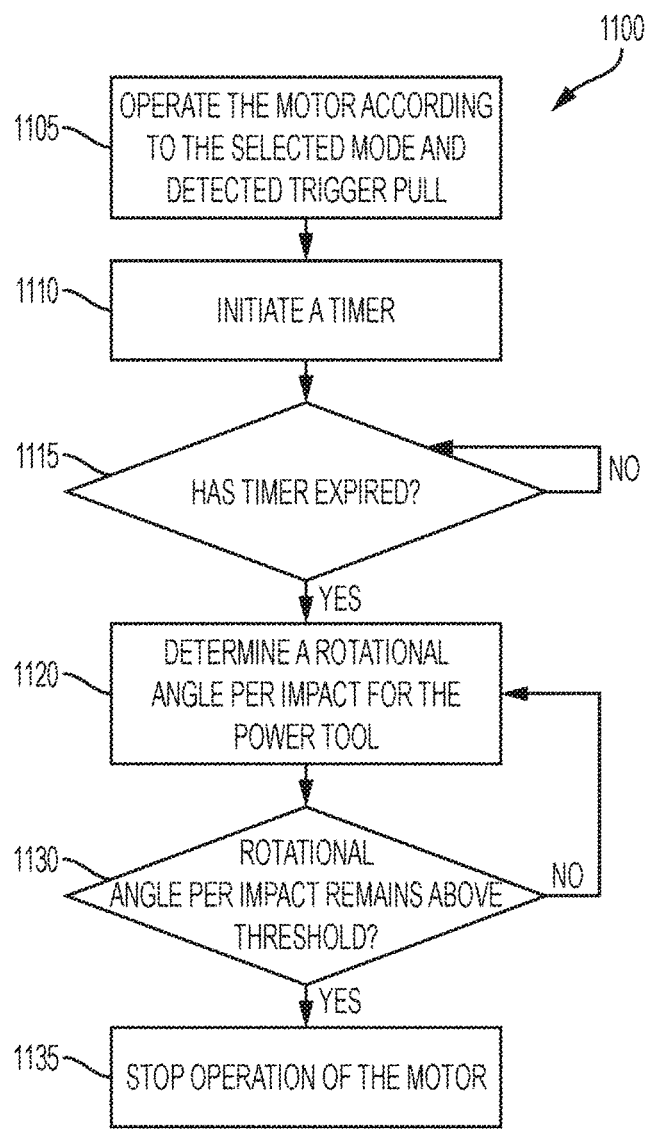
FIG. 31 is a flowchart illustrating an operation of the power tool in a yield control mode.

FIG. 31 is a flowchart illustrating a method 1100 of operating the power tool 10 according to a yield control mode. The yield control mode is set to detect when a fastener (e.g., a bolt) has been damaged due to yielding of the fastener, which may be used to determine to cease driving to and prevent damaging the workpiece also. When a fastener is not damaged due to yielding, generally, the rotational angle per impact decreases as the torque increases over the course of driving the fastener. However, when a fastener has been damaged due to yielding, the rotational angle per impact ceases decreasing (and the torque ceases increasing) because the damaged fastener provides less resistance to the power tool. In other words, the rotational angle per impact and the torque may remain the unchanged.

During the yield control mode, the controller 135 operates the motor 15 according to the selected mode and detected trigger pulls (step 1105). The controller 135 then determines that an impact has occurred (step 1110). The controller 135 may determine that an impact occurred as described above with respect to step 150 of FIG. 4; based on a change in acceleration or speed of the motor 15 (e.g., based on output from the Hall sensors 125); based on output from one of the hammer detectors 405*d*, 500, 600, 640, or 660; or based on a change in acceleration or speed of the anvil 70 (e.g., using one of the output position sensors 130, 305, 405, 700, 800 described herein). Upon detecting an impact, the controller 135 initiates a timer (step 1115). The controller 135 then determines whether the timer has expired (step 1120). When the controller 135 determines that the timer has not yet expired, the controller 135 continues to operate the power tool 10 according to the selected mode and detected trigger pull.

When the controller 135 determines that the timer has expired, the controller 135 then determines the rotational angle per impact (step 1125). The controller 135 may determine the rotational angle per impact as described above with respect to step 1015 of FIG. 30. The controller 135 then determines whether the rotational angle per impact is above a yield threshold (step 1130). The timer and yield threshold may be selected in advance using, for example, experimental values based on the type of fastener, the type of workpiece, or a combination thereof. When the controller 135 determines that the rotational angle per impact is above the yield threshold, the controller 135 stops operation of the motor 15 (step 1135). When the rotational angle per impact is above the yield threshold after the timer has expired, the controller 135 infers that the fastener has yielded because it is not providing resistance at a level expected at the post-timer expiration stage of driving of the fastener. When the rotational angle per impact is below the yield threshold, the controller 135 returns to step 1125 to determine the rotational angle of the next impact. The steps 125 and 130 are repeated, for example, until the user releases the trigger to stop the motor 15, the fastener is determined to have yielded, or another motor control technique is used (e.g., stopping the motor 15 after a predetermined number of impacts are determined to have occurred).

In some embodiments, the controller 135 determines that a fastener is damaged by measuring the torque output (e.g., via a torque sensor). In such embodiments, after the timer has expired (step 1120), the controller 135 measures the torque output. When the torque output is below a torque yield threshold, the controller 135 infers that the fastener has yielded (e.g., because torque is no longer increasing). On the other hand, when the torque output is above the torque yield threshold, the controller 135 continues to operate the motor 15, and measures the torque periodically during impacting.

Figure 32:
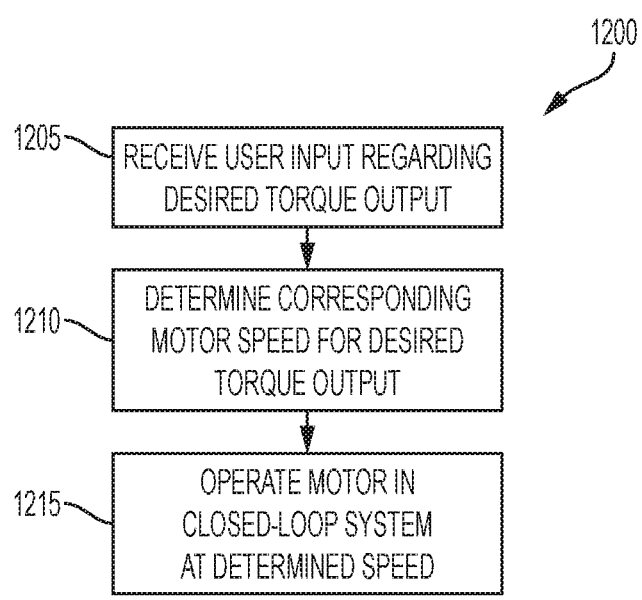
FIG. 32 is a flowchart illustrating an operation of the power tool in a closed-loop speed control mode.

FIG. 32 is a flowchart illustrating a method 1200 of operating the power tool 10 according to a closed-loop speed control mode. Under the closed-loop speed control mode, the controller 135 maintains the rotating speed of the motor 15 at a desired value such that the hammer 375 impacts the anvil 370 at the desired speed. By controlling the speed of the motor, the anvil 370 can deliver a repeatable torque level to a fastener. During the closed-loop speed control, the controller 135 receives a user specified torque level (step 1205). The controller 135 may receive the torque level through a graphical user interface similar to that shown in FIG. 10. For example, the controller 135 may receive an indication that a torque of 920 ft.lb is desired. The controller 135 then determines a corresponding motor speed for the desired torque (step 1210). In other words, to deliver the desired torque, the hammer 375 is driven by the motor 15 to impact the anvil 370 at a particular speed. The controller 135, for example, using a look up table populated based on experimental values, determines the desired speed at which the hammer 375 is driven to hit the anvil 370 to output the desired torque level.

The controller 135 then operates the motor 15 in a closed-loop system at the desired speed (step 1215). In some embodiments, the controller 135 implements a PID loop to maintain the motor 15 at the desired speed. The controller 135 uses the Hall Effect sensors 125 to periodically measure the speed of the motor 15. In other embodiments, other methods of implementing a closed-loop system may be used. The controller 135, during its closed loop control of the motor speed, makes necessary adjustments to compensate for, for example, decreasing battery voltage, decreasing grease level, and the like. The controller 135 may operate in the closed-loop speed control mode as part of the other modes described for the power tool. For example, while operating in the closed-loop speed control, the controller 135 may control the motor 15 such that a specific number of impacts are to be delivered to the anvil 370 as described, for example, in FIG. 4. In another example, while operating in the closed-loop speed control mode, the controller 135 may control the motor 15 such that a total angle after the first impact is desired as described, for example, in FIG. 9.

In other embodiments, the controller 135 may instead receive a desired motor speed (e.g., using a graphical user interface similar to that shown in FIG. 8). In such embodiments, the controller 135 does not determine a motor speed that corresponds to the desired torque, but rather operates the motor 15 at the desired speed under the closed-loop control mode.

Figure 33:
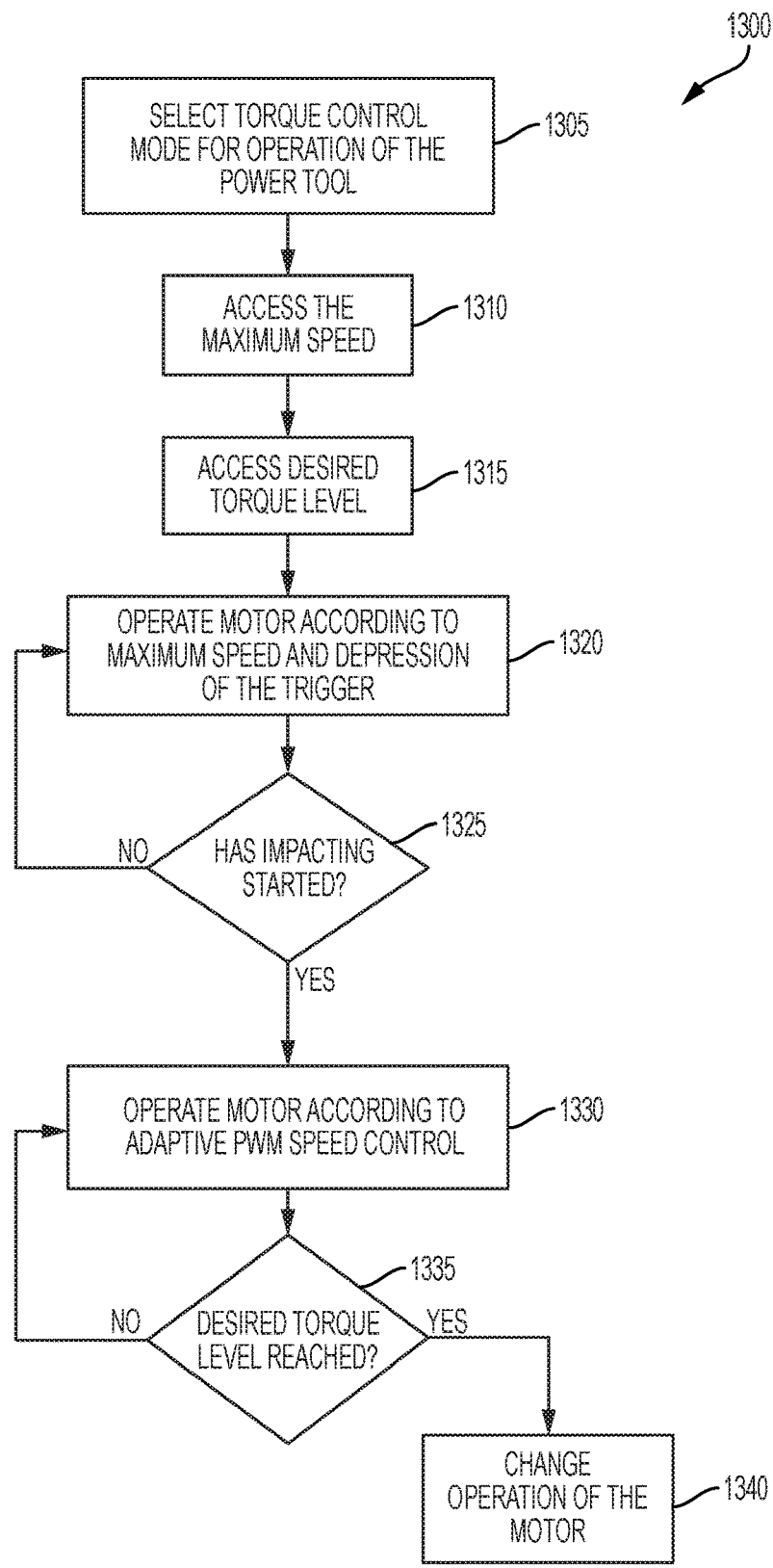
FIG. 33 is a flowchart illustrating an operation of the power tool in a torque control mode.
Figure 34:
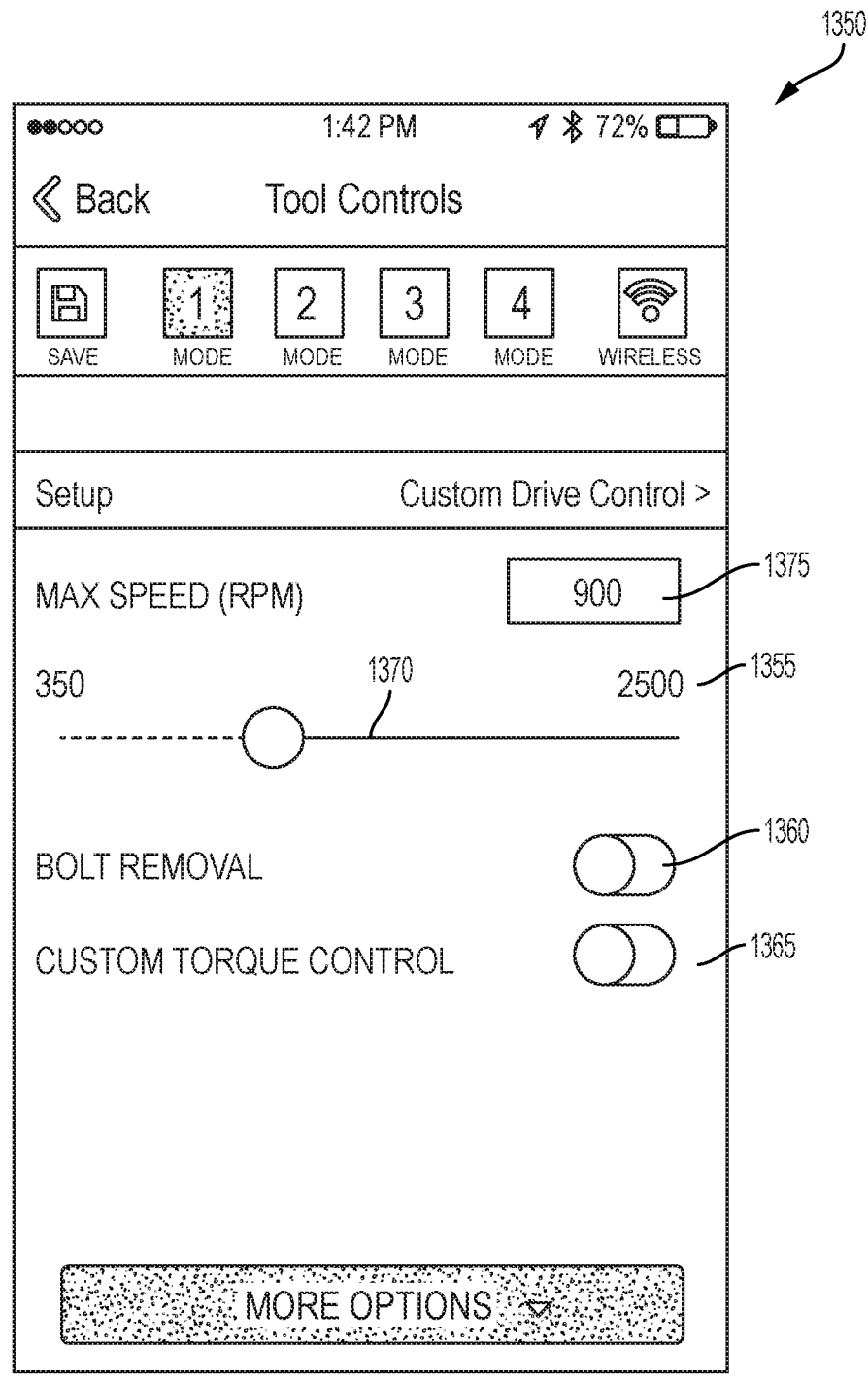
FIGS. 34 and 35 are exemplary screenshots illustrating a graphical user interface associated with the torque control mode.
Figure 35:
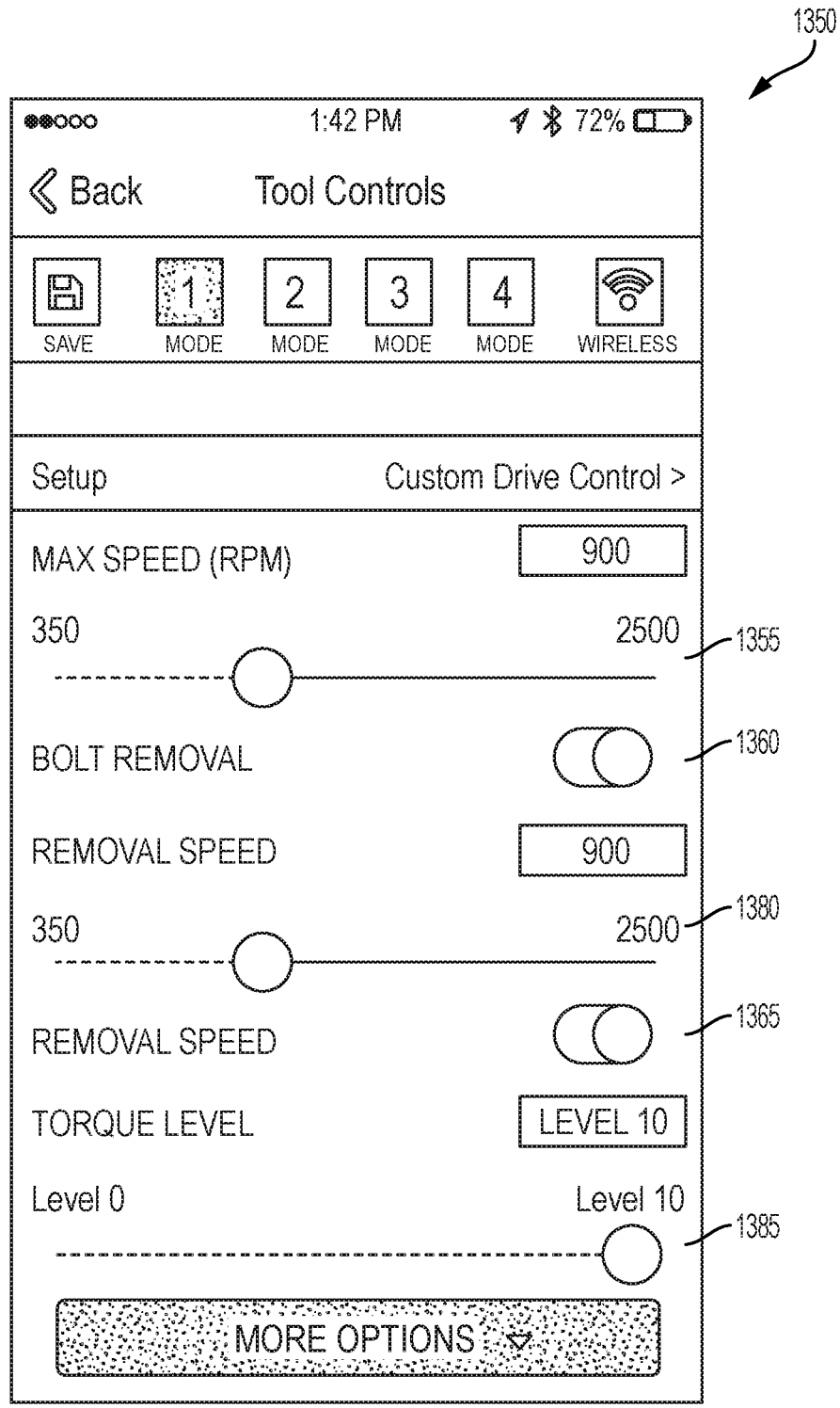

FIG. 33 illustrates a method 1300 of operating the power tool 10 according to a torque control mode in which a user specifies a torque level, and the controller 135 operates the motor 15 at a constant speed such that a consistent torque is output by the anvil 370. FIGS. 34-35 illustrate exemplary screenshots of a graphical user interface 1350 generated by the external device 147 through which a user may enable and specify parameters for the torque control mode. The interface 1350 of FIGS. 34-35 includes a maximum speed selector 1355, a bolt removal selector 1360, and a torque mode selector 1365. In the illustrated embodiment, the maximum speed selector 1355 includes a slider 1370 and a label 1375 that indicates a number corresponding to the position of the slider 1370. The external device 147 receives a selection from a user of a desired maximum speed for a tool operation through the maximum speed selector 1355. The torque control selector 1365 includes a switch that enables or disables the torque control mode. The external device 147 determines whether the torque control mode is enabled based on the position of the switch of the torque control selector 1365. The bolt removal selector 1360 also includes a switch that enables or disables a bolt removal mode further explained with respect to FIG. 38.

FIG. 35 illustrates the graphical user interface 1350 when both the bolt removal mode and the torque control mode are enabled. As shown in FIG. 35, when the bolt removal mode is enabled, the graphical user interface 1350 also includes a removal speed selector 1380. Similarly, when the torque control mode is enabled, the graphical user interface 1350 also includes a torque level selector 1385. A selected torque level may be indicative of, for example, a predetermined number of impacts delivered to the anvil 370. In other embodiments, a desired torque level may be indicative of a total applied torque at the workpiece (e.g., 92 ft.lbs). After the external device 147 receives the user selections via the graphical user interface 1350, the external device 147 transmits the mode profile to the power tool 10. As mentioned above, the power tool 10 receives the mode profile and stores the mode profile in a memory of the power tool 10 (e.g., a memory of the controller 135 and/or a separate memory). The power tool 10 (e.g., the controller 135) then receives a selection of an operational mode for the power tool 10 (e.g., via the mode select button 45), accesses the stored mode profile corresponding to the selected mode, and operates the power tool 10 according to the selected operational mode.

As shown in the flowchart of FIG. 33, the controller 135 receives a selection of the torque control mode for operation of the power tool 10 (step 1305). The selection may be received at the controller through, for example, the mode select button 45. The controller 135 may then access the maximum speed (step 1310) and access the desired torque level (step 1315) associated with the torque control mode. As mentioned above, the desired torque level may be indicative of a particular number of impacts to be delivered by the anvil 370 or may be indicative of a desired force to be imparted by the anvil 370. The controller 135 then proceeds to operate the motor 15 according to the depression of the trigger 55 (step 1320) such that the selected maximum speed of the power tool 10 is achieved when the trigger 55 is fully depressed (e.g., the motor 15 is controlled through variable bounded PWM signals). During the operation of the motor 15, the controller 135 monitors whether impacting of the anvil 370 has started (step 1325). As described above, the controller 135 may use different methods to detect when the hammer 375 has begun to impact the anvil 370. For example, the controller 135 may monitor the motor current and detect a change in the motor current when the hammer 375 begins impacting the anvil 370. Additionally or alternatively, the controller 135 may monitor the output signals from the output position sensor(s) described above to determine whether impacting of the anvil 370 has begun.

When the controller 135 determines that impacting has not yet started, the controller 135 continues to operate the motor 15 based on the depression of the trigger 55 and the selected maximum speed. Otherwise, when the controller 135 determines that impacting of the anvil 370 has started, the controller 135 stops operating the motor 15 according to the depression of the trigger 55 and instead, operates the motor 15 according to an adaptive pulse width modulation (PWM) speed control (step 1330). The controller 135 continues to operate the motor 15 according to the adaptive PWM speed control and monitors whether the desired torque level has been achieved (step 1335). For embodiments in which the desired torque level indicates a desired number of impacts to the anvil 370, the controller 135 monitors the output signals from the output position sensors and/or the hammer detectors described above to determine when the number of impacts delivered to the anvil 370 equal the desired number of impacts. In other embodiments, for example, when a total delivered torque applied is selected as the desired torque level, the controller 135 may monitor, for example, the time during which impacts are delivered to the anvil 370 as an approximate measure of the total torque applied, and/or may monitor a specific torque sensor positioned at the nose of the power tool 10. When the controller 135 determines that the desired torque level has not yet been reached, the controller 135 continues to operate the motor 15 according to the adaptive PWM speed control (step 1330). On the other hand, when the controller 135 determines that the desired torque level is reached, the controller proceeds to change operation of the motor 15 (step 1340). For example, the controller 135 may change the direction of driving the power tool 10, may stop operation of the motor 15, and/or may change a speed of the motor 15.

Figure 36:
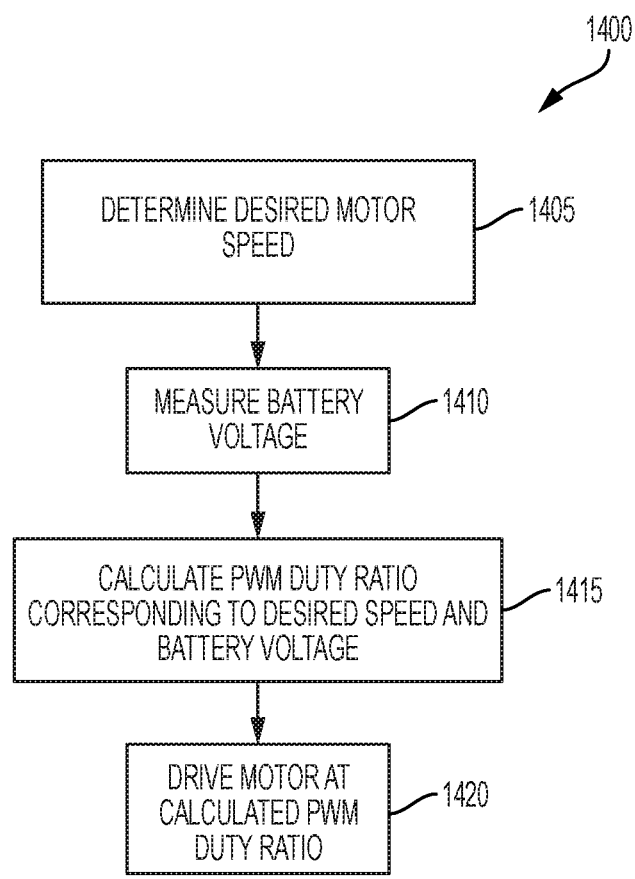
FIG. 36 is a flowchart illustrating an operation of the power tool in an adaptive PWM speed control mode.

FIG. 36 illustrates a method 1400 for operating the power tool 10 according to the adaptive PWM speed control mode. In the adaptive PWM speed control mode, the controller 135 maintains the rotating speed of the motor 15 at a desired value such that the hammer 375 impacts the anvil 370 at a constant desired speed. By controlling the speed of the motor, the anvil 370 can deliver a repeatable torque level to a fastener. During the adaptive PWM speed control mode, the controller 135 determines a desired motor speed (step 1405). The desired motor speed may correlate to a speed selected by a user (e.g., the maximum speed selected by a user via, for example, the graphical user interface 1350). In some embodiments, the desired motor speed may be calculated by the controller 135 based on, for example, a desired torque level. The controller 135, for example, using a look up table populated based on experimental values, determines the desired motor speed to output the desired torque level. In yet other embodiments, the desired motor speed may be calculated by the controller 135 based on an input from the user regarding the desired speed. For example, with reference to FIGS. 33-35, the controller 135 may calculate a desired speed for the adaptive PWM speed control based on the maximum speed selected by the user (e.g., and received at the controller 135). In one example, the desired speed corresponds to approximately between 70-75% of the maximum speed selected by the user.

After the controller 135 determines the desired motor speed, the controller 135 measures the battery voltage (e.g., the current state of charge of the power source 115 attached to the power tool 10) at step 1410. The controller 135 may use a voltage or current sensor to determine the state of charge of the battery pack attached to the power tool 10. The controller 135 then calculates a PWM duty ratio to drive the motor 15 to achieve the desired speed and based on the battery voltage (step 1415). The controller 135 then drives the motor 15 with the calculated PWM duty ratio to achieve the desired speed (step 1420). When the controller 135 loops back to step 1418 based on evaluating at step 1335 (see FIG. 33), the controller 135 measures the battery voltage again and calculates a new PWM duty cycle based on the most recent measured battery voltage and the desired speed. Periodically re-measuring the battery voltage and re-calculating a PWM duty cycle to achieve the desired speed allows the controller 135 to change the PWM duty cycle such that the desired speed of the motor 15 is achieved. For example, to achieve a desired motor speed, the controller 135 may determine a first PWM duty ratio when the battery voltage indicates a fully charged battery, and a second, higher PWM duty ratio when the battery voltage is lower than that for a fully charged battery. In other words, as the battery voltage decreases, the controller 135 increases the PWM duty ratio to compensate for the decrease in battery voltage. Through this compensation, a similar amount of voltage to the motor 15 is supplied despite a reduction of the state of charge of the battery.

In some embodiments, calculation of the PWM duty cycle includes determining a ratio of the full state of charge of the battery pack to the current state of charge of the battery pack. For example, a 12V battery pack may yield a ratio of 1.02 when the battery voltage drops to approximately 11.8V. The battery pack voltage ratio may then be used to adapt the PWM duty cycle to compensate for the gradual decrease in battery voltage. For example, a PWM duty ratio of 70% when the 12V battery pack is fully charged may be sufficient to deliver the desired speed. However, a PWM duty ratio of approximately 71.4% (e.g., the product of 70% and 1.02) may be used when the battery pack drops to approximately 11.8V such that the same overall motor voltage is delivered and a similar speed achieved.

Although FIG. 36 has been described with respect to adjusting the determined PWM duty ratio to compensate for the battery voltage, the controller 135 may additionally or alternatively monitor other factors to adjust the PWM duty ratio. For example, the controller 135 may monitor any one selected from a group consisting of battery impedance, joint type (e.g., indicated by a user via a touch screen similar to that shown in FIG. 10), motor temperature (e.g., detected by a temperature sensor coupled to the controller 135), and motor impedance, and any combinations thereof. For example, as one of the additional factors changes causing the motor speed to decrease, the controller 135 may, in response, increases the determined PWM duty ratio, to maintain the desired motor speed. Additionally, although the adaptive PWM speed control is described as compensating for a decrease in battery voltage, the controller 135 and/or the battery pack may still implement a low voltage threshold. In other words, when the state of charge of the battery pack is below the low voltage threshold, the controller 135 and/or the battery pack may cease to provide power to the motor 15 to prevent the battery pack from becoming over-discharged.

The controller 135 may operate in the PWM speed control mode as part of the other modes described for the power tool, not just as part of the torque control mode described with respect to FIGS. 33-35. For example, while operating in the closed-loop speed control, the controller 135 may control the motor 15 such that a specific number of impacts are to be delivered to the anvil 370 as described, for example, in FIG. 4. In another example, while operating in the PWM speed control mode, the controller 135 may control the motor 15 such that a total angle after the first impact is desired as described, for example, in FIG. 9.

Figure 37:
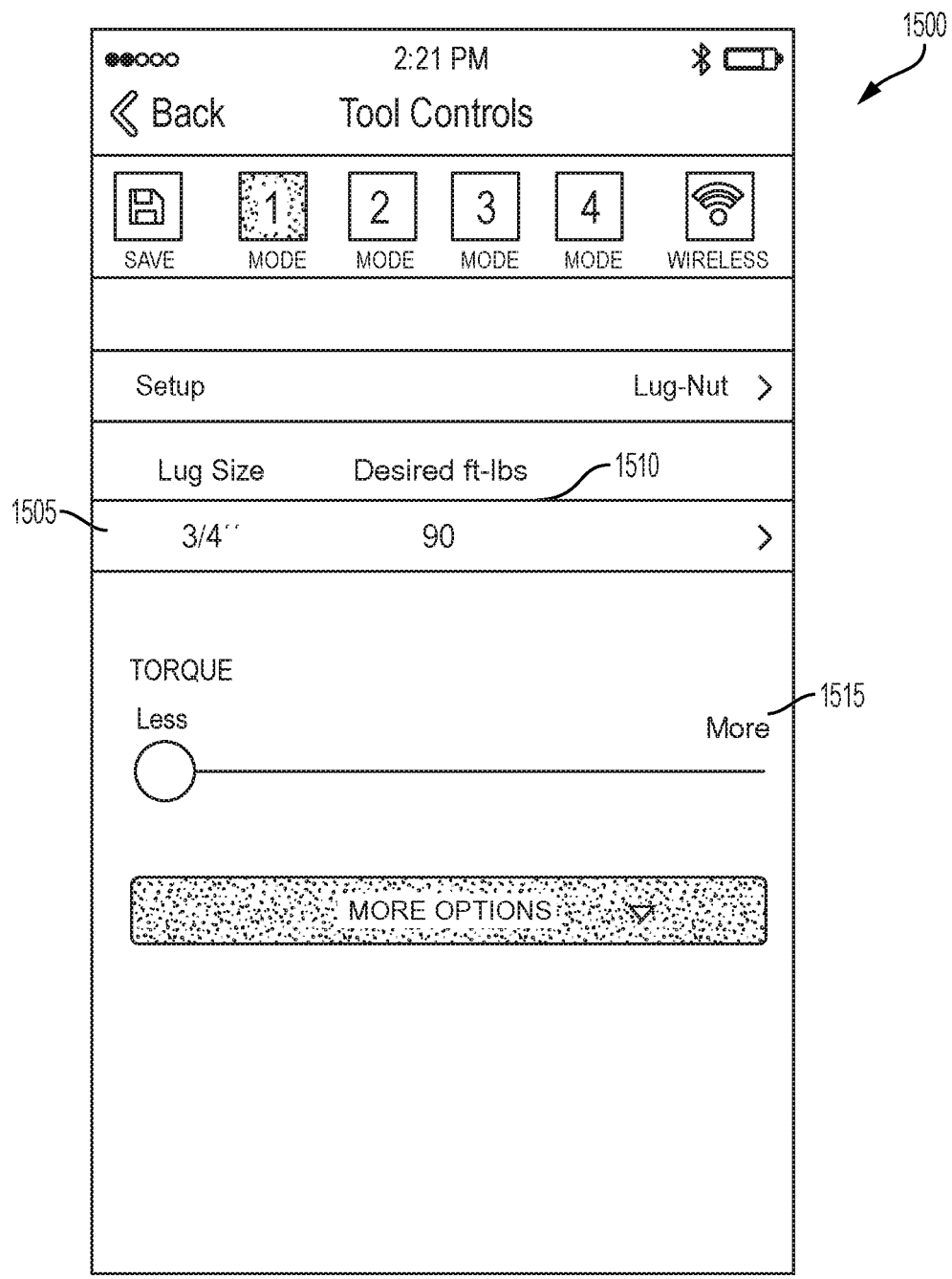
FIG. 37 is an exemplary screenshot illustrating a graphical user interface associated with a lug nut control mode.

For example, FIG. 37 illustrates another exemplary screenshot of a graphical user interface 1500 generated by the external device 147 for selecting parameters for a lug nut control mode. During operation, the lug nut control mode is similar to the torque control mode. The specification of parameters for the lug nut control mode, however, is based on inputting specific characteristics of the lug nut rather than specifying a maximum speed. As shown in FIG. 37, the graphical user interface 1500 includes a lug size selector 1505 and a desired torque selector 1510. The desired torque output may correspond to, for example, manufacturer specification for particular lug nuts. The external device 147 receives an indication of a particular lug size and the desired torque output via the graphical user interface 1500, and determines based on the selected parameters a corresponding desired speed. In some embodiments, the external device 147 accesses a remote server to determine the desired speed corresponding to the specified lug nut and desired torque output. In some embodiments, the external device 147 transmits the lug nut mode profile including the specified lug nut size and desired torque output and the power tool 10 (i.e., the controller 135) determines the desired speed. As shown in FIG. 37, the graphical user interface 1500 also includes a torque level selector 1515. The torque level selector 1515 indicates a desired number of impacts to be delivered to the anvil 370. After the desired speed corresponding to the selected lug nut size and desired torque output is determined, the controller 135 operates the motor 15 according to the adaptive PWM speed control (e.g., starting at step 1320) during operation of the lug nut control mode, as described for example with respect to FIGS. 33 and 36.

Figure 38:
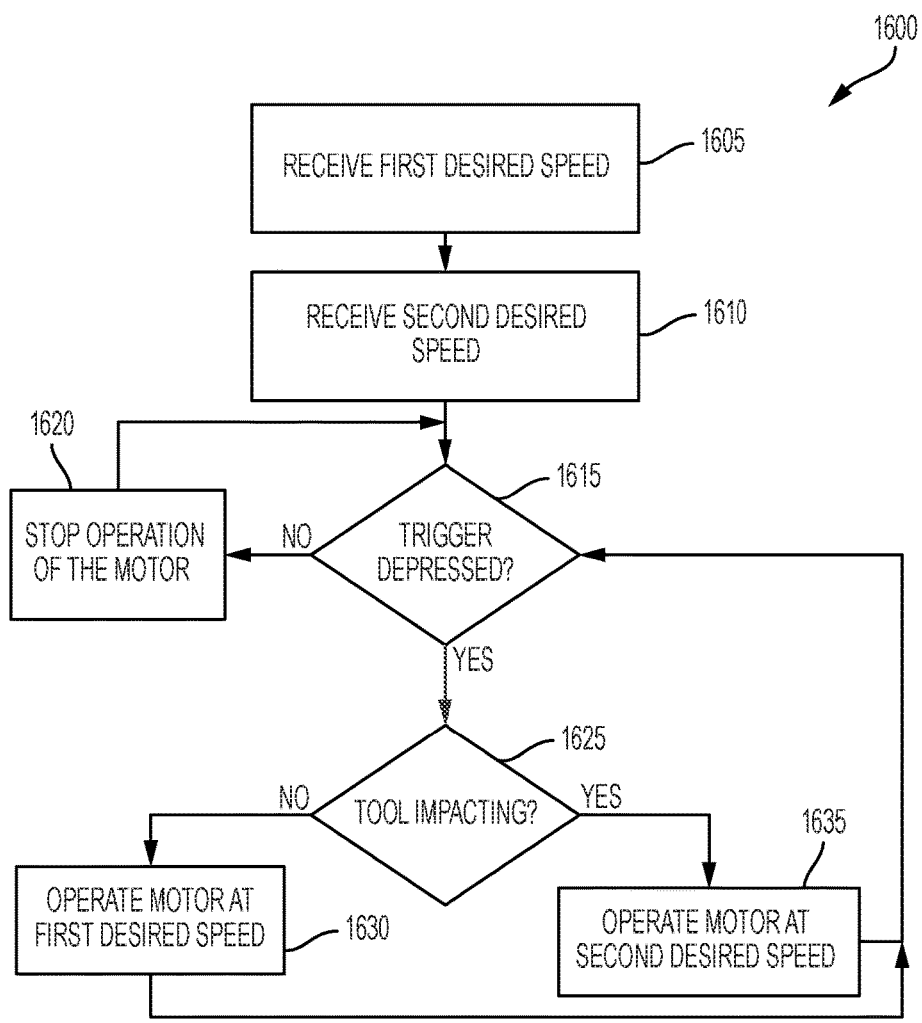
FIG. 38 is a flowchart illustrating an operation of the power tool in a differential impacting speed mode.

FIG. 38 illustrates a method 1600 of operating the power tool 10 according to a differential impacting speed mode. The differential impacting speed mode allows the power tool 10 to operate the motor 15 at a first speed when the hammer 375 is not impacting the anvil 370 and a second speed when the hammer 375 is impacting the anvil 370. As shown in FIG. 38, the controller 135 first receives (or accesses) a first desired speed (step 1605) and receives (or accesses) a second desired speed (step 1610). The controller 135 may receive the first and second desired speeds from, for example, the external device 147 based on, for example, a user input received through a graphical user interface. The controller 135 then monitors the trigger 55 to determine whether the trigger 55 is currently depressed (step 1615). When the trigger is not depressed, the operation of the motor 15 is stopped (step 1620), and the controller 135 returns to step 1615 to determine whether the trigger 55 is depressed. When the trigger is depressed, the controller 135 determines whether the hammer 375 is impacting the anvil 370 (step 1625).

The controller 135 may determine whether impacting is occurring based on, for example, the motor current, the motor speed, the output signals from the output positions sensors and/or the hammer detectors, or a combination thereof. When the controller 135 determines that the hammer 375 is not impacting the anvil 370, the controller 135 operates the motor according to the first desired speed and an amount of depression of the trigger 55 (step 1630). On the other hand, when the controller 135 determines that the hammer 375 is impacting the anvil 370, the controller 135 operates the motor 15 according to the second desired speed and an amount of depression of the trigger 55 (step 1635). For example, when the trigger 55 is fully depressed, the controller 135 operates the motor 15 at the first desired speed, and operates the motor 15 slower when the trigger 55 is not fully depressed (e.g., at a rate proportional to the trigger depression). As the controller 135 operates the motor 15 according to either the first desired speed or the second desired speed, the controller 135 continues to monitor whether the trigger 55 remains pulled at step 1615.

The bolt removal feature referred to earlier with respect to FIGS. 34 and 35 is an example of the differential impacting speed mode. Typically, during removal of bolts, the power tool 10 begins impacting soon after initiating the removal operation. As the bolt is removed and less force is required, the power tool 10 continues to drive the motor 15, but stops impacting while the bolt is then fully removed. Therefore, with respect to the bolt removal mode as shown in FIG. 35, the maximum speed corresponds to the second desired speed described in FIG. 38 and is used when controlling the motor 15 while the hammer 375 is impacting the anvil 370 and just beginning the bolt removal process. Conversely, the removal speed selected by the user through the graphical interface 1350 corresponds to the first desired speed described in FIG. 38 and is used when controlling the motor 15 after the hammer 375 has stopped impacting the anvil 370. During operation of the bolt removal mode, the controller 135 operates the motor 15 according to the maximum speed at first until the bolt is sufficiently loose that the power tool 10 does not need to engage its impact mechanism 300 to remove the bolt. Then, the controller 135 operates the motor 15 according to the removal speed until the bolt is fully removed. When displaying the graphical user interface 1350 of FIG. 35 to the user, the removal speed defaults to approximately 50% of the maximum speed. By setting the removal speed to be slower than the maximum speed, the bolt is inhibited from abruptly releasing from the surface. Instead, a more controlled bolt removal may be performed.

Although the bolt removal mode described above operates the motor 15 in a reverse direction, in some embodiments, the differential impacting speed mode may also be implemented when the power tool 10 operates in a forward direction. For example, when a bolt has a particularly long threading, a higher speed may be used to begin fastening the bolt (e.g., a first desired speed) while the hammer 375 is not yet impacting the anvil 370. However, once the bolt begins to penetrate more of the work surface, impacting may begin and the controller 135 may decrease the motor speed (e.g., to a second desired speed) to generate a higher torque.

Figure 39:
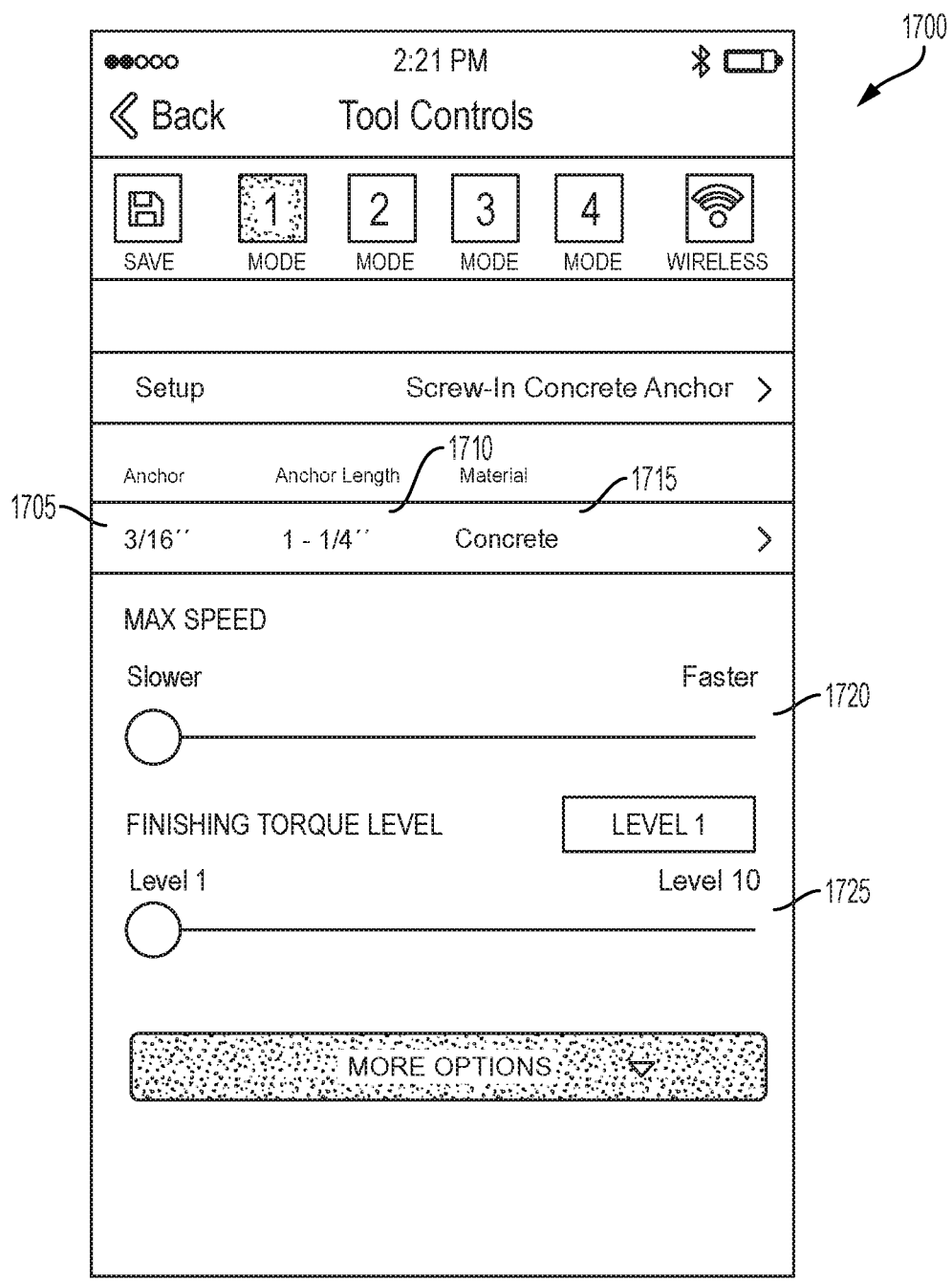
FIG. 39 is an exemplary screenshot of a graphical user interface associated with a concrete anchor mode.

The power tool 10 may also operate in a concrete anchor mode. FIG. 39 illustrates an exemplary graphical user interface 1700 generated by the external device 147 to receive user selection for various parameters of the concrete anchor mode. As shown in FIG. 39, the graphical user interface 1700 includes an anchor width selector 1705, an anchor length selector 1710, and an anchor material selector 1715. Several combinations of the anchor type, the anchor length, and the anchor material may be selected by the user via the selectors 1705, 1710, 1715. The graphical user interface 1700 also includes a maximum speed selector 1720, and a finishing torque level selector 1725. The maximum speed selector 1720 allows a user to specify a desired maximum speed. As described above with respect to other torque selectors, the torque level selector 1725 may select, for example, a desired number of impacts to be delivered by the hammer 375 before operation is stopped.

Figure 40:
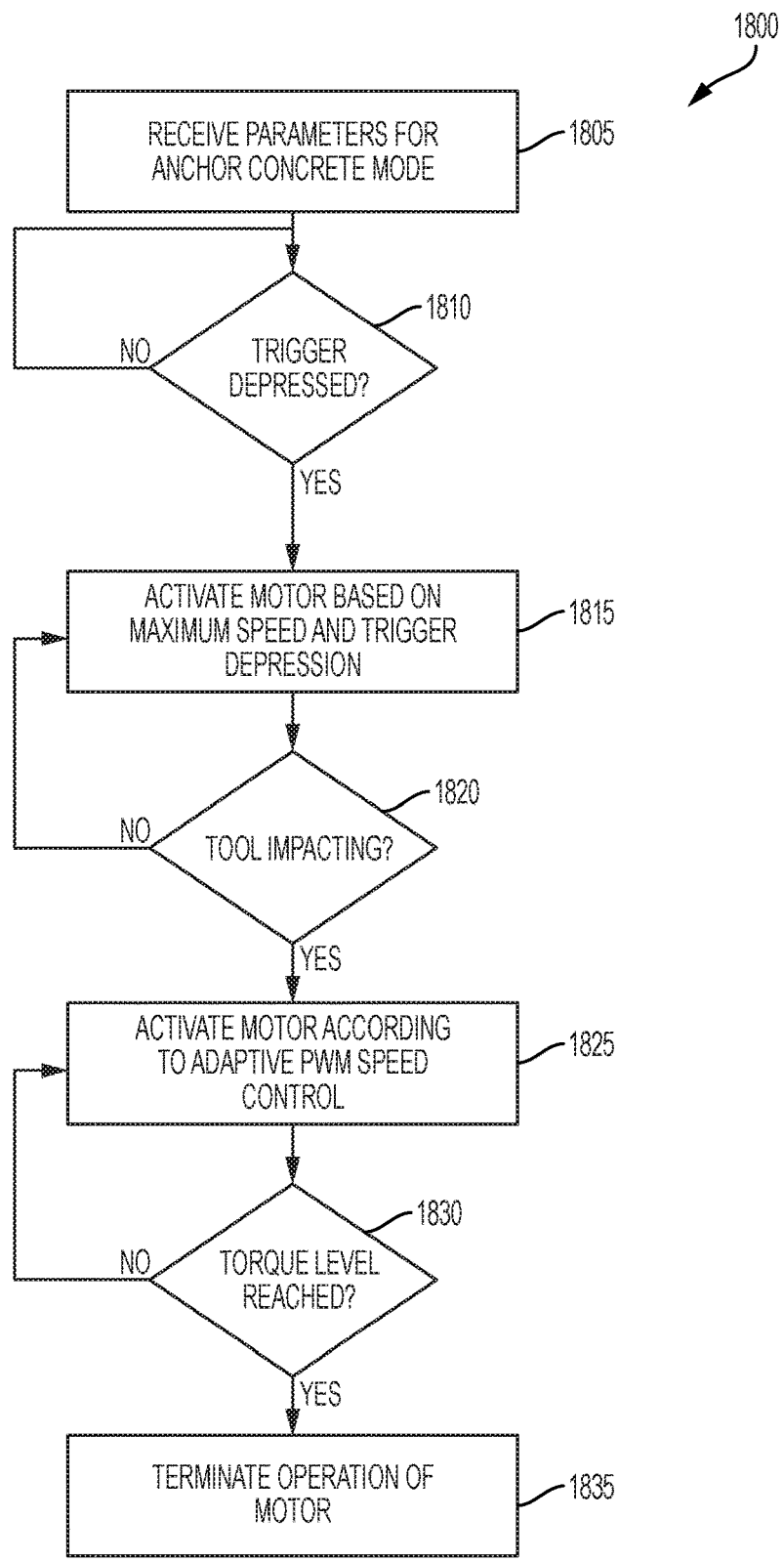
FIG. 40 is a flowchart illustrating an operation of the power tool in a concrete anchor mode.

FIG. 40 illustrates a method 1800 for operating the power tool 10 in the concrete anchor mode. First, the controller 135 receives the parameters specified via the graphical user interface 1700 (step 1805). In particular, the controller 135 receives a selected maximum speed and a desired finishing torque level. As discussed above, the maximum speed and/or the desired finishing torque level may be determined by the controller 135 or the external device 147 based on the characteristics of the fastener and type of application as specified using the anchor width selector 1705, anchor length selector 1710, and the anchor material selector 1715. In other embodiments, the characteristics of the fastener and type of application are used to determine other parameters for the operation of the power tool 10. The controller 135 then checks whether the trigger 55 is depressed (step 1810). When the trigger 55 is not depressed, the controller 135 continues to monitor the trigger 55 without activating the motor 15 (step 1810). When the trigger 55 is depressed, the controller 135 controls the motor 15 according to the maximum speed and the amount of depression of the trigger 55 (step 1815). For example, when the trigger 55 is fully depressed, the maximum speed is provided to the motor 15. However, when the trigger 55 is only depressed about 50%, the motor speed is also approximately 50% of the maximum speed.

The controller 135 then monitors the power tool 10 to determine whether impacting has started (step 1820). As discussed above, the controller 135 may determine when impacting is occurring based on, for example, motor current, motor position, and/or anvil position. When the hammer 375 is not yet impacting the anvil 370, the controller 135 continues to monitor whether impacting has begun. On the other hand, when the hammer 375 is impacting the anvil 370, the controller 135 switches the motor operation to operate according to the adaptive PWM speed control until the desired torque level is reached (step 1825). Driving the motor 15 with the adaptive PWM speed control allows for a constant torque output to be delivered via the anvil 370 even despite decreasing battery voltage. The controller 135 then monitors, for example, the number of impacts from the hammer 375, to determine whether the desired finishing torque level is reached (step 1830). Step 1830 may be similar to, for example, step 1335 of FIG. 33. When the desired torque level is reached, the controller 235 terminates the operation of the power tool 10 (step 1835). Otherwise, the controller 135 continues to operate the motor 15 according to the adaptive PWM speed control. Accordingly, using the concrete anchor mode, a user may configure the power tool 10 to operate based on specific characteristics of the anchor size and/or type.

As discussed above with respect to FIG. 3, the controller 135 receives inputs from the motor position sensors 125 and determines, for example, based on the position of the motor 15 when to apply power to the motor 15. In some embodiments, the controller 135 may change the current conduction angle or an advance angle based on the position or speed of the motor 15. For example, above a certain speed, the controller 135 may change the conduction angle to implement phase advance and, below the speed, the controller 135 may return the previous conduction angle. The controller 135 may also receive an indication of a desired speed via, for example, a graphical user interface generated by the external device 147. Additionally, as described above for example in FIGS. 4, 5, 7, 9, 11, 17, 29-32, 33, 38, and 40, the controller 135 controls the motor 15 based on the position and/or movement of the anvil 370. Furthermore, as discussed with respect to FIG. 36, the controller 135 also compensates for the battery voltage and changes a duty cycle of the control signal to the motor 15 such that the average power delivered to the motor 15 remains the same. Accordingly, the controller 135 is operable to control the motor 15 based on one or more of the position of the motor 15, the speed of the motor 15, the position and/or movement of the anvil 370, the position and/or movement of the hammer 375, and the battery voltage.

Thus, the invention provides, among other things, a power tool including a controller that controls a motor based on a direct measurement of the anvil position, the hammer position, or a combination thereof.

What is claimed is:

1. A power tool comprising:
   a motor including a rotor and a stator;
   a motor sensor board positioned perpendicularly with respect to the rotor of the motor, the motor sensor board extending in a radial outward direction with respect to the rotor of the motor;
   an impact mechanism coupled to the motor, the impact mechanism including
   a hammer driven by the motor, and
   an anvil positioned at a nose of the power tool, the anvil configured to receive an impact from the hammer;
   an impact case housing the anvil and the hammer;
   a sensor assembly mounted to a top surface of a circuit board and located within a recess below the rotor of the motor in the radial outward direction, the circuit board positioned parallel with respect to the rotor of the motor, a plane formed by the top surface of the circuit board intersecting the motor sensor board, the sensor assembly configured to generate an output signal indicative of the hammer impacting the anvil; and
   a controller including a processor and a memory, the controller connected to the sensor assembly and to the motor, the controller configured to:
   receive the output signal from the sensor assembly,
   detect a number of impacts executed by the hammer based on the output signal from the sensor assembly, and
   control the motor based on the number of impacts executed by the hammer.

2. The power tool of claim 1, wherein the sensor assembly is positioned in the radial outward direction between the rotor of the motor and a trigger.

3. The power tool of claim 1, wherein the controller is configured to stop driving the motor after a predetermined number of impacts have been executed by the hammer.

4. The power tool of claim 1, wherein the sensor assembly includes a magnetic sensor.

5. The power tool of claim 1, wherein the output signal from the sensor assembly is related to an axial position of the hammer.

6. The power tool of claim 1, further comprising a transmission coupled between the motor and the impact mechanism, the transmission positioned in front of the motor sensor board and positioned above the sensor assembly in the radial outward direction.

7. The power tool of claim 1, wherein the power tool is powered by a rechargeable battery pack.

8. A power tool comprising:
   a motor including a rotor and a stator;
   a motor sensor board extending in a radial outward direction with respect to the rotor of the motor;
   an impact mechanism coupled to the motor, the impact mechanism including
   a hammer driven by the motor, and
   an anvil positioned at a nose of the power tool, the anvil configured to receive an impact from the hammer;
   an impact case housing the anvil and the hammer;
   a sensor assembly mounted to a top surface of a circuit board and located within a recess below the rotor of the motor in the radial outward direction, a plane formed by the top surface of the circuit board intersecting the motor sensor board, the sensor assembly configured to generate an output signal indicative of the hammer impacting the anvil; and
   a controller including a processor and a memory, the controller connected to the sensor assembly and to the motor, the controller configured to:
   receive the output signal from the sensor assembly,
   detect an impact executed by the hammer based on the output signal from the sensor assembly, and
   control the motor based on the impact executed by the hammer.

9. The power tool of claim 8, wherein the sensor assembly is positioned in the radial outward direction between the rotor of the motor and a trigger.

10. The power tool of claim 8, wherein the controller is configured to stop driving the motor after the impact executed by the hammer.

11. The power tool of claim 8, wherein the sensor assembly includes an inductive sensor.

12. The power tool of claim 8, wherein the output signal from the sensor assembly is related to an axial position of the hammer.

13. The power tool of claim 8, further comprising a transmission coupled between the motor and the impact mechanism, the transmission positioned in front of the motor sensor board and positioned above the sensor assembly in the radial outward direction.

14. The power tool of claim 13, wherein the sensor assembly is positioned in front of the transmission.

15. The power tool of claim 8, wherein the power tool is powered by a rechargeable battery pack.

16. A power tool comprising:
    a motor including a rotor and a stator;
    a motor sensor board including a Hall Effect sensor and extending below the rotor of the motor;
    an impact mechanism coupled to the motor, the impact mechanism including
    a hammer driven by the motor, and
    an anvil positioned at a nose of the power tool, the anvil configured to receive an impact from the hammer;
    an impact case housing the anvil and the hammer;
    a sensor assembly mounted to a top surface of a circuit board and located within a recess below the rotor of the motor, a plane formed by the top surface of the circuit board intersecting the motor sensor board, the sensor assembly configured to generate an output signal indicative of the hammer impacting the anvil; and
    a controller including a processor and a memory, the controller connected to the sensor assembly and to the motor, the controller configured to:
    receive the output signal from the sensor assembly,
    detect an impact executed by the hammer based on the output signal from the sensor assembly, and
    control the motor based on the impact executed by the hammer.

17. The power tool of claim 16, wherein the sensor assembly is positioned between the rotor of the motor and a trigger.

18. The power tool of claim 16, wherein the controller is configured to stop driving the motor after the impact executed by the hammer.

19. The power tool of claim 16, wherein the sensor assembly includes a magnetic sensor.

20. The power tool of claim 16, wherein the output signal from the sensor assembly is related to an axial position of the hammer.

21. The power tool of claim 16, further comprising a transmission coupled between the motor and the impact mechanism, the transmission positioned in front of the motor sensor board and positioned above the sensor assembly.

22. The power tool of claim 21, wherein the sensor assembly is positioned in front of the transmission.

23. The power tool of claim 16, wherein the power tool is powered by a rechargeable battery pack.

* * * * *